(12) United States Patent
Raymus

(10) Patent No.: US 12,365,522 B2
(45) Date of Patent: Jul. 22, 2025

(54) LIQUID CONTAINER WITH A UNIVERSAL ADAPTER AND ACCESSORIES THEREFOR

(71) Applicant: Thomas Anthony Raymus, Manteca, CA (US)

(72) Inventor: Thomas Anthony Raymus, Manteca, CA (US)

(*) Notice: Subject to any disclaimer, the term of this patent is extended or adjusted under 35 U.S.C. 154(b) by 0 days.

(21) Appl. No.: 18/399,631

(22) Filed: Dec. 28, 2023

(65) Prior Publication Data

US 2024/0375836 A1    Nov. 14, 2024

Related U.S. Application Data

(60) Provisional application No. 63/543,323, filed on Oct. 10, 2023, provisional application No. 63/538,947, (Continued)

(51) Int. Cl.
*B65D 51/24* (2006.01)
*B65D 25/20* (2006.01)
(Continued)

(52) U.S. Cl.
CPC .............. *B65D 51/24* (2013.01); *B65D 25/20* (2013.01); *B65D 25/2811* (2013.01);
(Continued)

(58) Field of Classification Search
CPC .......................... A47G 19/2272; B65D 25/20; B65D 25/2811; B65D 43/02; B65D 47/0857; B65D 51/24; B65D 53/02; H04M 1/04
(Continued)

(56) References Cited

U.S. PATENT DOCUMENTS

D140,862 S      2/1944    Conlan
5,457,745 A  *  10/1995   Wang .................. B60R 11/0241
                                                          379/426
(Continued)

FOREIGN PATENT DOCUMENTS

AU    2019206105       2/2020
CN    203673961 U      6/2014
(Continued)

OTHER PUBLICATIONS

Kickstarter page for Ringo first captured Feb. 10, 2023 (Year: 2023).*

(Continued)

*Primary Examiner* — Nathan J Jenness
*Assistant Examiner* — Madison L Poos
(74) *Attorney, Agent, or Firm* — Boris Leschinsky

(57) ABSTRACT

The liquid container includes universal adapters positioned on the container or components thereof and designed to releasably attach an accessory thereto. The universal adapter has a first attachment face cooperating with a second attachment face of the accessory to facilitate rapid attachment and removal of the accessory to the liquid container. All accessories have the same second attachment face, making them interchangeably compatible with the universal adapter. Examples of accessories include a phone holder, a pill box, a powder container with a funneled end, a money clip, and a wallet. Exemplary uses include holding the smartphone above the liquid container positioned in a car cupholder while driving to provide directions, following a video cooking directions in the kitchen, or another handsfree use in a car, at home, in a gym, or other locations where both good hydration and hand-free use of a smartphone are required.

4 Claims, 67 Drawing Sheets

Related U.S. Application Data filed on Sep. 18, 2023, provisional application No. 63/532,186, filed on Aug. 11, 2023, provisional application No. 63/468,972, filed on May 25, 2023, provisional application No. 63/465,588, filed on May 11, 2023.

(51) Int. Cl.
*B65D 25/28* (2006.01)
*B65D 47/08* (2006.01)
*B65D 53/02* (2006.01)
*H04M 1/04* (2006.01)

(52) U.S. Cl.
CPC ......... *B65D 47/0857* (2013.01); *B65D 53/02* (2013.01); *H04M 1/04* (2013.01)

(58) Field of Classification Search
USPC .............................. 215/228; 220/212, 212.5
See application file for complete search history.

(56) References Cited

U.S. PATENT DOCUMENTS

| | | | | |
|---|---|---|---|---|
| 5,671,503 | A | * | 9/1997 | Uebelacker ........ B65D 25/2811 |
| | | | | 220/756 |
| 5,703,946 | A | * | 12/1997 | Chen ................... H04M 1/6075 |
| | | | | 379/454 |
| D510,235 | S | | 10/2005 | Sorensen |
| D666,047 | S | | 8/2012 | Lin |
| 8,381,935 | B1 | | 2/2013 | Buck |
| D827,405 | S | | 9/2018 | Chun |
| 10,165,877 | B2 | | 1/2019 | Sorensen |
| 10,421,593 | B1 | | 9/2019 | Litten |
| D886,094 | S | | 6/2020 | Xu |
| 10,954,035 | B2 | * | 3/2021 | Fromme ................... B65D 1/06 |
| 11,338,971 | B1 | * | 5/2022 | Capper ................... B65D 51/24 |
| 11,382,402 | B2 | * | 7/2022 | King ...................... B65D 23/12 |
| 11,597,097 | B2 | | 3/2023 | Riedel |
| 11,759,035 | B2 | | 9/2023 | Aldous |
| 2002/0170915 | A1 | | 11/2002 | Hierzer |
| 2005/0040052 | A1 | | 2/2005 | Dixon |
| 2006/0180585 | A1 | | 8/2006 | Cunningham |
| 2011/0036803 | A1 | * | 2/2011 | Mejia ...................... B65D 51/28 |
| | | | | 215/228 |
| 2014/0246431 | A1 | * | 9/2014 | Lipson ................... B65D 51/24 |
| | | | | 239/33 |
| 2017/0050785 | A1 | | 2/2017 | Roth |
| 2017/0174382 | A1 | | 6/2017 | Korfonta |
| 2018/0228280 | A1 | * | 8/2018 | Li ........................... B65D 51/24 |
| 2019/0063667 | A1 | * | 2/2019 | Law ........................ H04M 1/04 |
| 2019/0166976 | A1 | | 6/2019 | Croix |
| 2019/0208898 | A1 | * | 7/2019 | Koo ................... B65D 43/0225 |
| 2021/0130040 | A1 | * | 5/2021 | Sanders ................. D04B 21/20 |
| 2021/0204664 | A1 | * | 7/2021 | Fromme ................... A45F 3/18 |
| 2021/0212485 | A1 | | 7/2021 | Attar |
| 2022/0234801 | A1 | * | 7/2022 | Pham ....................... A61J 1/03 |
| 2022/0297899 | A1 | | 9/2022 | Raymus |
| 2023/0403352 | A1 | * | 12/2023 | Alves ...................... H04M 1/04 |

FOREIGN PATENT DOCUMENTS

| | | | | |
|---|---|---|---|---|
| CN | 204341717 | U | | 5/2015 |
| CN | 206395128 | U | | 8/2017 |
| CN | 207677942 | U | | 7/2018 |
| CN | 111917909 | A | * | 11/2020 |
| CN | 217428185 | U | | 9/2022 |
| GB | 2521895 | A | | 12/2015 |
| KR | 100706717 | B1 | | 12/2007 |
| KR | 20170097919 | | | 8/2017 |
| KR | 20170110435 | A | * | 10/2017 |
| KR | 20200065382 | A | * | 6/2020 |
| KR | 20210062941 | A | * | 6/2021 | ............. H04M 1/04 |
| KR | 102369204 | | | 2/2022 |
| TW | M607275 | U | | 2/2021 |
| TW | M643542 | U | | 7/2023 |

OTHER PUBLICATIONS

Hydrobuddy—Water Bottle Phone Holder for Fitness Bottle—Phone Holding Sleeve for Workout and Running—Water Bottle Phone Storage—https://www.amazon.com/HYDROBUDDY-Fitness-Holding-Workout-Running/dp/B08WR7QCW3 (accessed Jan. 29, 2024).

32oz Insulated Steel Bottle with Magnetic Phone Mount for Shooting Video or Pictures—https://www.etsy.com/listing/1469034183/32oz-insulated-steel-bottle-with?amp%3B=&%3Bgad_source=1&%3Bgao=1&%3Bgclid=Cj0KCQiA2KitBhCIARIsAPPMEhLznDRWKAXOyf8MiWSCgCabewyJi3Sz-5f3rb7HL_b7VgoKm-suNhgaAqGMEALw_wcB&%3Butm_campaign=shopping_us_b-home_and_living-kitchen_and_dining-drink_and_barware-drinkware-other&%.

Ainope for MagSafe Water Bottle 24oz Magnetic Stainless Steel Gym Bottles for Men, Women & Kids Double Walled, Insulated Thermos Coldest Water Bottle for iPhone 15 Pro Max Sports Bottle Accessories—https://www.amazon.com/AINOPE-Magnetic-Stainless-Insulated-Accessories/dp/B0CFR152CV/ref%3Dsr_1_5?amp%3Bdib=eyJ2ljoiMSJ9.DU-qCc_ITeVi9GdhBzmM4KrtC1B6p2aP2MxGVO0l5bFIHncY-zeVRQ4IUL_XQTTs8dFUw1E8O_Rxqg818GHpNdgkaQv7RZ2yjB8792PxN1iiSFURLs8AApwzgtiTB94Bd4Wxk3L7obU.

RhinoShield 27oz Magnetic Leakproof Water Bottle with Straw Lid, MagSafe Handle and Adjustable Tripod—https://www.amazon.com/RhinoShield-Magnetic-Leakproof-MagSafe-Adjustable/dp/B0CC895TF3/ref%3Dci_mcx_psdc_9630569011_t1_B0CFR152CV?th=1 (accessed Jan. 29, 2024).

WeatherTech CupFone—https://www.amazon.com/WeatherTech-CupFone-Universal-Adjustable-Portable/dp/B07KY1XKRQ/ref%3Dpd_ci_mcx_mh_mcx_views_1?amp%3Bcontent-id=amzn1.sym.225b4624-972d-4629-9040-f1bf9923dd95%3Aamzn1.symc.40e6a10e-cbc4-4fa5-81e3-4435ff64d03b&%3Bpd_rd_i=B07KY1XKRQ&%3Bpd_rd_r=65dddf41-6b3e-4201-8825-c05d7d4d3cc4&%3Bpd_rd_wg=knl5f&%3Bpf_rd_p=225b4624-972d-4629-9040-f1bf9923dd95&%.

APPS2Car Solid Cup Holder Phone Mount—https://www.amazon.com/Holder-Universal-Compatible-Adjustable-Samsung/dp/B08D9K56KB/ref%3Dsxin_15_pa_sp_search_thematic_sspa?amp%3Bcrid=S4l2U14AX3A6&%3Bcv_ct_cx=cup+phone+holder+car&%3Bdib=eyJ2ljoiMSJ9.F9NJH8nVrL-_3zK0HnCVsTvYz-LbrM2gN_J82qlzcMZg7KXX8kEXYDO8EZ4Ddd5cXyaSBiYZglhkySTZBq-CgA.s8jmcRRIT75syDe-cXNQdd9ljao_7ukxTvHelpOkpvQ&%3Bdib_tag=se&%3Bkeywords=cup+phone+holder+car&%.

G-B Stanley Cup 40 oz Tumbler Chapstick Keychain Holder—https://www.amazon.com/dp/B0BVGX4KX7?amp%3Bascsubtag=%5Bartid%7C2164.g.43993246%5Bsrc%7Cwww.google.com%5Bch%7C%5Blt%7Cpsv%5Bpid%7C88c17cef-7cf6-4941-b10c-dbc3d6d6ced6&%3Btag=pioneerwoman-auto-append-20&%3Bth=1&linkCode=ogi&th=1 (accessed Jan. 29, 2024).

Meeti Snack Bowl for Stanley Cup, Reusable Snack Ring Compatible with Stanley Quencher—https://www.amazon.com/MEETI-Reusable-Compatible-Quencher-Accessories/dp/B0CCNSSRYR?th=1 (accessed Jan. 29, 2024).

\* cited by examiner

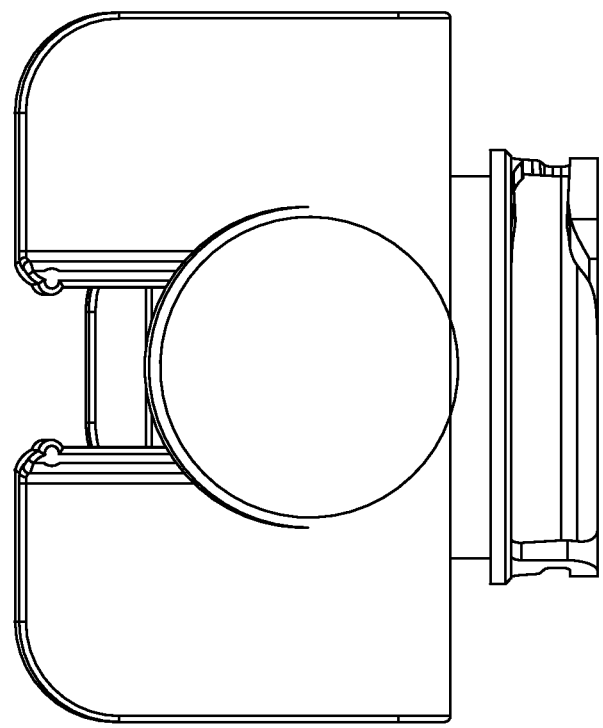
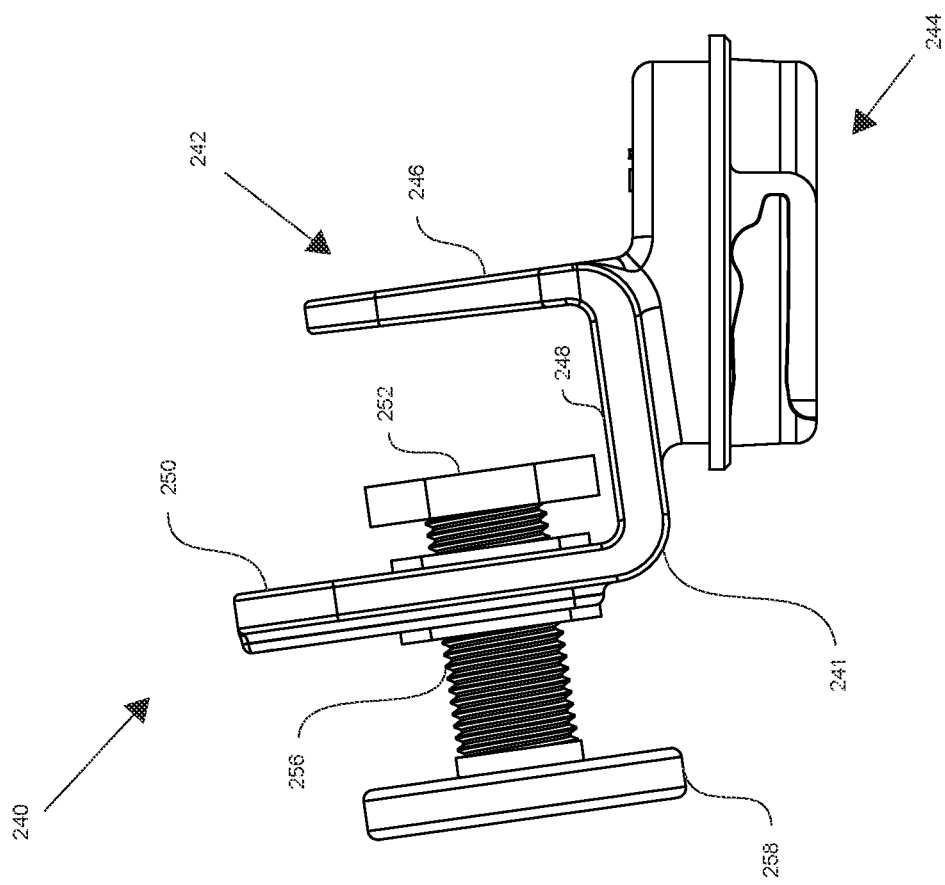
Fig. 11a
Fig. 11b

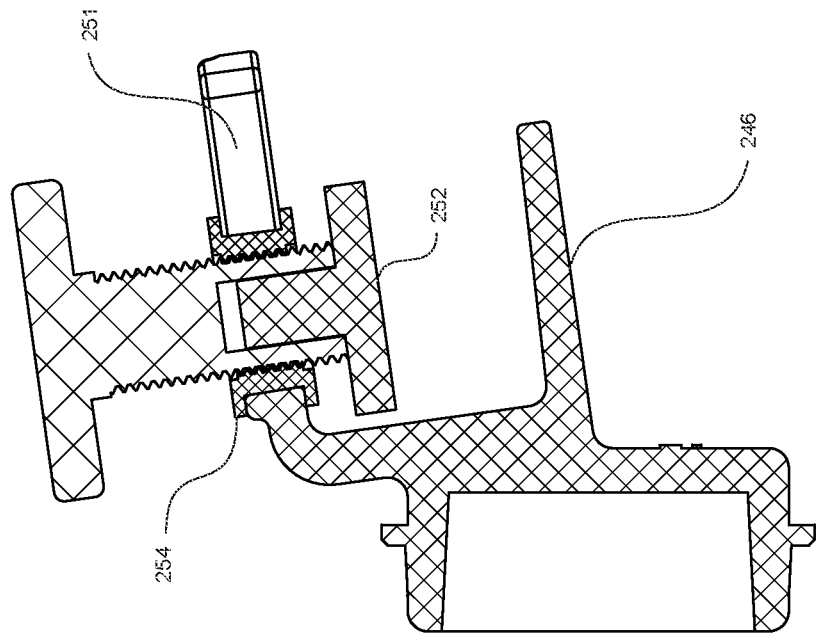
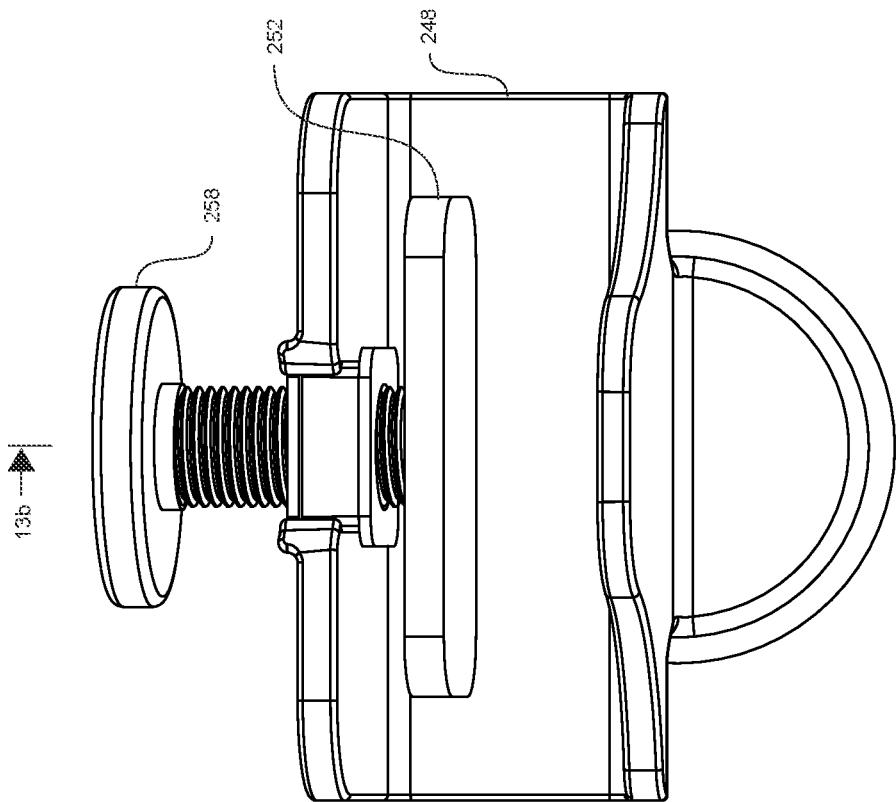
Fig. 13b
Fig. 13a

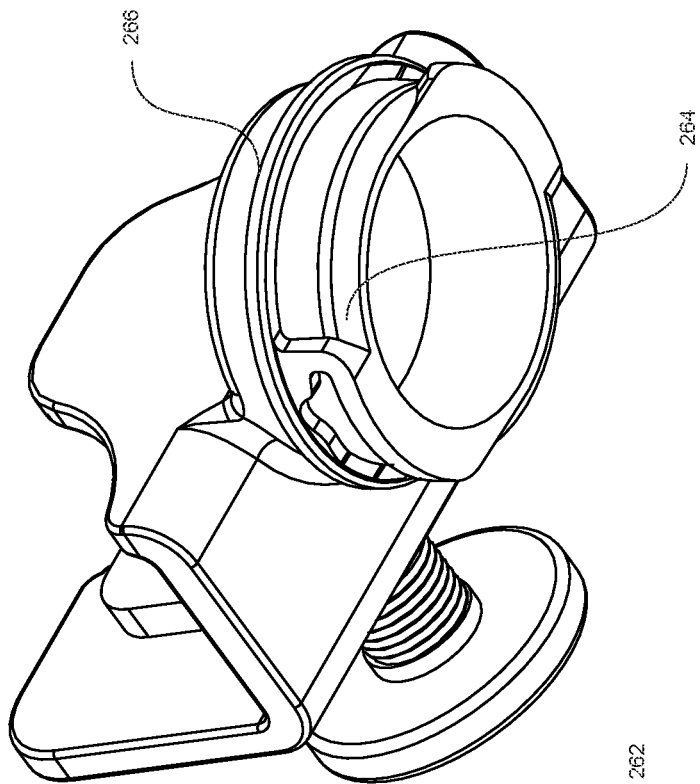
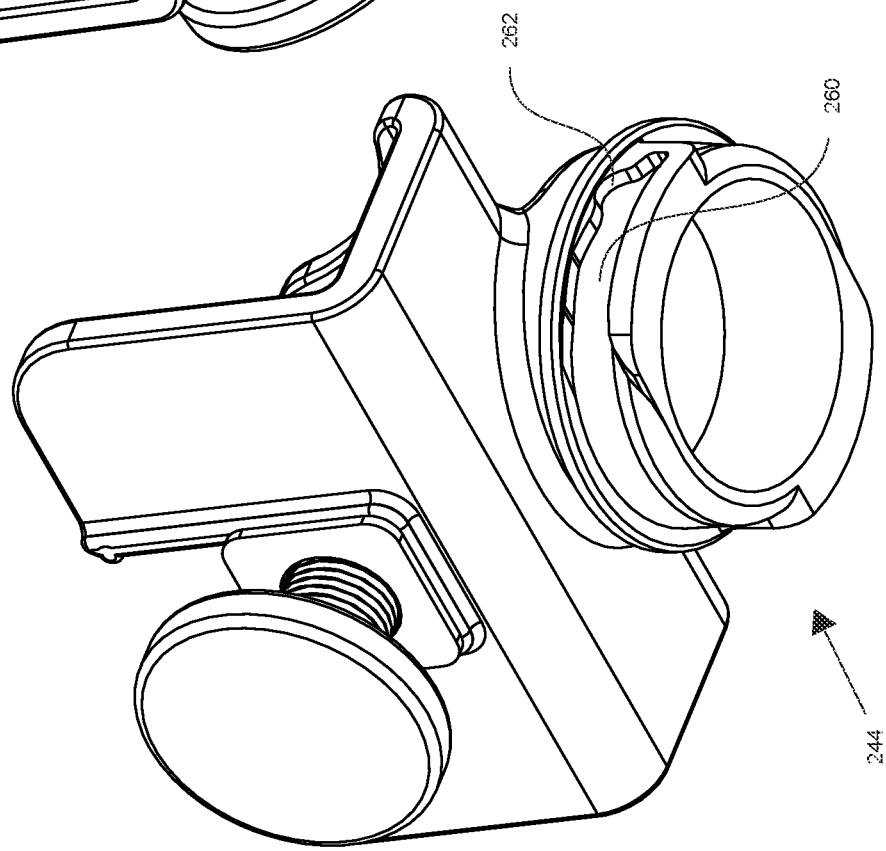
Fig. 14b
Fig. 14a

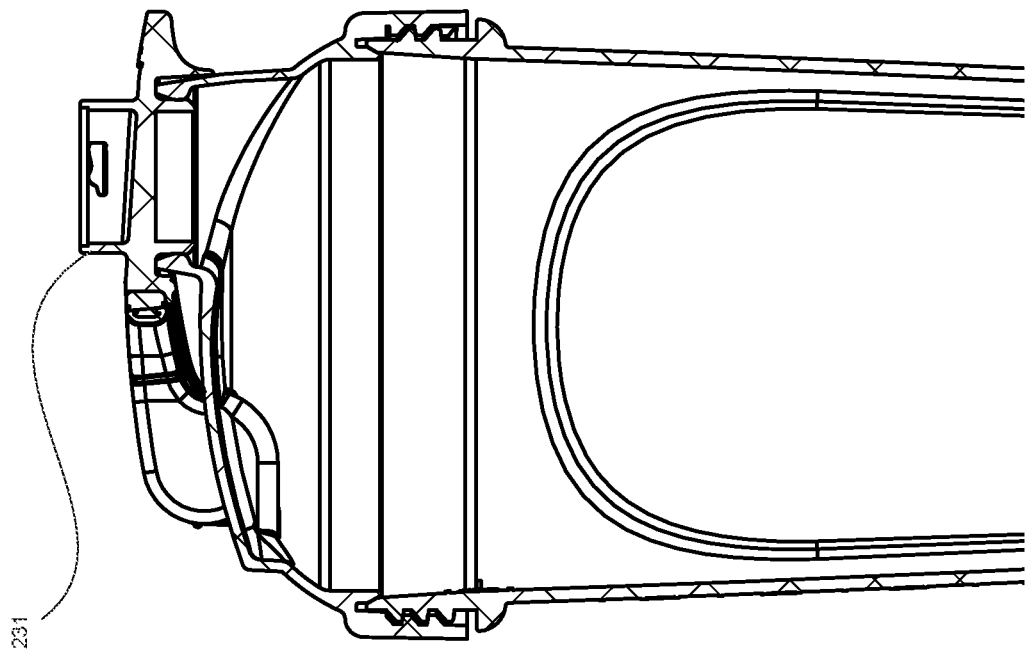
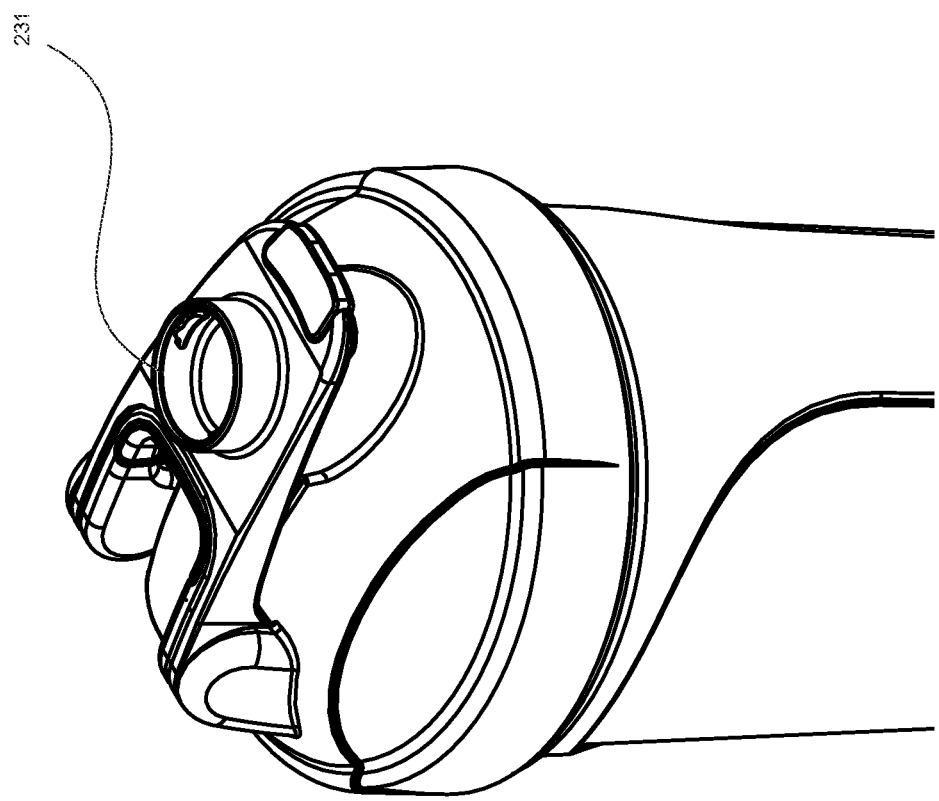
Fig. 15c
Fig. 15b

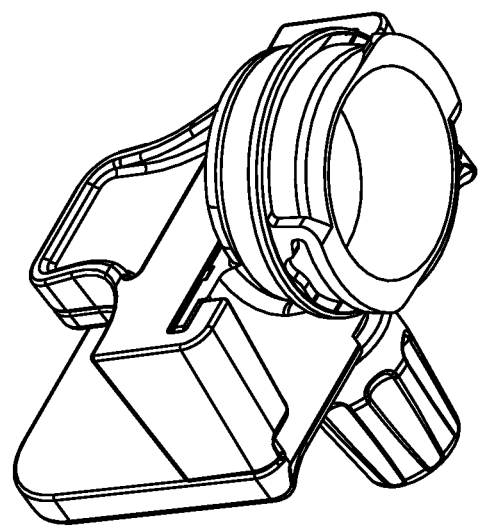
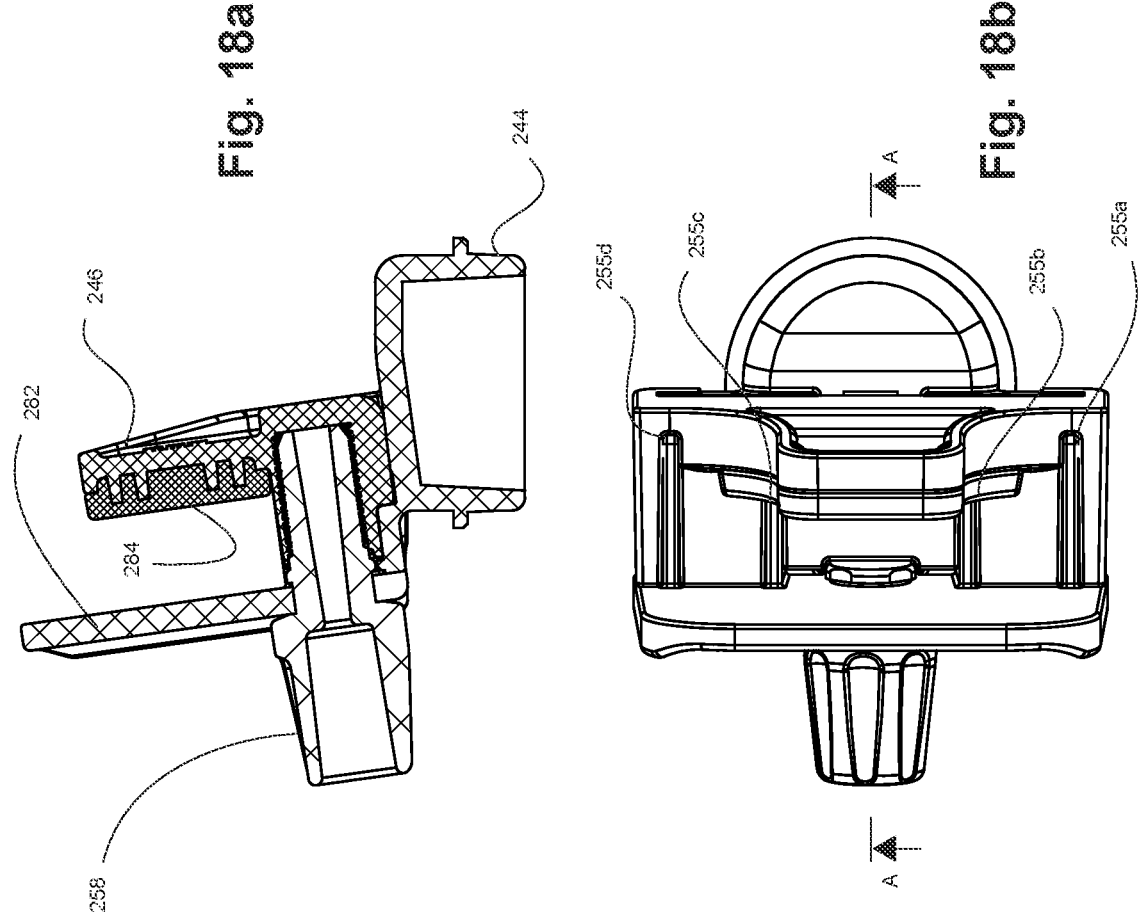

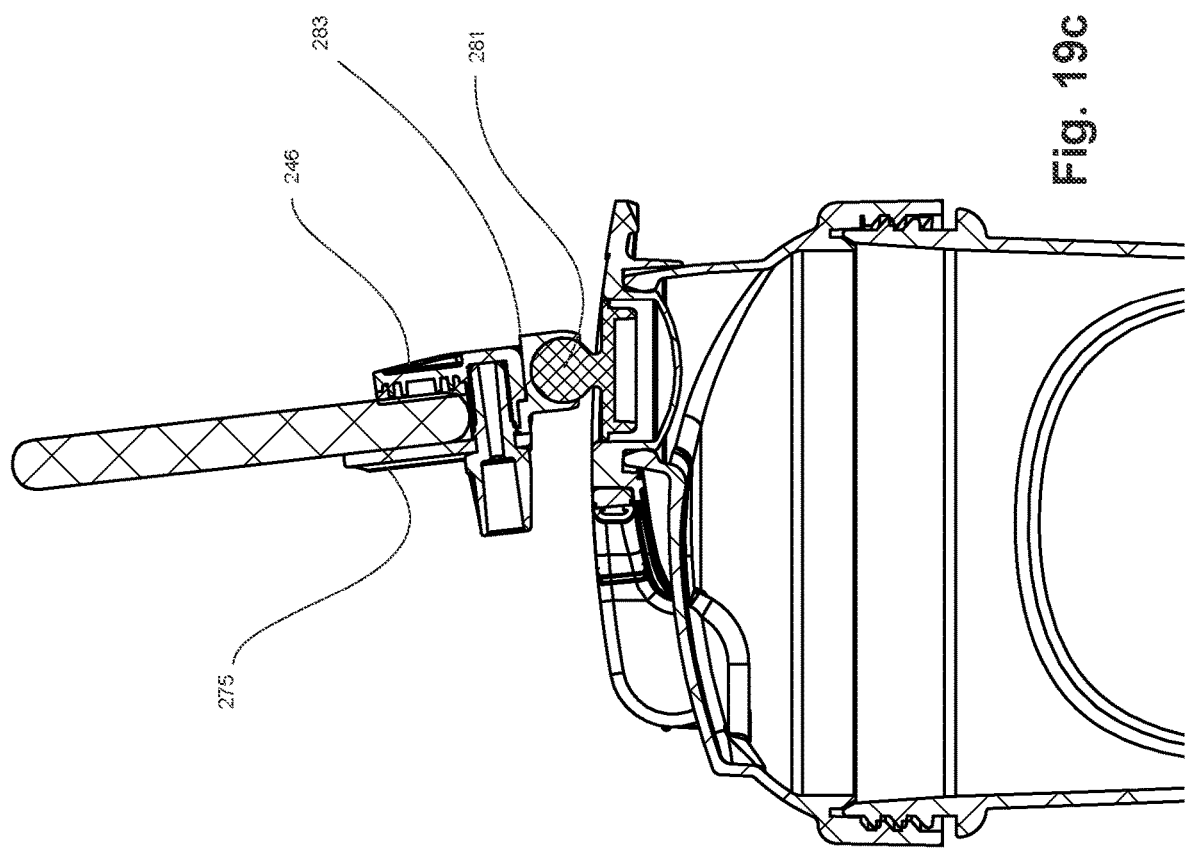

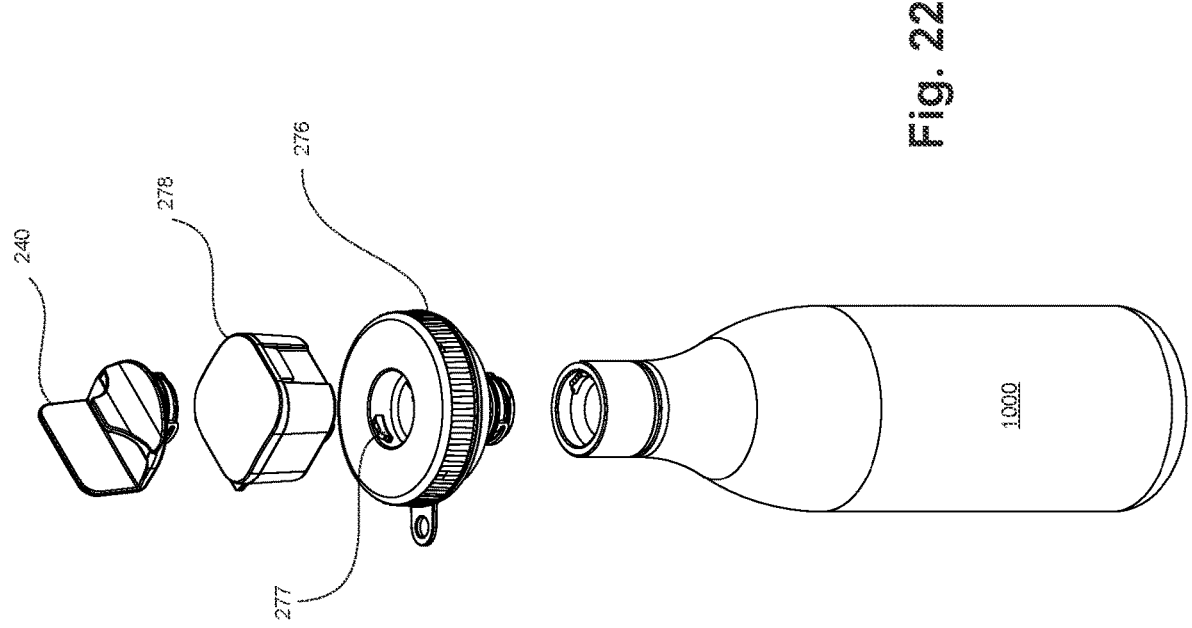

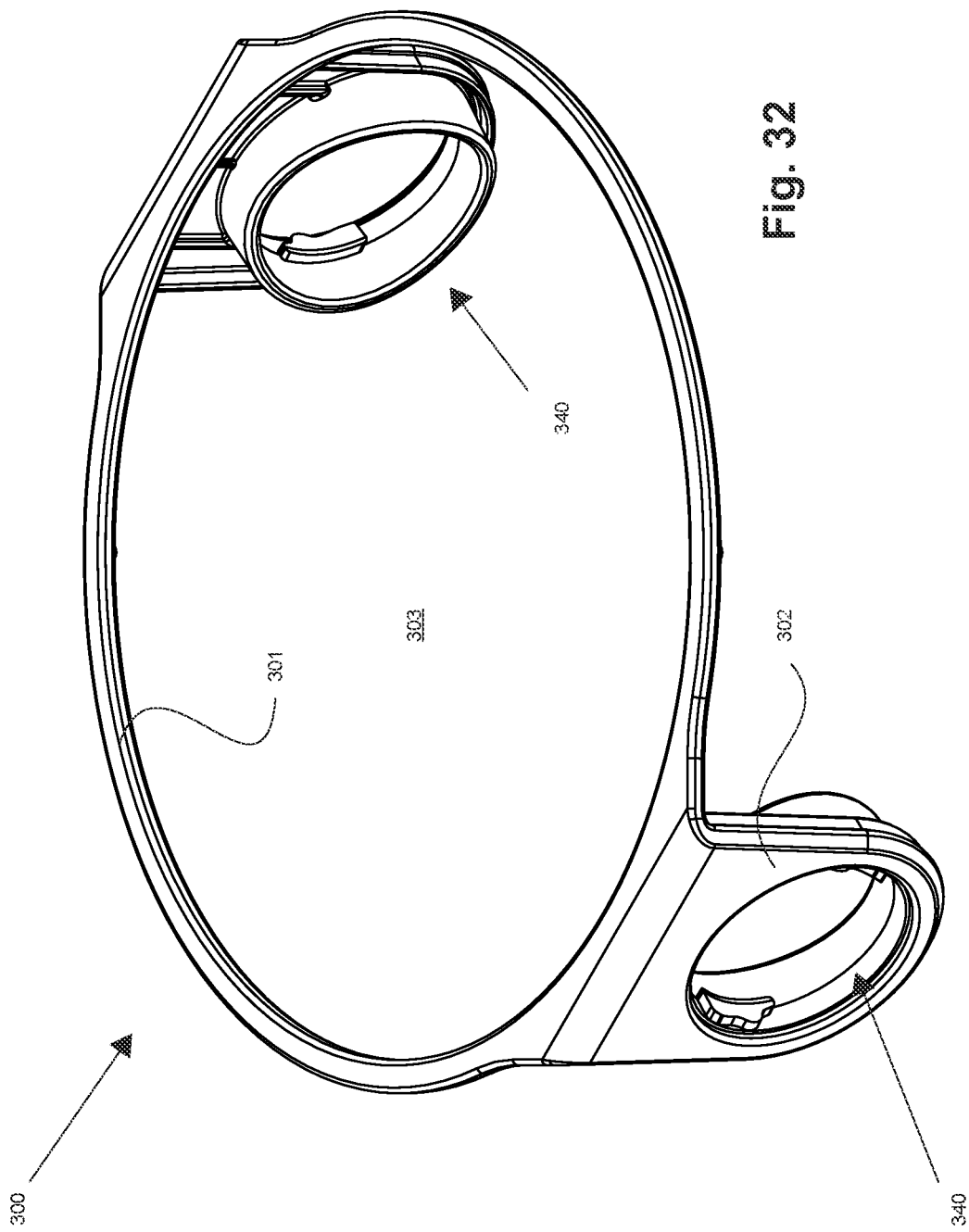

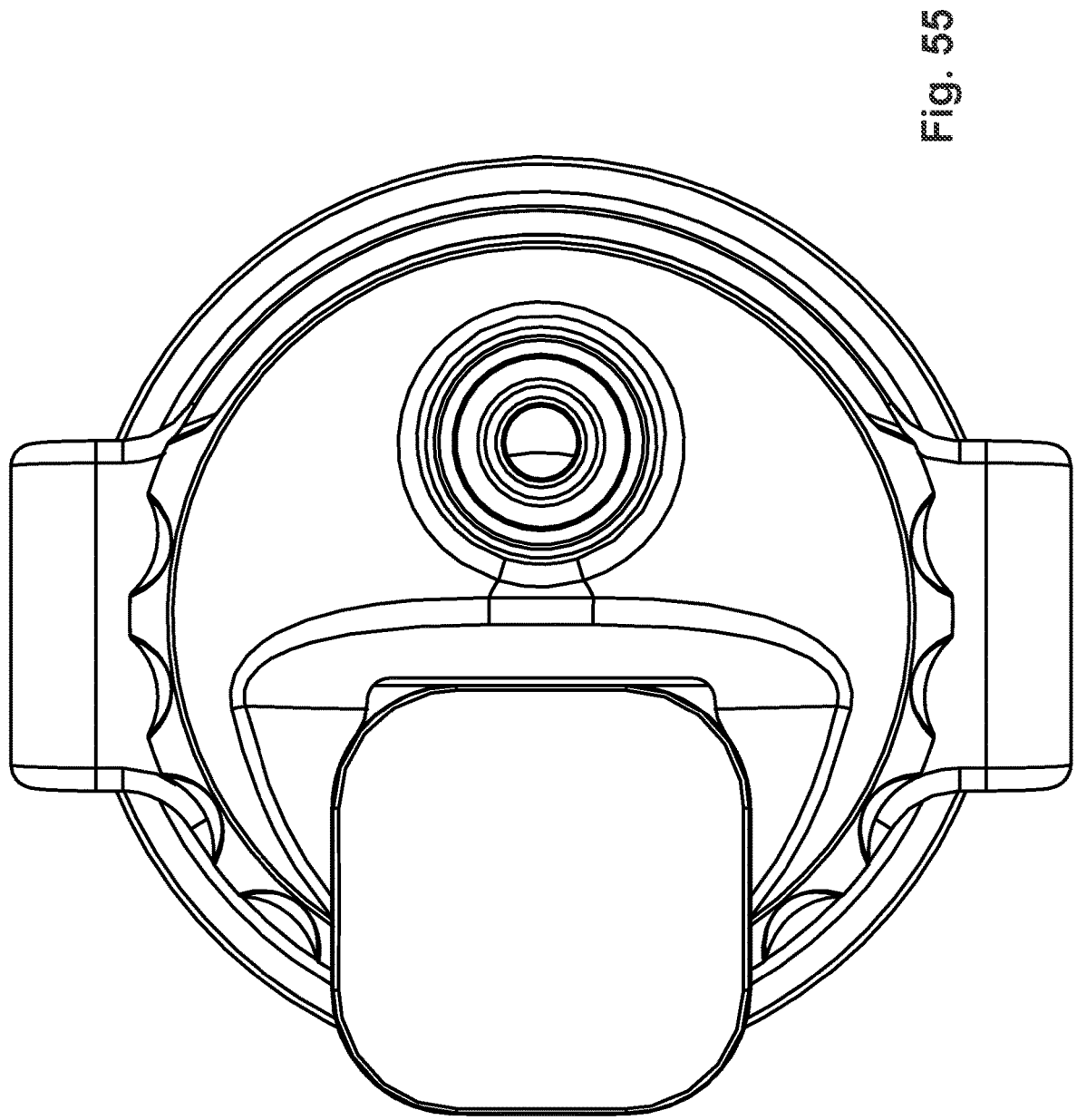

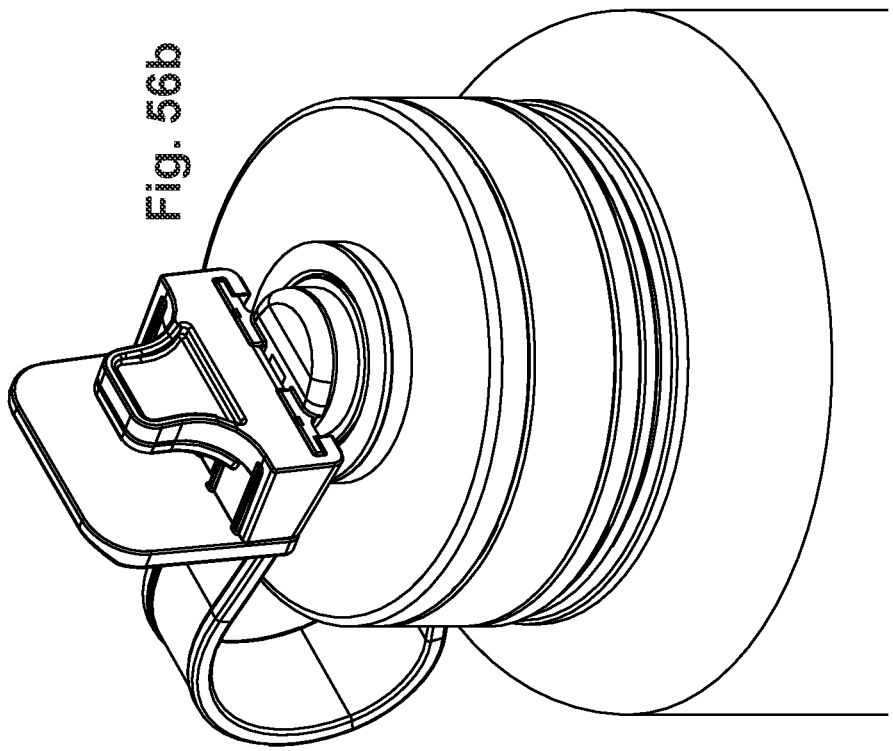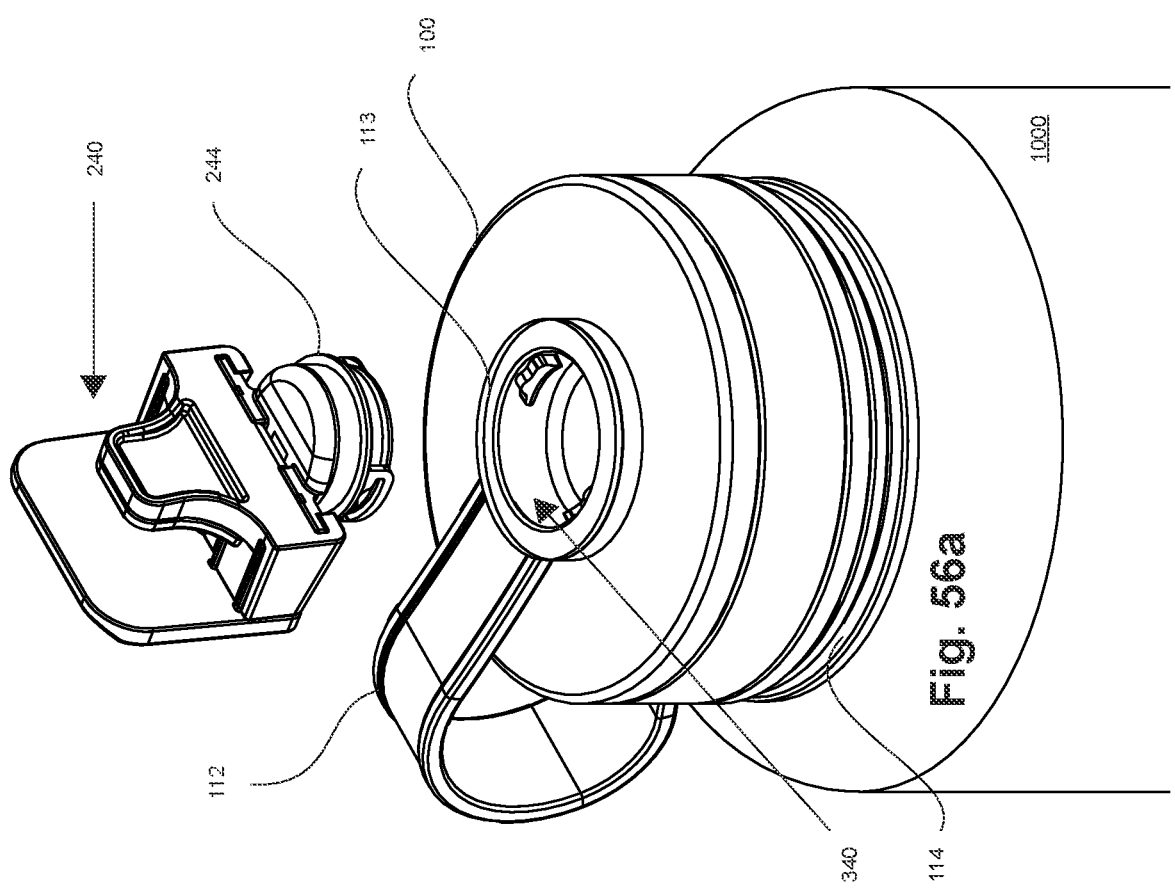

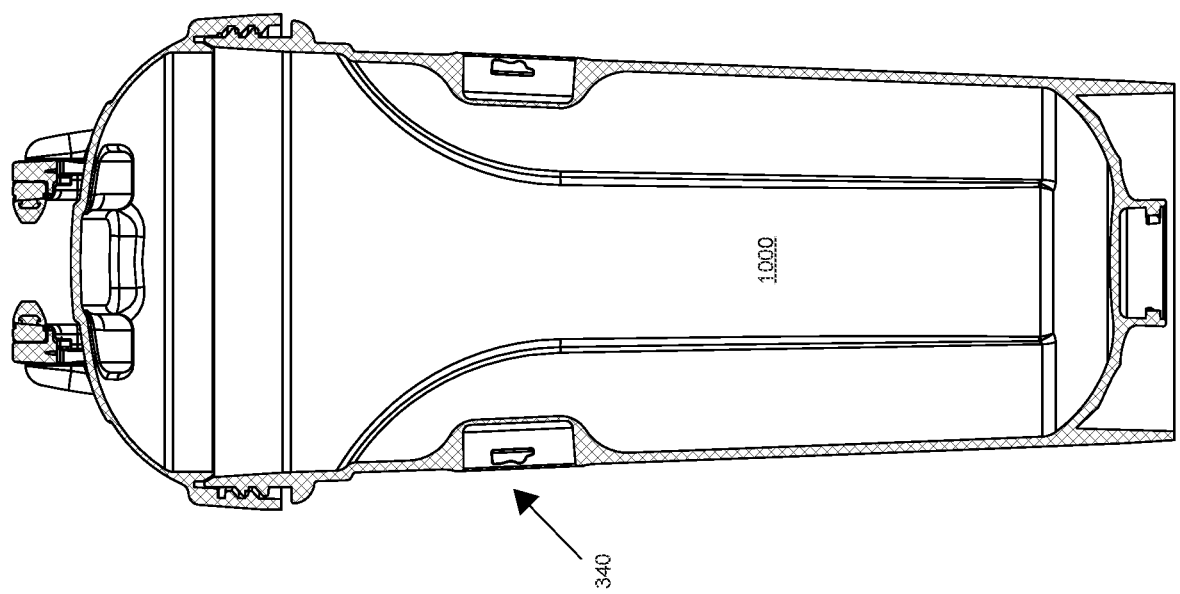

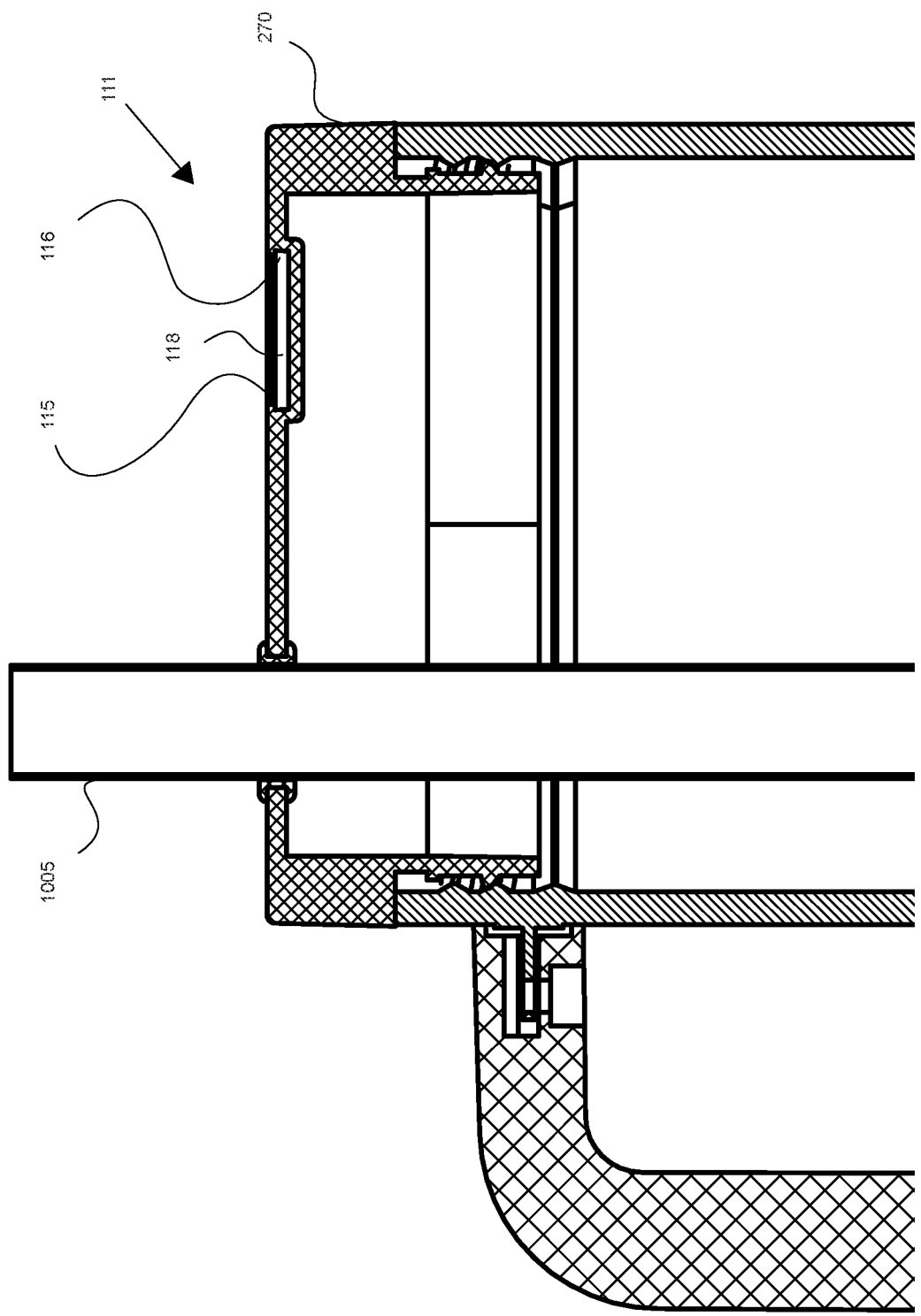

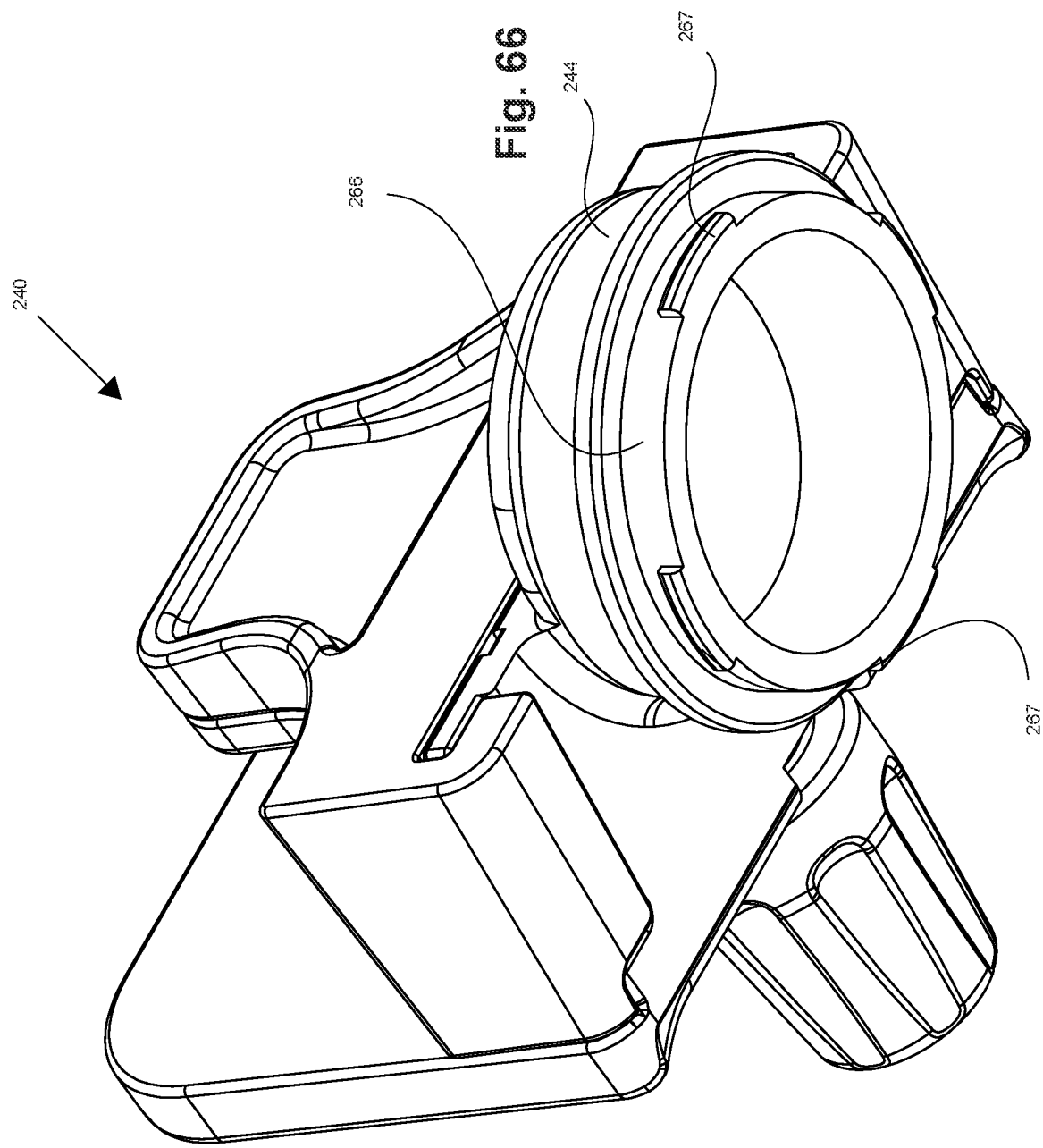

LIQUID CONTAINER WITH A UNIVERSAL ADAPTER AND ACCESSORIES THEREFOR

CROSS-REFERENCE DATA

This patent application claims a priority date benefit from the following provisional patent applications by the same inventor:

- U.S. Provisional Patent Application No. 63/465,588 filed 11 May 2023 entitled "Modular container accessory system"
- U.S. Provisional Patent Application No. 63/468,972 filed 25 May 2023, also entitled "Modular container accessory system"
- U.S. Provisional Patent Application No. 63/532,186 filed 11 Aug. 2023 entitled "Smartphone holder and stand accessory for use with a water bottle"
- U.S. Provisional Patent Application No. 63/538,947 filed 18 Sep. 2023 entitled "Stackable funnel container for use with a beverage bottle," and
- U.S. Provisional Patent Application No. 63/543,323 filed 10 Oct. 2023 entitled "Water bottle handle with a smartphone stand."

All these patent documents are incorporated herein by reference in their respective entireties.

BACKGROUND

Without limiting the scope of the invention, its background is described in connection with liquid containers for carrying and drinking water and other beverages. More particularly, the invention describes a liquid container with a universal adapter to attach a variety of accessories to the liquid container.

Liquid containers, such as water bottles, are widely used as a convenient and portable means of carrying and consuming water or other fluids on the go. From daily commutes and outdoor activities to sports events and travel, people rely on water bottles to stay hydrated throughout the day. Their popularity is driven by their practicality, eco-friendliness (in the case of reusable bottles), and the growing awareness of the importance of drinking enough water for overall health and well-being. With a variety of materials, sizes, and designs available, water bottles have become a ubiquitous accessory in modern lifestyles, promoting a more sustainable and healthier hydration habit for people around the world.

In addition to drinking water throughout the day, many users consume various vitamins, food supplements, and medication that should also be done on a specific schedule during the day. Carrying various containers and compartments filled with these items is not convenient, as small containers may be easily forgotten or misplaced. It is more convenient to associate these supplements with the liquid container as water is needed to consume these items throughout the day. Food supplements, vitamins, and medications are typically present in the form of a pill, tablet, or powder. There is a need to provide refillable containers that may be conveniently attached and detached from the liquid container so as to improve the ease of use and assure accurate and timely consumption thereof.

Another commonly used and ubiquitous item that a consumer carries around during the day is a smartphone. Hands-free use of a smartphone is convenient when watching a video, listening to music, participating in a long call or a meeting, and in other circumstances of prolonged use when holding a phone with one hand for an extended period of time is tiresome and limits the activities of a user. Frequently, the phone is used in a hand-free manner when the user needs to retain the phone reasonably close to themselves while not holding the phone in a hand, especially during a prolonged conversation. Additionally, taking a video or a photo selfie requires a phone to be retained by another item in a stable position while the user poses in front of the phone's camera. A phone stand and/or holder is usually used in these circumstances. However, carrying a phone stand everywhere is not convenient. A phone stand that is small and convenient to carry is therefore required to address this difficulty and facilitate hands-free operation of the phone on short notice and without having to plan it in advance and anticipate taking a conventional phone stand to be carried around by the user.

A variety of phone stands and holders are known in the prior art. In most cases, these devices include an upper part for attaching to a phone and a lower part acting as a base. The base is typically larger than the footprint of a phone in order to make the phone stand stable in operation. Another way to stabilize the phone is to make the lower base heavy so as to lower the center of gravity of the phone stand assembly. As a result, these devices are frequently bigger and heavier than the phone itself, making them cumbersome to use, especially when traveling.

Since both smartphones and liquid containers are used by so many people, there is a frequent need to carry both of them around. Adding a phone stand as a third item is not as convenient as it increases the size and weight of everything that the user needs to move along. The need exists, therefore, for a better way to provide a hands-free phone experience for a user when operating a phone for an extended period of time.

Yet another conventional item that most people carry around is a wallet. When in a gym or a pool, the user may not be able to carry the wallet in a pocket. However, the user may typically carry a water bottle. The need, therefore, exists for a better way to carry around a wallet during a period of exercise, or just traveling outside the home. Overall, the need exists for a liquid container configured for an easy attachment of a variety of accessories that are commonly carried around by most users.

SUMMARY

Accordingly, it is an object of the present invention to overcome these and other drawbacks of the prior art by providing a novel liquid container equipped with at least one universal adapter configured for easy attachment and removal of a variety of accessories thereto.

It is another object of the present invention to provide a novel liquid container that is configured to stand upright, wherein the universal adapter is positioned to not tilt the container out of balance when an accessory is attached thereto, regardless of whether the liquid container is full or empty.

It is a further object of the present invention to provide a liquid container in which the universal adapter is positioned in such a manner as to not obstruct the spout of the container and interfere with the action of drinking the fluid out of the container when the accessory is attached thereto.

It is yet a further object of the present invention to provide a liquid container with a plurality of various accessories that may be used by a user of the container throughout the day.

The liquid container of the invention may include an elongated liquid vessel having a hollow body with an outer wall and a spout on a first end thereof. The vessel may have a bottom configured to support the liquid container in an upright position.

The liquid container may further include one or several identical universal adapters positioned on the vessel or elements thereof as described below. The universal adapter may be designed and configured to releasably attach an accessory thereto. This may be accomplished by providing the universal adapter with a first attachment face which may cooperate with the complementary second attachment face of the accessory to facilitate attachment and detachment of the accessory to the liquid container. Various types of quick-connect mechanical attachments may be implemented for the purposes of this invention. Attachments and base portions may engage through: protrusions, keys, and/or key locks, threading, flanges, snaps, interference fits, and any other suitable engagement and/or fastening means. The scope of the invention is, therefore, indicated by the appended claims rather than by the foregoing description. All changes which come within the meaning and range of equivalency of the claims are to be embraced within their scope. Importantly, all accessories have the same second attachment face, making them interchangeable in their attachment to the first attachment face of the universal adapter.

Various accessories are contemplated by the present invention, including a phone holder and stand, a pill box, a powder container with a funneled end, a money clip, and a wallet.

The universal adapter may be positioned on various elements of the liquid container, such as a spout cover, a flip cap, a lid, a handle, or an annular member positioned and retained between the lid and the liquid vessel. In embodiments, the universal adapter may be positioned and oriented to support the accessory attached thereto, oriented along or transversely to the central axis of the liquid vessel. In further embodiments, the position of the universal adapter may be selected to avoid interference of the attached accessory with using the liquid container to drink the fluid therefrom.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIGS. 11a and 11b show enlarged side and back views of the phone holder and stand accessory.

FIGS. 13a and 13b show a top view and a cross-sectional side view of the same.

FIGS. 14a and 14b show two perspective bottom views of the same.

FIGS. 15b and 15c show a perspective and cross-sectional side view of yet another alternative flip cap design with the universal adapter raised above the flip cap.

FIGS. 18a to 18c show a cross-sectional view, a top view, and another perspective view of the same.

FIG. 19c shows a cross-sectional view of the same.

FIG. 22 shows an example of a stack-up of more than one accessory attached to a single universal adapter.

FIG. 32 shows a perspective side view of the annular member having two universal adapters positioned along the perimeter thereof.

FIG. 55 shows a top view of the same.

FIGS. 56a and 56b show a perspective exploded view and a perspective assembled view of yet another embodiment of the present invention.

FIG. 62 is a cross-sectional side view the same embodiment.

FIG. 65 shows a close-up cross-sectional view of the same.

FIG. 66 shows a perspective view of the second attachment face for the phone holder and stand accessory using the snap universal adapter as in FIG. 64.

DETAILED DESCRIPTION OF PREFERRED EMBODIMENTS OF THE INVENTION

Figure 1:
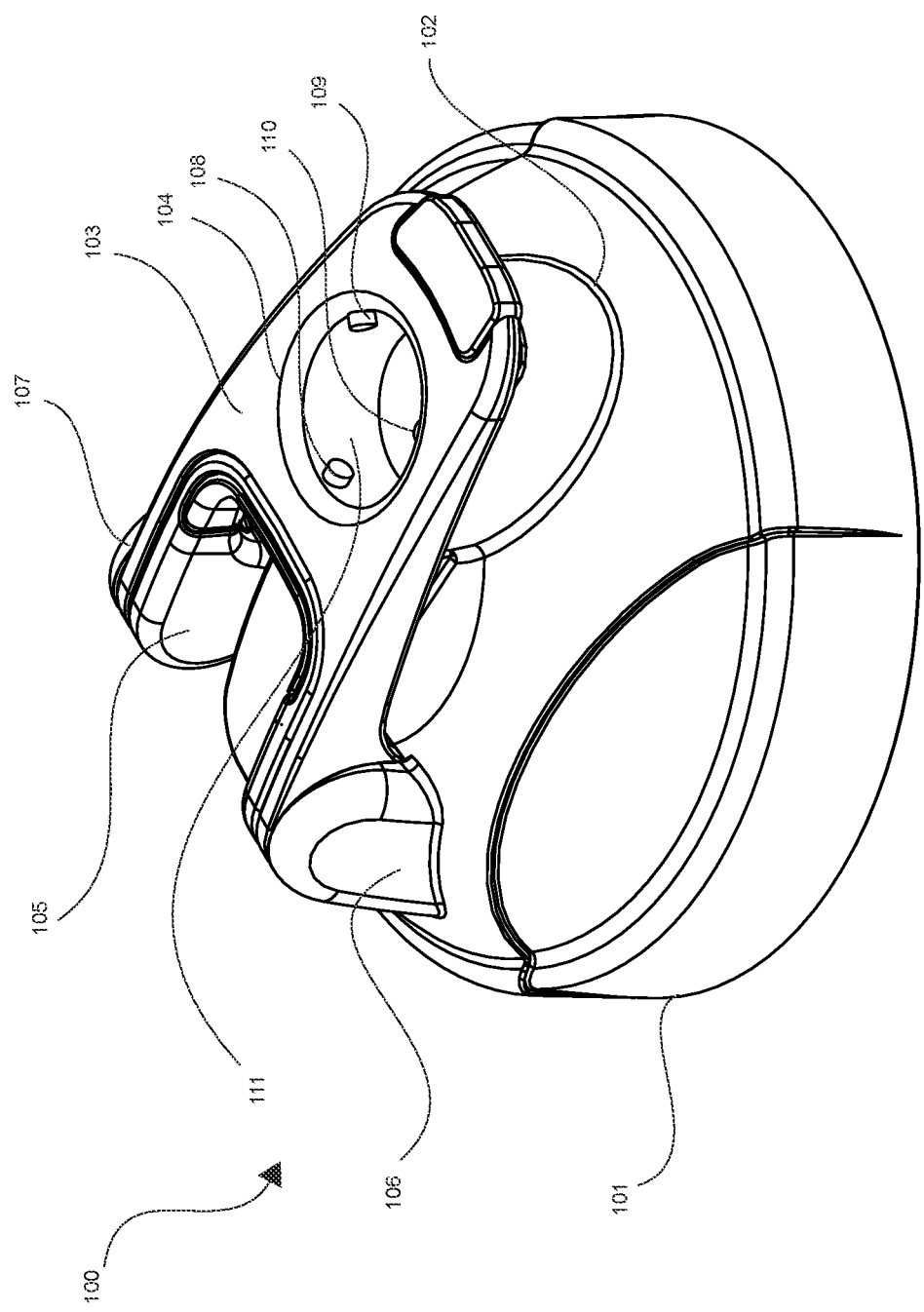
FIG. 1 is a perspective view of the universal adapter attached to a flip cap of the lid for the liquid container of the present invention.

The following description sets forth various examples along with specific details to provide a thorough understanding of claimed subject matter. It will be understood by those skilled in the art, however, that claimed subject matter may be practiced without one or more of the specific details disclosed herein. Further, in some circumstances, well-known methods, procedures, systems, components and/or circuits have not been described in detail in order to avoid unnecessarily obscuring the claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Figure 9C:
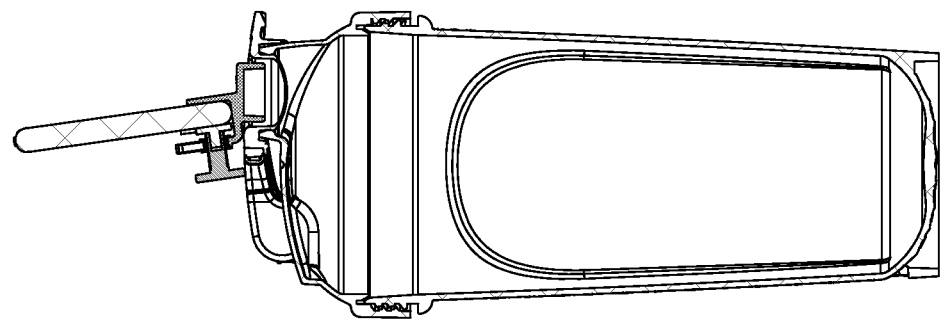
FIGS. 9a, 9b, and 9c show various side views of the liquid container with an attached phone holder and stand accessory in use with a smartphone therein.
Figure 9B:
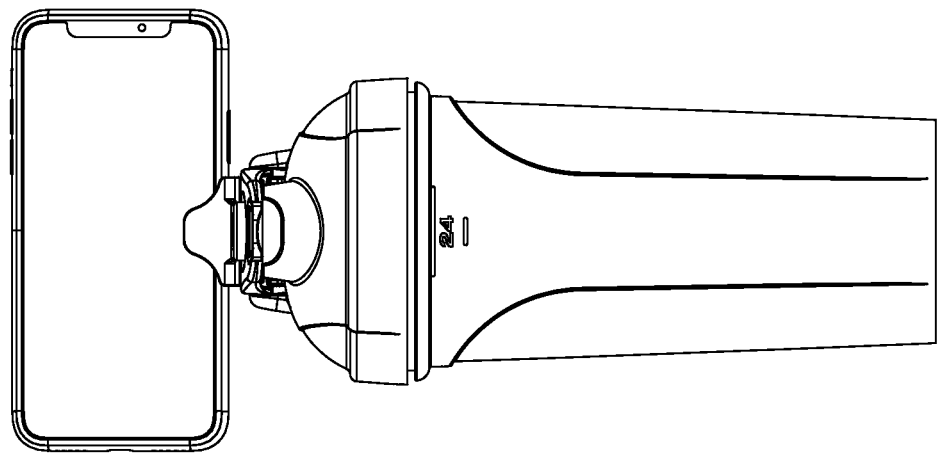
Figure 9A:
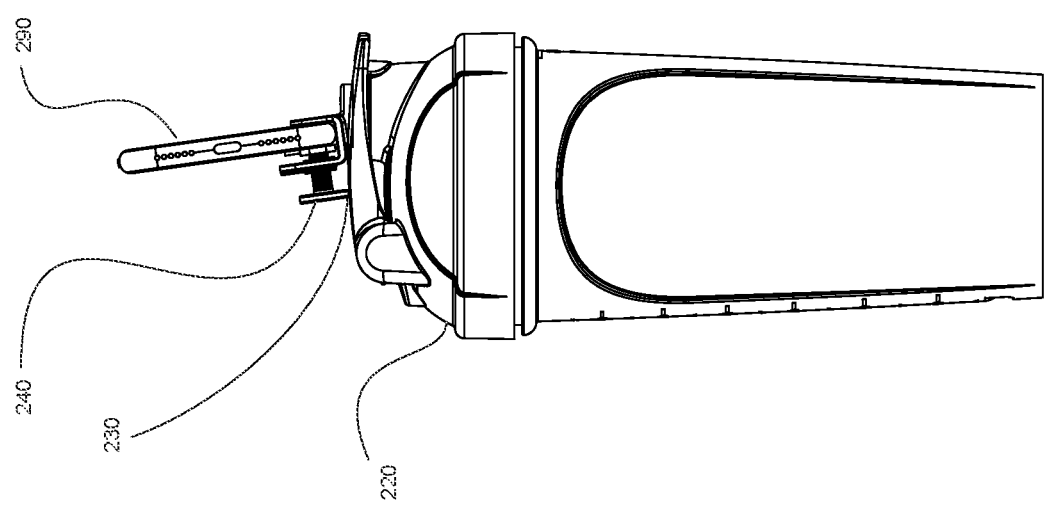

The liquid container of the invention may include an elongated liquid vessel, such as elongated liquid vessel 1000, seen in FIG. 9a. While in some embodiments, the liquid vessel may be made from metal or plastic and may be reusable, the invention is not limited thereto. A disposable liquid vessel may also be used for the present invention. Appropriate indicia indicating the volume of remaining fluid inside the liquid vessel may be provided on the outer wall thereof if the vessel is made from a transparent or at least a semi-transparent material.

The liquid container of the invention may be a thermos or another insulated beverage holder. Such containers may include, in one example, a double-wall construction in which an internal beverage container made from stainless steel or glass is surrounded by an outside shell made from stainless steel or plastic and spaced away from the internal beverage container to form an insulating air gap. Other designs of insulated containers are also contemplated to be included in the scope of the present invention.

Liquid containers of the invention may come in different sizes, holding various volumes of fluids, starting from a few ounces and up to one or more gallons, as the invention is not limited in this regard.

In general, the elongated liquid vessel may be formed to have a hollow body with an outer wall and a spout on a first end thereof. The liquid vessel may also have a bottom configured to support the liquid vessel in an upright position. To that end, the bottom may be flat or may have an edge extending down from the outer wall and terminating with a flat edge so as to support the vessel upright. In other embodiments, several downward protrusions or "feet" extending from the outer wall may be arranged around the bottom of the liquid container to provide a support basis to keep the container in an upright position.

The open spout of the liquid vessel may be closed off by any one of the known devices. In embodiments, a removable spout cover may be provided, such as spout cover 270, seen in FIG. 21*b* having a threaded attachment to the liquid container adjacent to the spout thereof. The term "spout" includes any opening that is configured to facilitate access to the fluid inside the container. Examples of what is included in the term "spout" are an opening for a straw, an elongated tube incorporated with the top of the container, and other designs facilitating liquid passing in and out of the container's internal volume.

In other embodiments, the spout cover may be loosely attached to the liquid container using a flexible string. In further embodiments, the spout cover may be equipped with a compressible gasket so as to fit inside the spout opening with some friction to be retained therein. The spout cover may be, therefore, generally configured to releasably close off the spout in a liquid-tight manner. The spout cover may also be configured to be removed from the spout to provide access to the fluid inside the liquid container.

In further embodiments, the liquid container may include a lid configured to be attached to the liquid container at the first end thereof. The lid may be further configured to releasably close off the spout in a liquid-tight manner, such as a lid 100 seen in FIG. 1. In embodiments, a flip cap, rotatably attached to the lid to allow pivoting up and down, may be operated between a closed position and an opened position to allow access to the spout of the liquid container. In further embodiments, the lid itself may feature a second spout configured to facilitate drinking from the liquid container when the lid is attached thereto. A dedicated lid spout cover or a flip cap may also be provided to close off and isolate the fluid in the liquid vessel, as the invention is not limited in this regard.

Other components and elements of the liquid container may include a side handle attached to the outer wall of the liquid vessel. These and other elements are described below in connection to the universal adapter location options.

The main novelty of the present invention is the universal adapter configured to quickly connect and disconnect a plurality of accessories to the liquid container. The universal adapter may include a first attachment face and a body incorporated with or attached to any of the elements of the liquid container described below in greater detail. The first attachment face may cooperate with a complementary second attachment face incorporated with the accessory so as to support rapid attachment and removal of the accessory from the liquid container.

The universal adapter may be sized to be compact and not exceed 1.5 inches in any dimension, such as diameter, length, width, or height thereof. In embodiments, the universal adapter may be positioned in an adapter cavity formed in the spout cover, the flip cap, the lid, or the handle such that the first attachment face is flush with an adjacent surface surrounding the adapter cavity, so the universal adapter does not protrude above the surrounding surface. This improves the convenience of using the invention, as when no accessory is attached to the universal adapter, its presence does not impede the normal use of the components of the liquid container.

Improvements in ease of use are facilitated in the following ways:
- it makes the invention more compact in some circumstances, such as when positioning the universal adapter on the flip cap. The cavity in which the universal adapter may be located already exists, and therefore there is no need to add extra space for the adapter. This is advantageous when multiple lids are stacked for storage, as users often have many shaker bottles,
- users often shut the flip cap by pressing down on it. In other circumstances, the lids may be closed by applying downward force and turning. Positioning the universal adapter flush with the lid or the flip cap poses no issues with this use of the product. If the universal adapter protrudes above the surface of the flip cap, it may interfere with applying downward pressure on the cap and may make it uncomfortable. Flip caps typically take about 6 lbs to about 14 lbs of force to shut. They need to be shut tight so that when the shaker bottle is shaken very hard to mix the contents, the flip cap does not accidentally pop open. Pushing down with high force using only a few fingers requires a smooth surface which can be provided with the present invention,
- a universal adapter that is flush with the flip cap reduces the height of the attachment protruding above the liquid container. A lower seated accessory with no or minimal protrusion above the liquid container would have a stronger connection with the container, lower the risk of breaking off, and improve stability,
- reducing the overall height of the liquid container as well as the lower position of the phone compared with other stands known in the art improves the balance of the liquid container when standing up. If the liquid vessel is empty, raising the phone too high above the liquid vessel may increase the risk of it tipping over and falling down, which may damage the phone or expose it to the liquid spilling from the spout. Positioning the phone in the manner described herein assures a desired balance between the best possible stability and ease of accessing and observing the phone by the user.

Various types of quick-connect attachment types may be used for the design of the first attachment face and a second attachment face. In one example, the attachment principle may be a slide-and-lock concept, in which the second face may be configured to slide sideways and engage with the first attachment face. A release tab may be provided on either the first attachment face or the second attachment face to disengage the accessory and slide it off the first attachment face.

In another example, a twist-and-lock or a bayonet arrangement may be used to facilitate the second attachment face to engage with and remain locked after a quarter- or a half-turn, as described in greater detail below.

In yet a further example, a snap-and-lock design may be used in which the second attachment face has an engagement feature protruding therefrom and into a matching depression in the first attachment face. Bringing two attachment faces together may cause the protrusion to snap in place and retain the accessory on the liquid container. An optional release tab or lever may be provided to disconnect the accessory from the liquid container.

These and other quick-connect designs may all be used for the purposes of the present invention, as the invention is not limited in this regard.

The following are specific examples of universal adapter designs and attachment arrangements useful for the purposes of the present invention.

Universal Adapter Positioned on a Flip Cap

Figure 3:
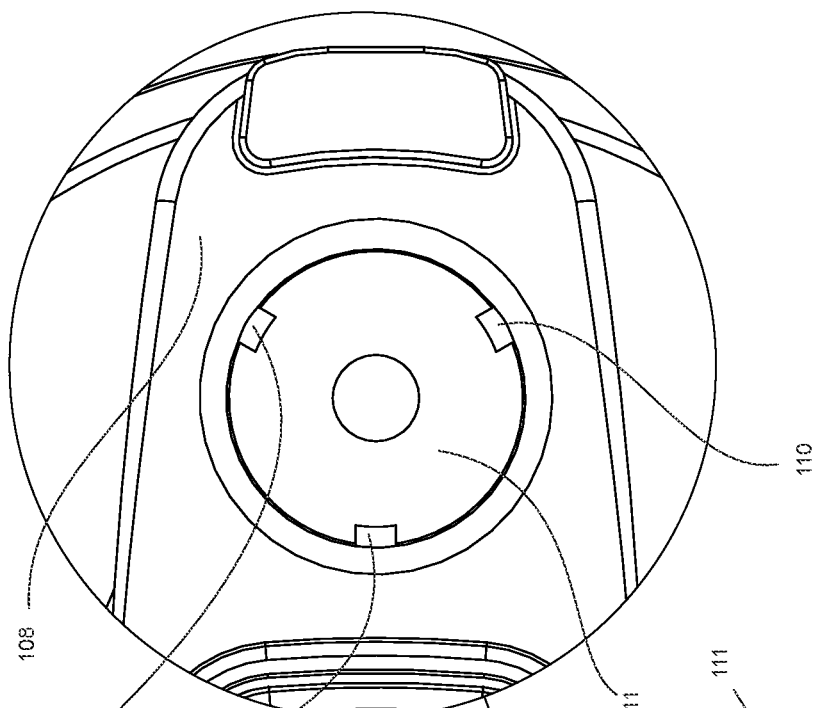
FIG. 3 is an enlarged view of the detail encircled in FIG. 2.
Figure 2:
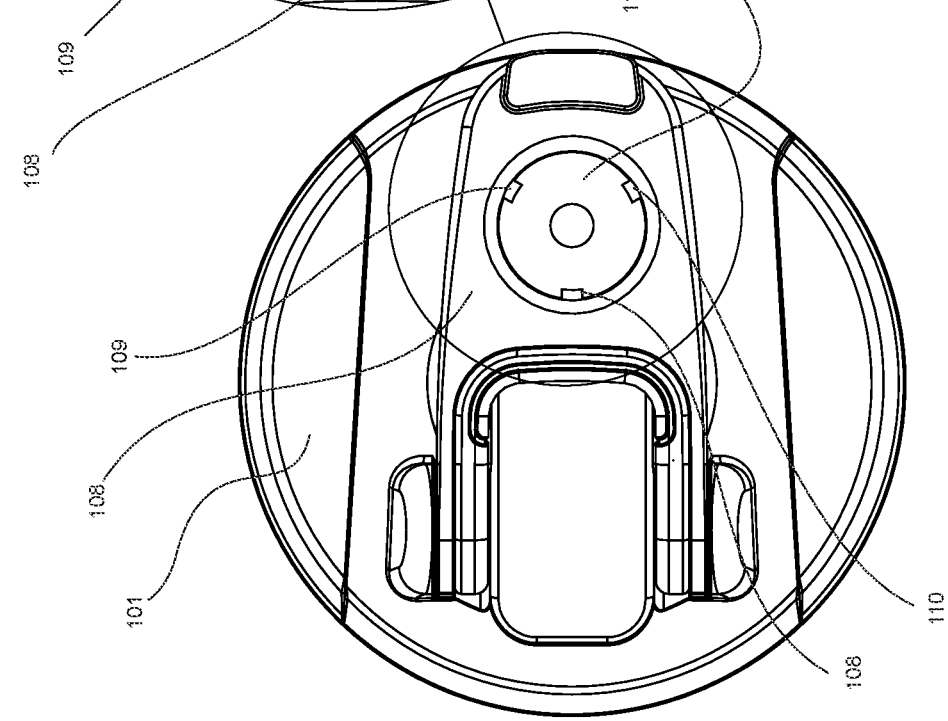
FIG. 2 is a top view of the embodiment of FIG. 1.

FIGS. 1-8 illustrate the concept of a universal adapter positioned on a flip cap of the liquid container. Embodiments discussed below may depict certain designs of flip cap lids similar to those set forth in further detail in US Patents Nos. 18,117,501; 29/883,861; and Ser. No. 29/885,472, which are hereby expressly incorporated herein. However, any number of other containers and/or lid bodies with different shapes and/or configurations may be used for the present invention without departing from the purposes or scope of the invention. Referring now to FIGS. 1-3, the liquid container may include a lid 100 with a lid body 101 having a drinking spout 102 and a flip cap body 103 with a pivotable closure 104 for the drinking spout 102, and an optional pivotable ring (or carry loop) 105. The lid body 101 may have a first, integral projection 106 that extends from and above a top surface of the lid body 101 opposite and in-line with a second integral projection 107 that also extends from the top surface of the lid body 101. The first and second projections 106 and 107 may alternatively be referred to herein as "ears." The first and second integral projections 106 and 107 may have fastener portions configured to facilitate pivotable attachment of the flip cap body 103 and/or the carry loop 105 to the lid body 101. A flip cap's first attachment face 111 may be located on the flip cap 103 and adjacent to and/or combined with pivotable closure 104. In embodiments, when the accessory is attached to the flip cap, it does not restrict at least the first 75% or more of the opening motion of the flip cap away from the spout.

This embodiment also features a nested carry loop 105, which can be rotated and positioned at any desired angle for conveniently carrying the liquid container. The carry loop 105 rotates about the same axis as the flip cap body 103 and may be stored within the cut-out in the flip cap which, in turn, may be sized to accept the carry loop inside thereof. Not only does this design increase the range of rotation of the carry loop 105, but it also avoids limiting the motion of the flip cap body 103 when opening the spout by preventing any interference with the carry loop 105—a typical limitation of other liquid containers known in the art. In addition, the carry loop cutout may be made in the flip cap body in such a manner as to avoid overlapping with the first attachment face, as seen in FIG. 1. Both the carry loop 105 and the flip cap body 103 can rotate about the same axis independently of one another. As a result, the flip cap body 103 may be rotated all the way from a closed position over the spout of the liquid vessel to the position at least 90 degrees out, or in other embodiments, at least 120 degrees out, at least 150 degrees out or even at least 180 degrees out—such that the flip cap is entirely out of the way of the user when drinking from the elongated liquid vessel 1000. Separating the carry loop cutout and the first attachment face 111 formed in the suitable recess along the length of the flip cap further allows a full motion of the flip cap with or without any accessory attached to the universal adapter.

Flip cap's first attachment face 111 may form part or all of the first attachment face of the universal adapter of the present invention. In other embodiments, the first attachment face may be located elsewhere on the lid, container, and/or structural portions. In the illustrated embodiment, the first attachment face includes a first attachment face 111 with an outside circular edge having one or more protrusions 108, 109, 110. The recess of the illustrated embodiment shows a plurality of protrusions on the outside edge, comprised of the first protrusion 108, the second protrusion 109, and the third protrusion 110 that may be circumferentially located and may be equidistant from each other.

Figure 4:
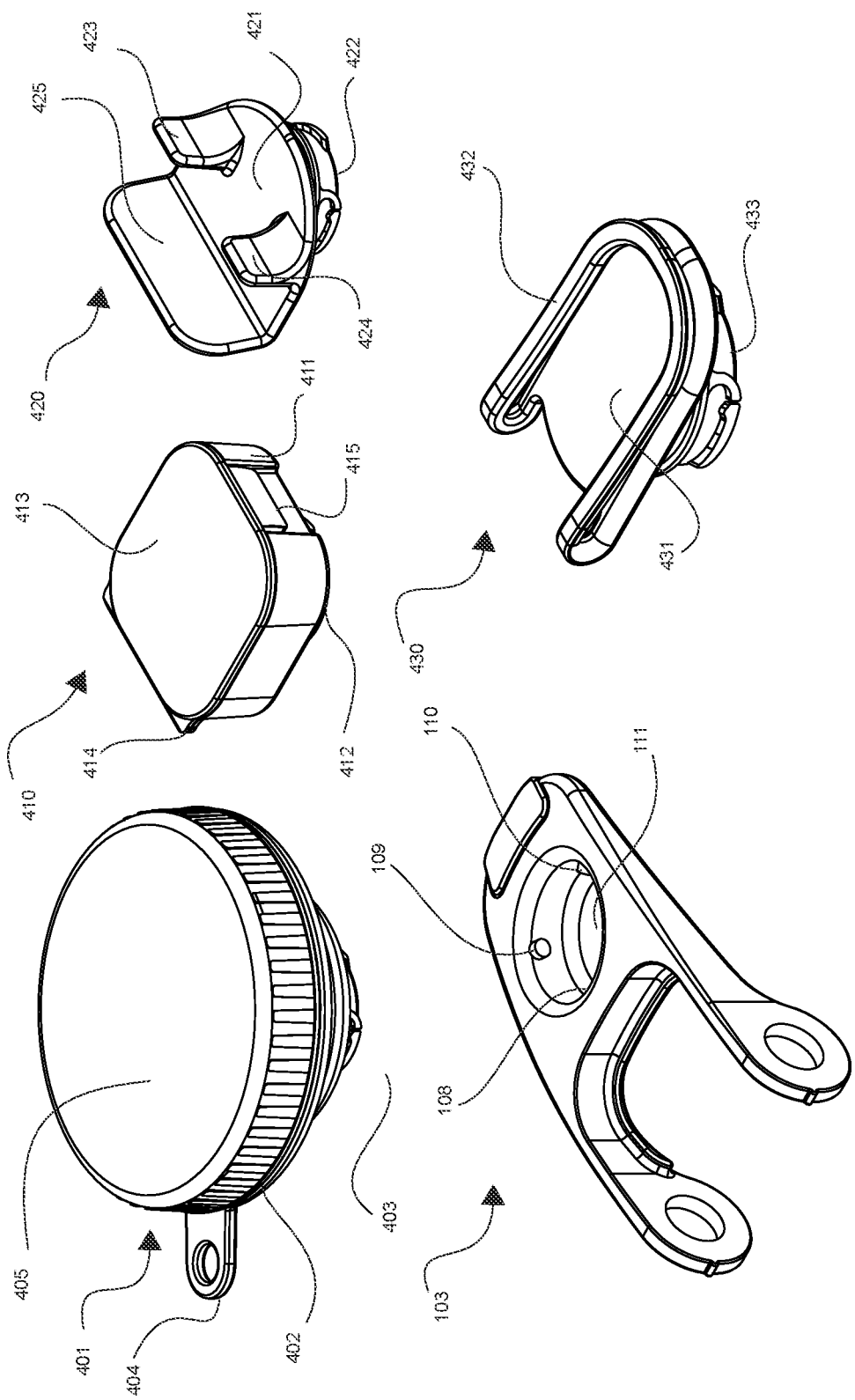
FIG. 4 is a perspective view of various exemplary accessories of the invention.

Referring now to FIG. 4, a plurality of available accessories equipped with the second engagement face may include one or more accessories 401, 410, 420, and 430 configured to have a second attachment face designed to partially insert into the first attachment face 111 and releasably attach to the first attachment face. Such accessories may include one or more of a funneled container 401, a pill box 410, a phone holder and stand 420, and/or a money clip 430. Funneled container 401 may include a funnel body 402, lid 405, which may attach to the funnel body 402 by threaded or other means, an attachment loop 404, and a second attachment face 403 configured to releasably attach to the first attachment face of the universal adapter. The pill box 410 may include a body 411, lid 413, hinge connecting the body and lid 414, latching means 415, and a second attachment face 412 configured to releasably attach to the first attachment face of the universal adapter. The phone holder and stand accessory 420 may have a first generally planar surface 421, two or more perpendicular surfaces 423, 424, 425 configured to bound a mobile device, and a second attachment face 422 configured to releasably attach to the base portion of the modular container accessory system. The money clip 430 may have a first generally planar surface 431, a retention means 432, and a second attachment face 433 configured to releasably attach to the first attachment face. These and other accessories are described below in other parts of the specification in greater detail.

Figure 5:
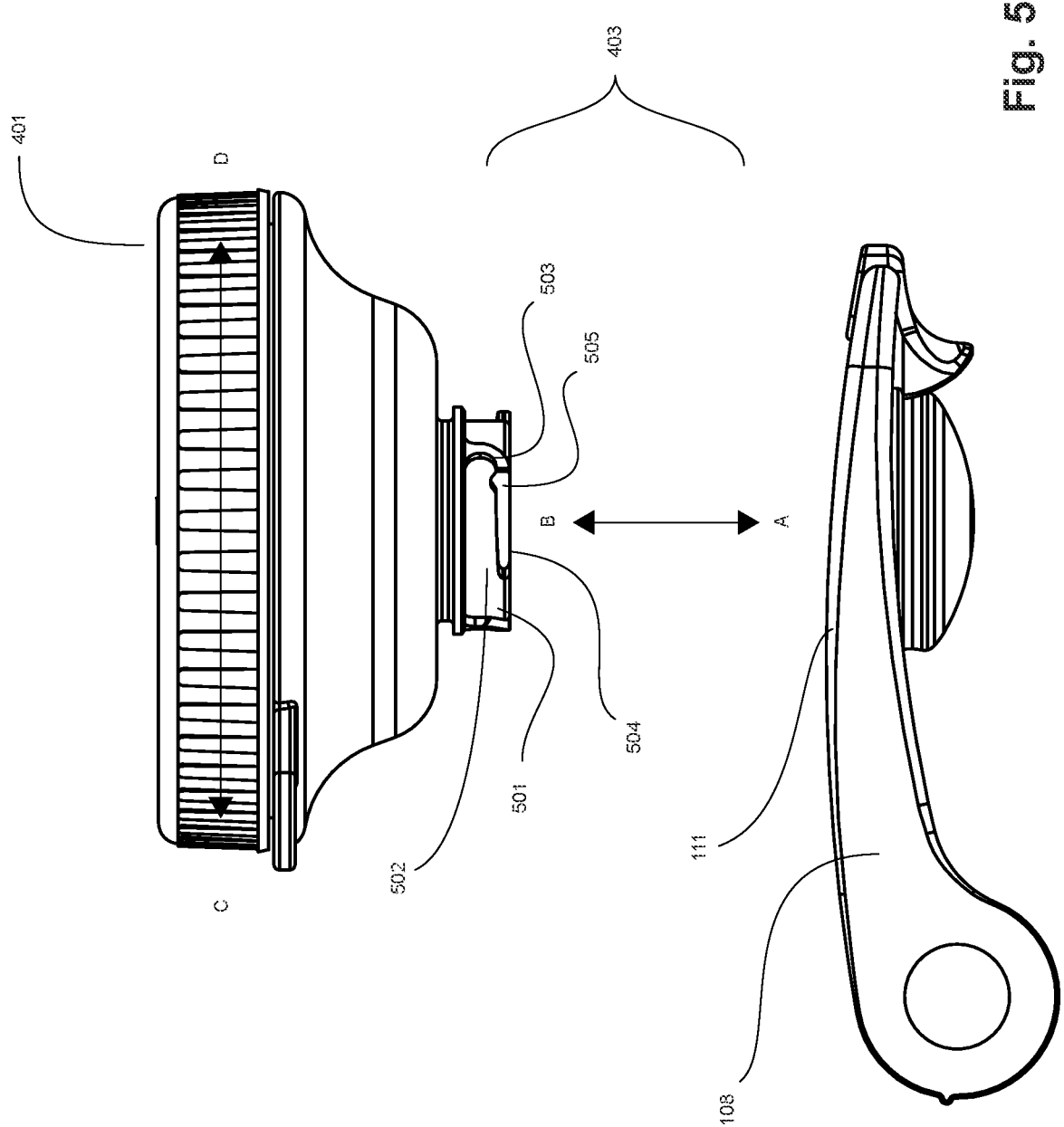
FIG. 5 is a side view of one accessory and a flip cap configured therefor.
Figure 6:
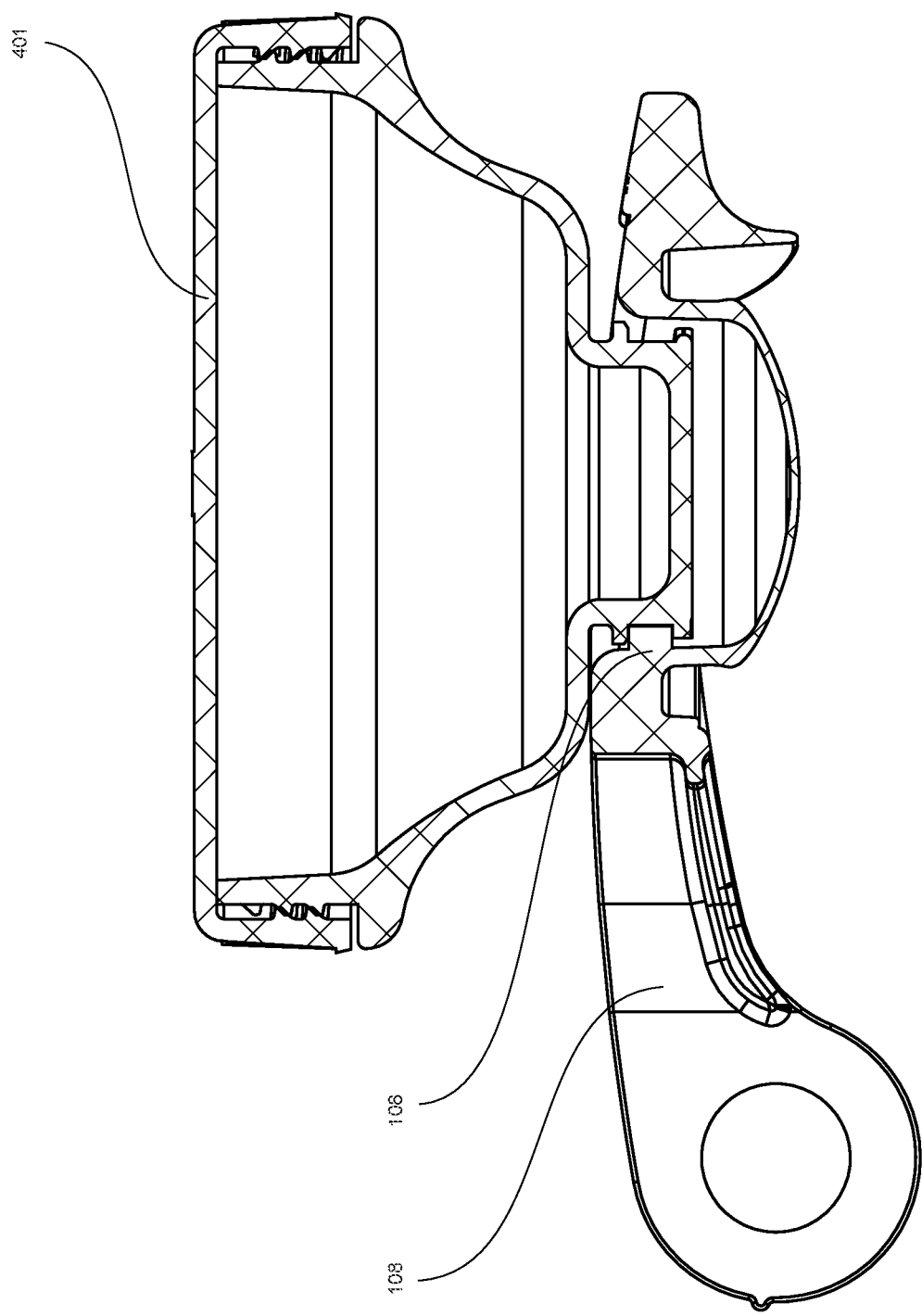
FIG. 6 is a cross-section view of the same accessory attached to the flip cap of the liquid container.

Referring now to FIGS. 5 and 6, the second attachment face of a particular accessory (e.g., 401, 412, 422, 433) may have one or more elongated recesses 502 with an opening 501 at a first end, a stop at a second end 503, and a ramp 504 with protrusion 505 in between. In the illustrated embodiment, the opening 501, elongate recesses 502, and stop 503 are configured to engage one or more protrusions (e.g., the first protrusion 108, the second protrusion 109, and the third protrusion 110) of the first attachment face to achieve a releasable locking fit via twist-and-lock arrangement. In the illustrated embodiments, there are three such sets of features circumferentially located and equidistantly spaced on each second attachment face and which correspond to each of the three protrusions in the first attachment face. These features may be configured for a releasably locking engagement with the base portion when the second attachment face 403 is pushed into the first attachment face 111 in a downward direction A and rotated in a clockwise direction C. In reverse, the second attachment face 403 disengages from the first attachment face when it is rotated in a counterclockwise direction D, and pulled upward in direction B.

Figure 15A:
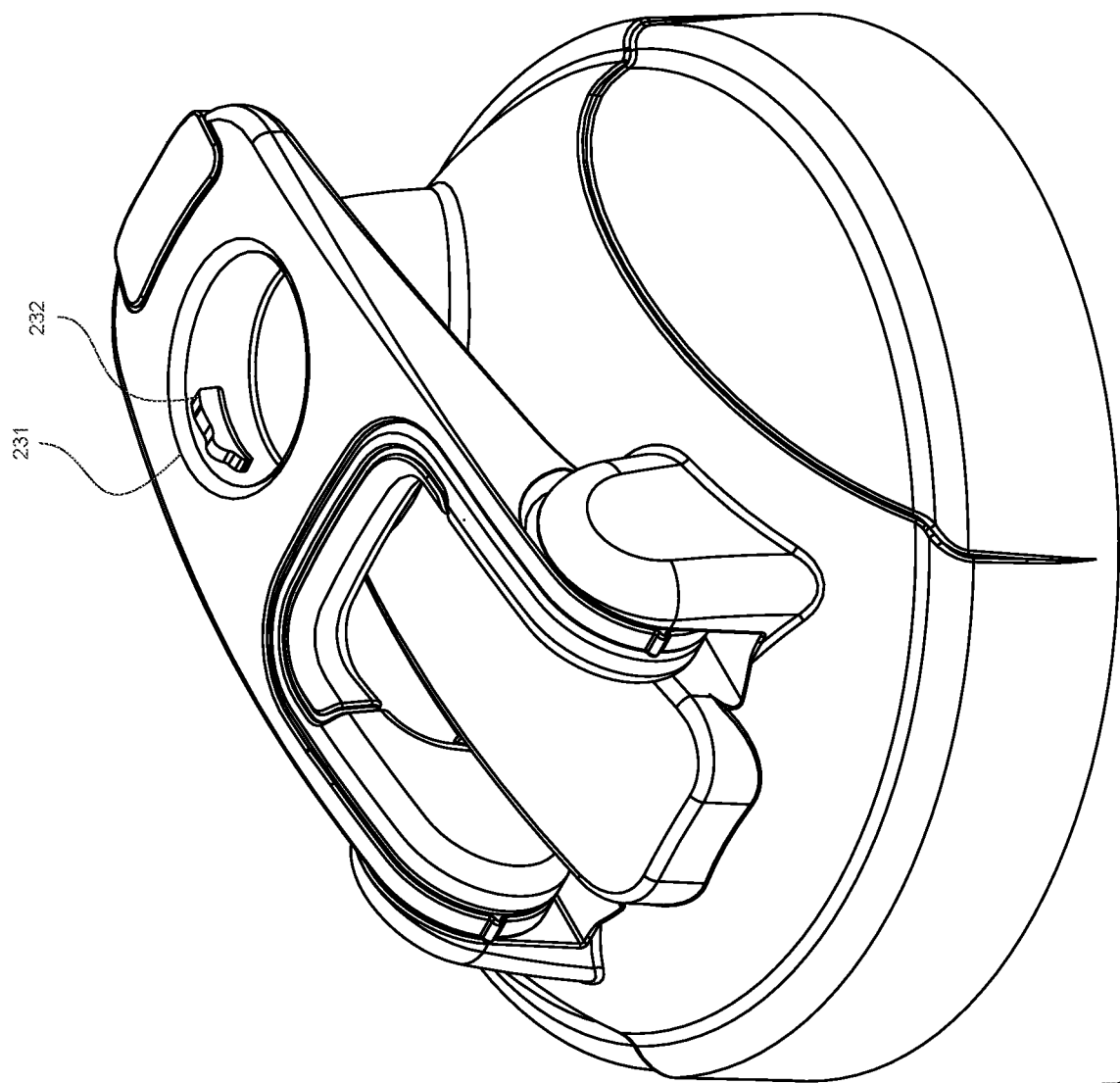
FIG. 15a shows a close-up of an alternative design of the flip cap configured for attachment to the accessories of the present invention.

It is common for a flip cap to have a recess within a protrusion entering the spout and designed to seal the liquid container. In those embodiments where the flip cap has such recess, the first attachment face may be incorporated, at least partially, to be positioned within this recess volume of the flip cap of the liquid container. In some examples, the opening of the first attachment face is flush with the top surface of the flip cap. This arrangement may optimize the utilization of an existing recess and reduce the weight and volume of plastic used for its construction. At the same time, the first attachment face may also be raised above the recess in the flip cap, for example, a universal adapter 231 in FIGS. 15b and 15c.

Figure 7:
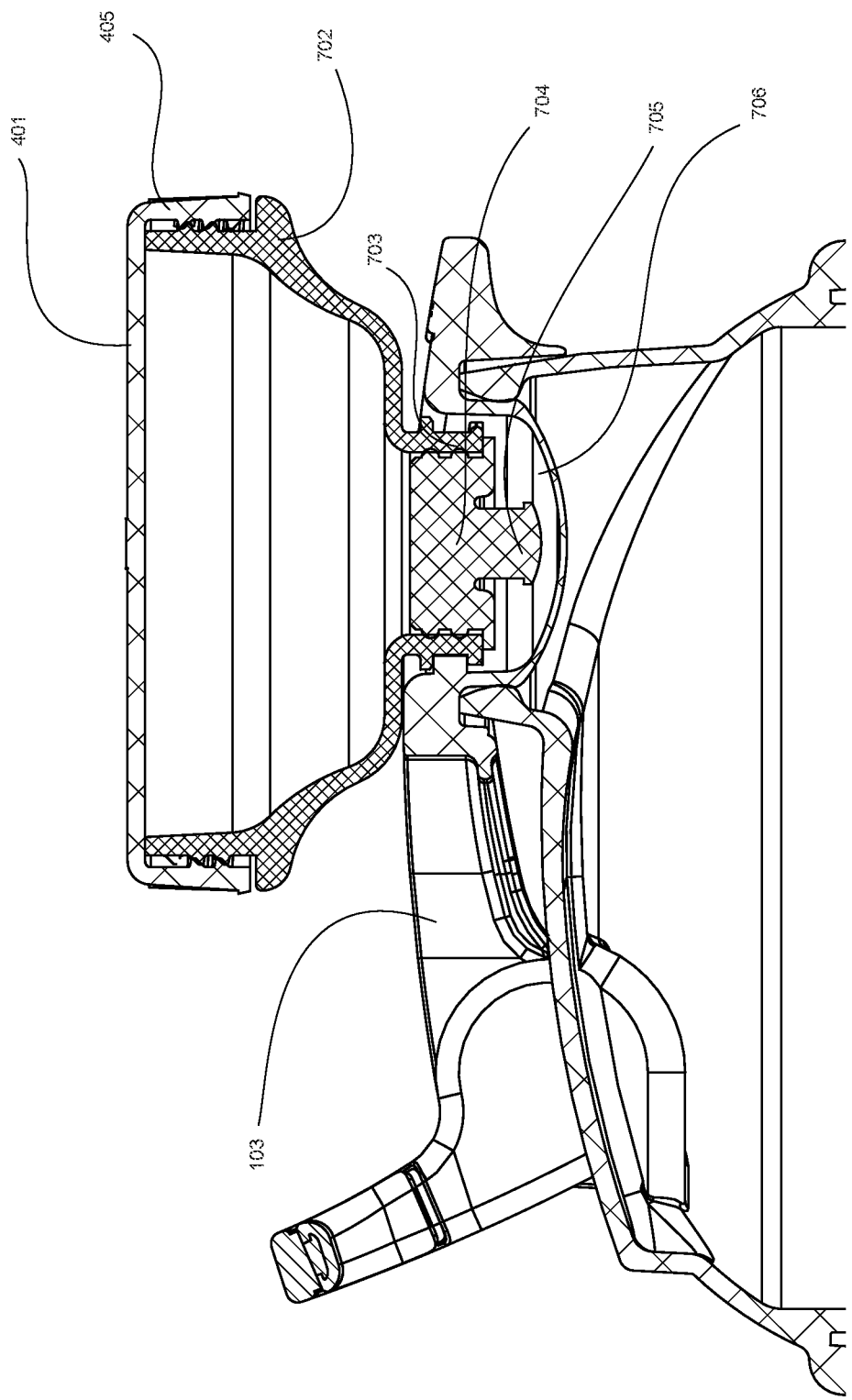
FIG. 7 is a cross-section view of another accessory attached to the flip cap of the liquid container.

Referring to FIG. 7, another embodiment of a funneled container 401 is shown. Again, funneled container 401 has a funnel body 702, lid 405 attached to the funnel body 702 by threaded or other means, an attachment loop (not shown), and a second attachment face 703 configured to releasably attach to the first attachment face of the universal adapter located on the flip cap body 103. Moreover, the embodiment of FIG. 7 additionally has an aperture with a removable plug 704 at its base configured to releasably attach within the second attachment face 703 for dispensing supplements, especially into the liquid vessel. The removable plug 704 may have one or more protrusions 705 configured as a grip or handle and/or for fitment into the recess 706 and/or which may be releasably attachable to the attachment loop.

Figure 8:
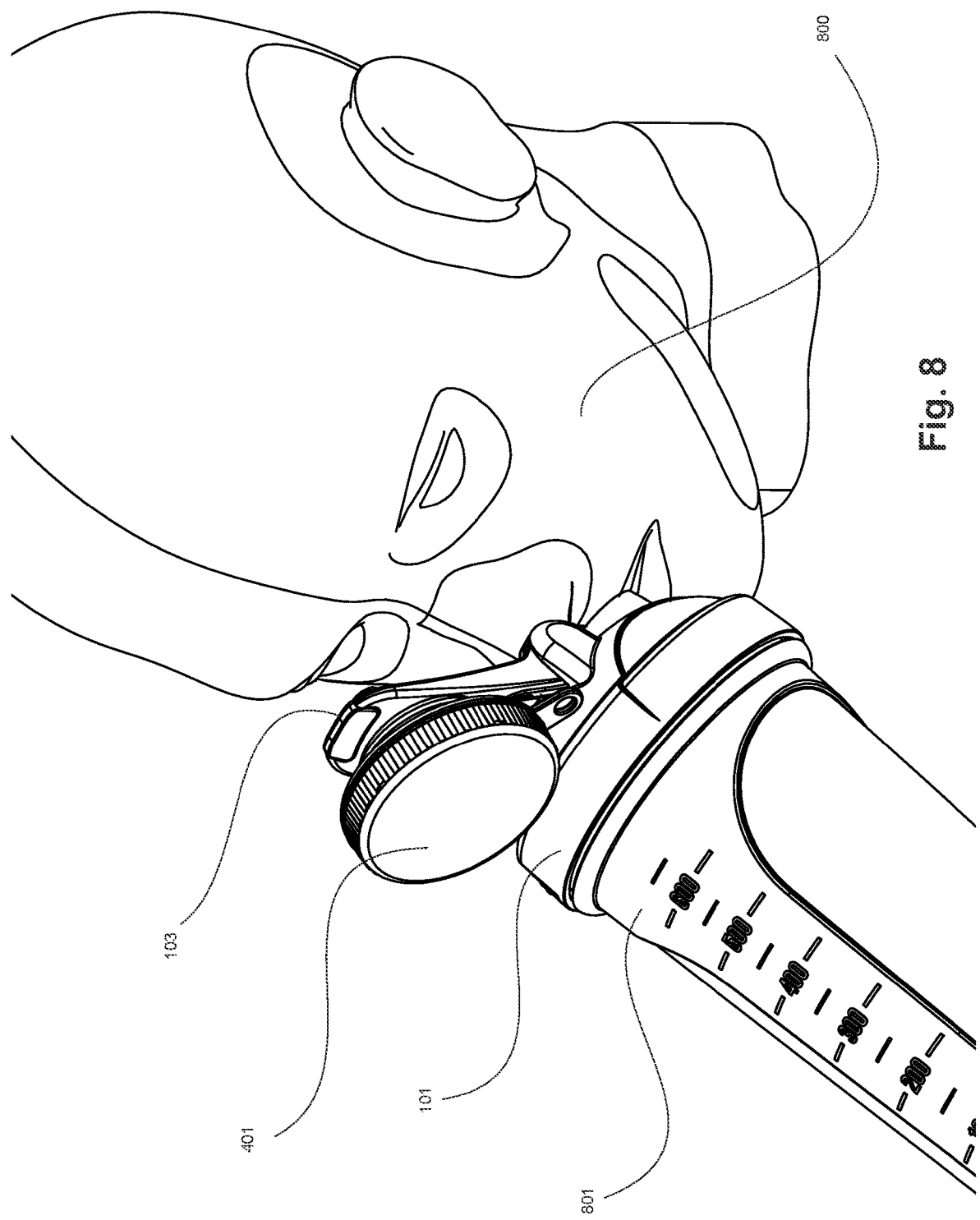
FIG. 8 is a perspective view of the liquid container of the present invention in a user environment.

Referring now to FIG. 8, in certain embodiments of the system, accessories (e.g., 401) may be configured to attach to the first attachment face of the universal adapter in such a matter as to allow the flip cap body 103 to position out of the way of a drinking user's face 800 while the accessory is attached to the flip cap body 103 and/or base portion. The flip cap may be configured to swing at least 90 degrees away in its OPEN position from the CLOSE position on the spout of the liquid container. A greater than 90 degrees away position may be preferred as it assures an even less risk of interference with the face of the user when drinking from the liquid container. In broad terms, the universal adapter may be positioned on an upper portion or on top of the liquid container in a manner that does not preclude drinking from the liquid container and allows access to the spout when drinking from the liquid container. In other words, the universal adapter may be positioned such that when the accessory is attached thereto, neither the universal adapter nor the accessory obstructs drinking from the spout of the liquid container substantially further to obstruct spout access as compared to when the liquid container does not have the universal adapter or any of the accessories attached thereto.

Discussion of the Phone Holder and Stand Accessory and Various Embodiments Thereof One of the accessories described herein is a phone holder and stand accessory. Typically, a phone stand refers to a device that is designed and shaped to prop up a smartphone at a fixed angle, providing a stable platform for viewing a video, for example. A phone holder is a device that can clamp onto the phone and retain it in other orientations. The present phone holder and stand accessory can act in both capacities, either once firmly attached to the phone or by providing an open U-shaped channel to position the phone therein. This is described in greater detail below.

The following description discusses various designs of the phone holder and stand accessory, in addition to the phone holder and stand accessory 420 of FIG. 4. These accessories may be attached to the flip cap or elsewhere to the universal adapter positioned on the liquid container of the invention. These designs are illustrated individually and in use in FIGS. 9-20. The main novel concept is to utilize the liquid container itself as a base for a phone holder. The phone accessory holder may be configured to retain a smartphone in a horizontal or vertical orientation during the hands-free use and viewing thereof.

The main part of the phone holder accessory is a U-shaped channel configured to support or compress the phone from a side thereof when placed in the U-shaped channel. The U-shaped channel is therefore configured for placing and removably holding a phone therein. The phone holder accessory may further include a retention mechanism configured to adjust (increase or decrease) the width of the U-shaped channel, thereby allowing the retention of phones with various side thicknesses therein. The portion of the retention mechanism that holds the active front part of the phone may be configured to minimize or even completely eliminate the screen obstruction, while still facilitating strong attachment between the phone and the phone accessory of the present invention. Examples of a suitable retention mechanism include the mechanism using the screw 256 described below, a spring mechanism designed to urge the front portion to move closer to the back portion and clamp the phone in between thereof, or other mechanisms designed to removably retain the phone in the U-shaped channel.

Alternative embodiments of the phone holder and stand accessory are described in greater detail below. FIG. 9a shows a side view of one exemplary embodiment of the invention, in which the elongated liquid vessel 1000 is seen to have a lid 220 with a flip cap 230 configured to flip up and down to open and close the spout of lid 220. Details of the construction of the lid 220 may be found in my patent applications, for example, in the U.S. patent application Ser. No. 18/117,501 entitled "Container lid with flip cap and nesting carry loop," incorporated herein by reference in its entirety.

The term "smartphone" and the term "phone" are used interchangeably and generally describe a rectangular-shaped smartphone or a computer tablet. As smartphones and tablets come in slightly different shapes, including variations in length, width, and thickness, the phone holder of the invention may be configured to accommodate such differences, as explained in greater detail below.

The phone holder and stand accessory 240 may be permanently or detachably attached to any suitable component of the lid 220, for example, to the flip cap 230, as discussed below in greater detail. The phone holder and stand accessory 240 may be further configured to removably retain a smartphone 290 therein while allowing the user to observe all or most of the smartphone display during use.

Figure 10D:
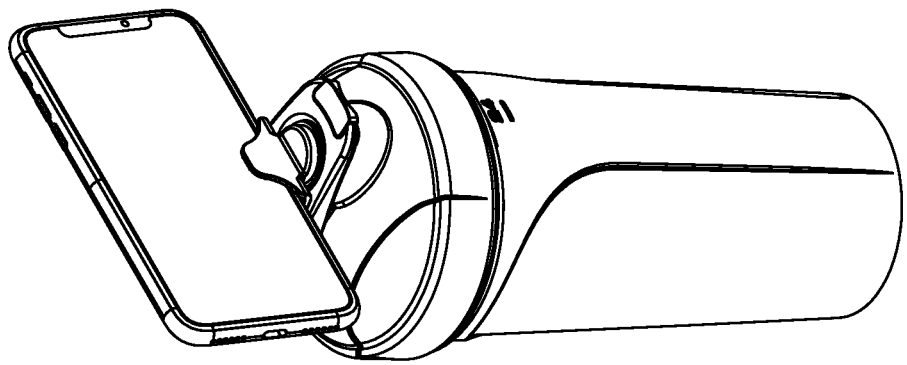
FIGS. 10a through 10d show various perspective views of the same.
Figure 10C:
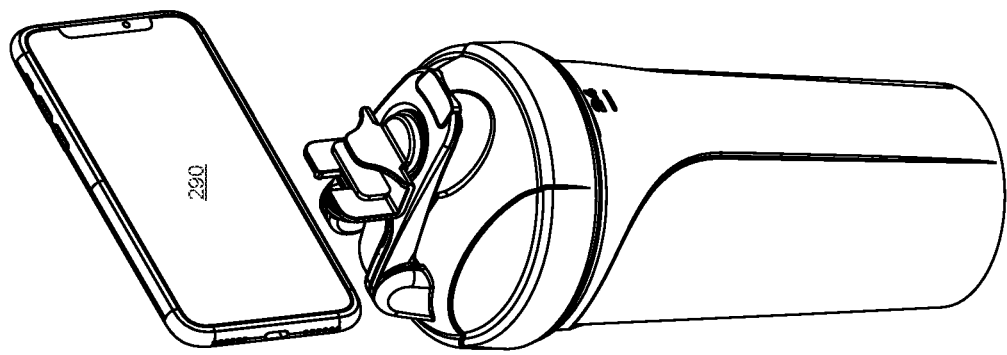
Figure 10B:
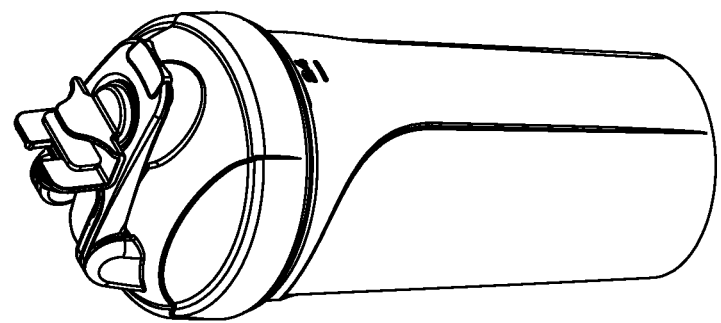
Figure 10A:
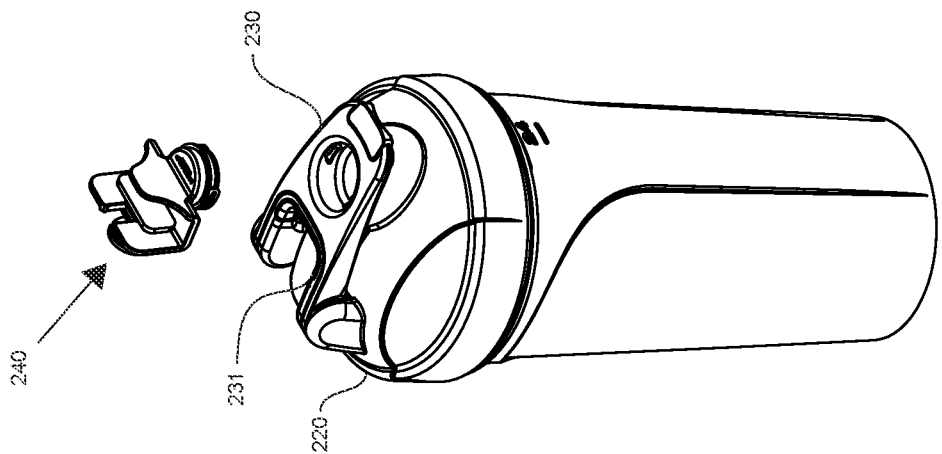

FIG. 9b shows a front view of the same embodiment, while FIG. 9c shows a side view in cross-section to illustrate various elements of the invention better. FIG. 10a shows a perspective exploded view of the liquid container with the lid 220 and the phone holder and stand accessory 240. FIG. 10b shows a perspective view of the phone holder and stand accessory 240 assembled with the lid 220. FIG. 10c shows a perspective exploded view of the liquid container and the smartphone 290, while FIG. 10d shows the phone retained by the phone holder and stand accessory 240 while on top of the elongated liquid vessel 1000.

Figure 12:
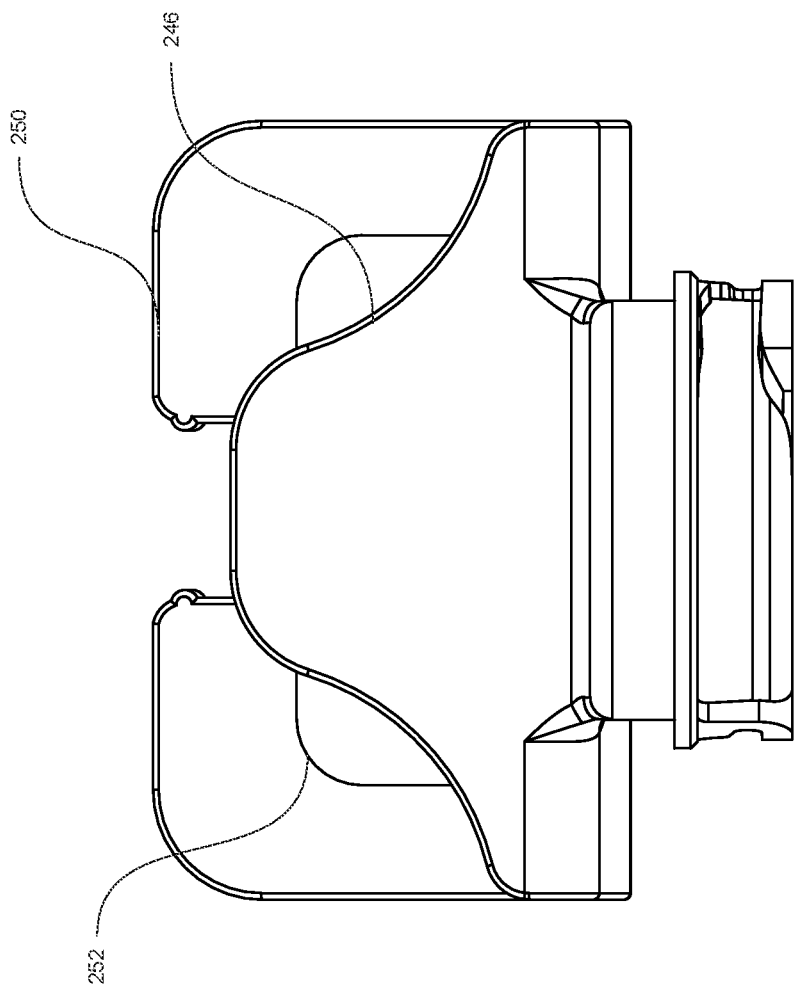
FIG. 12 shows a front view thereof.

FIGS. 11-14 show further details of the phone holder and stand accessory 240 design. Generally speaking, the phone holder and stand accessory 240 has an upper portion 242 and a lower portion 244—see FIG. 11a. The upper portion 242 may be configured to removably retain the phone, while the lower portion may be configured for attachment to the water bottle. FIG. 11b shows a back view of the phone holder and stand accessory 240, and FIG. 12 shows a front view thereof. FIG. 13a shows a top perspective view of the same, with FIG. 13b showing a cross-sectional view thereof.

Referring to the views seen in FIGS. 11a and 11b, the upper portion 242 may comprise an adjustable U-shaped channel 241 formed by a front wall 246, a shelf 248 configured to place the phone on top thereof, and a back wall

250. A generally rectangular cutout 251 may be made along a middle line of the back wall 250 in order to accommodate a sliding insert 254, which in turn may have a threaded opening housing a screw 256. The screw 256 may have a head in a form of a knob 258. The screw 256 may be rotatably connected to a pusher 252 located inside the adjustable U-shape channel 241, such that turning the knob 258 may cause an advancing or a retracting movement of the pusher 252 towards or respectively away from the front wall 246.

Another advantage of having a sliding insert 254 is that its vertical position may be adjusted to be either on the bottom of the generally rectangular cutout 251 or higher along its vertical axis. Moving the sliding insert 254 higher before tightening the screw 256 allows for a more stable and secure retention of some smartphones depending on their design or features of the phone case containing the smartphone inside thereof.

The sizing of the adjustable U-shaped channel 241 and its components may be selected to allow placement and retention of any smartphone or a computer tablet between the front wall 246 and the pusher 252.

The design of the adjustable U-shaped channel 241 described above is only exemplary and can be replaced with other phone retaining mechanisms or arrangements as the invention is not limited in this regard.

The alternative design of the second attachment face of the lower portion 244 of the phone holder and stand accessory 240 is best seen in the perspective views of FIGS. 14*a* and 14*b*. It may have a generally cylindrical symmetrical shape and may include a pair of grooves 260. Each groove 260 may have an opening 264 and a detent cutout 262—all shaped to cooperate with a corresponding universal adapter 231 in the first attachment face of the flip cap 230, which may have two internal engagement protrusions 232 sized to fit in the grooves 260, see FIG. 15*a*. These elements together form a bayonet-type quarter-turn coupling, which may be rapidly assembled and disassembled. Such an arrangement is, again, exemplary as other quick connect designs may be substituted for this one.

Figure 16C:
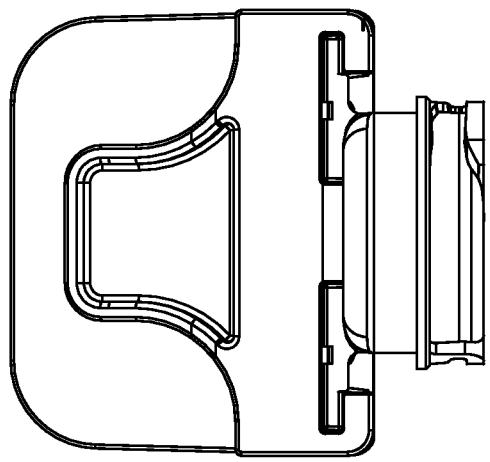
FIGS. 16a to 16c show various views of another alternative design of the phone holder and stand accessory.
Figure 16B:
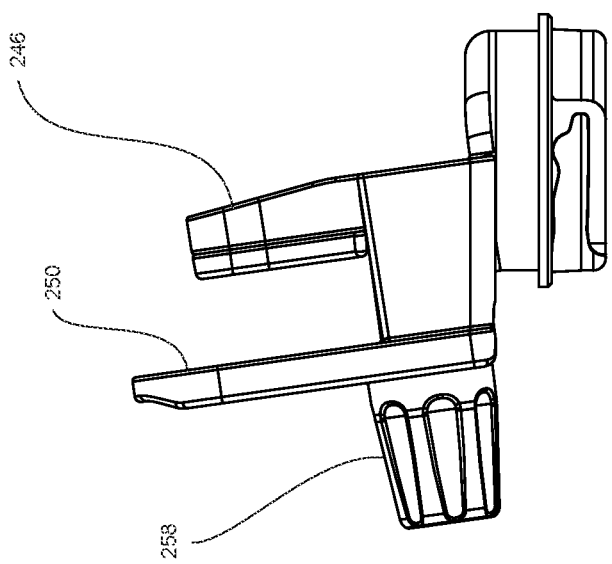
Figure 16A:
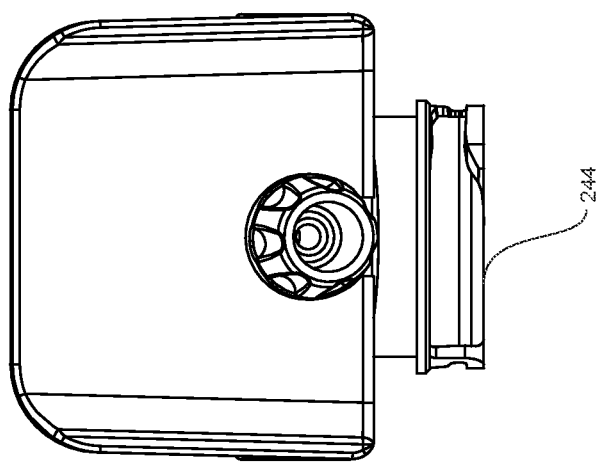
Figure 17B:
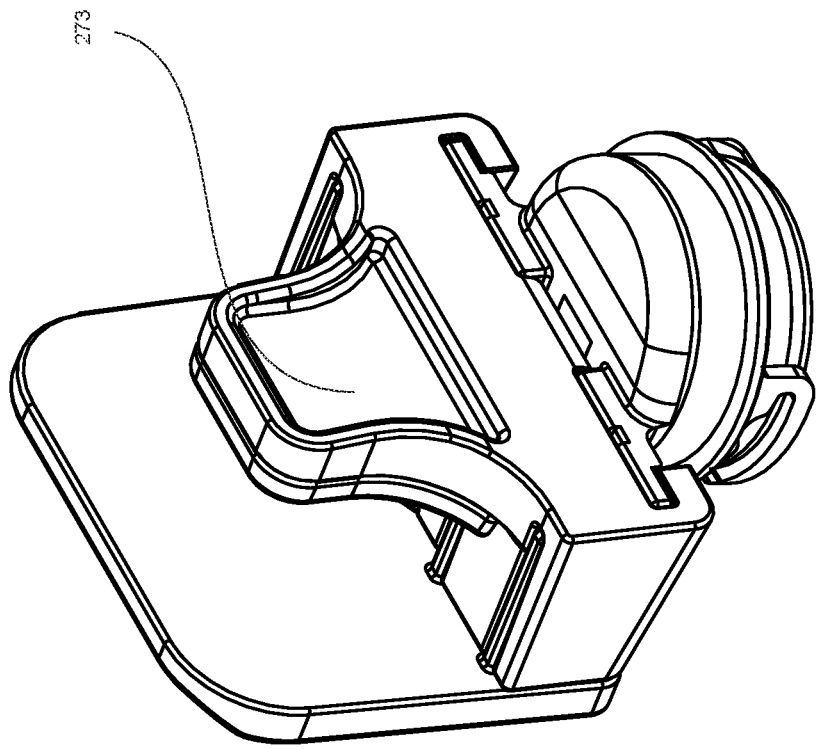
FIGS. 17a and 17b show two perspective views of the same.
Figure 17A:
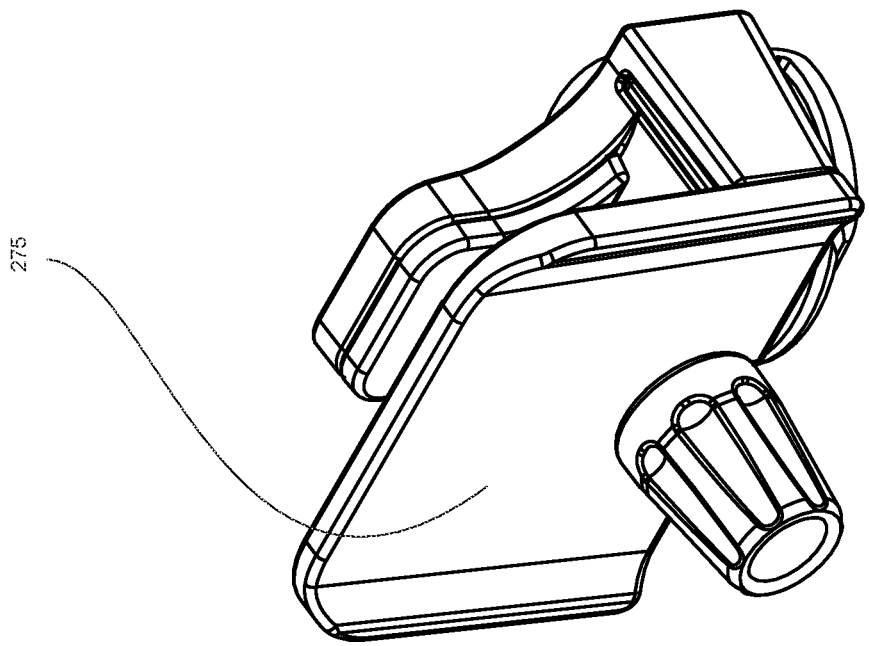
Figure 18D:
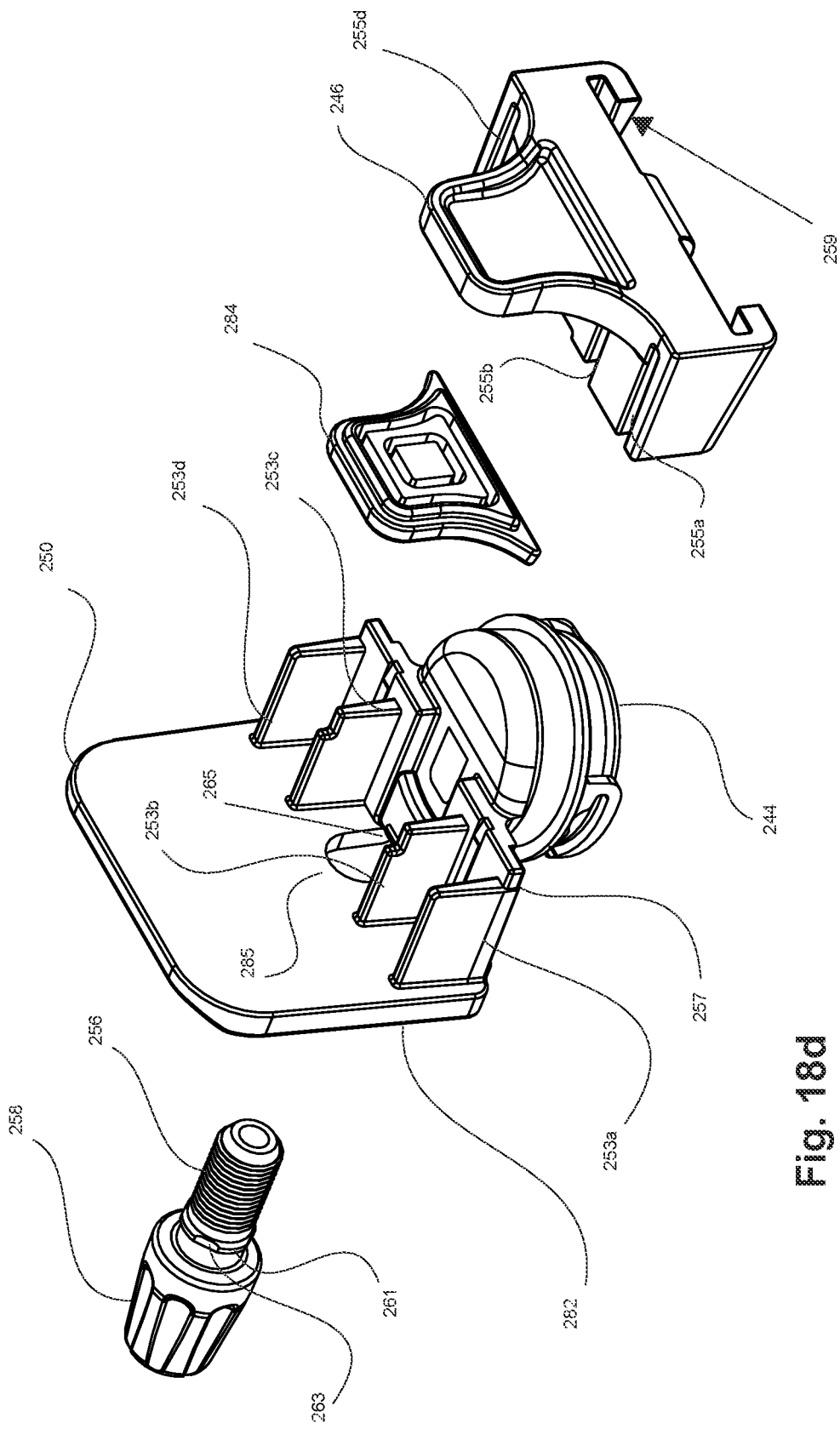
FIG. 18d shows an exploded perspective view of the same.

A further embodiment of the invention is now described and illustrated in FIGS. 16 through 18. The phone stand and holder accessory may generally include a base extending from the second attachment face, a back portion extending from the base, a front portion slidingly attached to the base and forming the U-shaped channel for the phone together with the base and the back portion, and an adjustment screw configured to move the front portion closer to or further away from the back portion in order to adjust the width of the U-shaped channel. At least one of the front portion or the back portion of the phone accessory may be rubberized to improve the retention of the phone inside the U-shaped channel.

More specifically, and referring to the drawings, the base 257 of the adjustable phone holder extends from the lower portion 244, designed in the same manner as what is described elsewhere in this specification. The base 257 may be configured to accept the front portion 246 in a sliding arrangement using the slot 259 formed at the bottom of the front portion 246, see FIG. 18*d*. The base 257 may have a back portion 282 extending therefrom. A plurality of spaced-apart ribs 253*a*, 253*b*, 253*c*, and 253*d* may extend from the back portion 282 and the base 257 and may be configured to slide into the corresponding slots 255*a*, 255*b*, 255*c*, and 255*d* formed in the front portion 246. The screw 256 with the knob 258 may be positioned to protrude through the opening 285 in the back portion 282 and engage in the threaded well in the front portion 246. The screw 256 may further feature a circular lip 261 extending radially from the main body of the screw. The circular lip 261 may further feature two opposite cut-out areas 263. The space inside the opening 285 available to initially insert the screw 256 therethrough may be sized to only accept the screw 256 with the opposite cut-out areas 263 oriented along the two side walls of the opening 285. Once the screw 256 is inserted in this unique orientation through the opening 285, it may be turned to have any other angular orientation which will prevent the screw 256 from falling out of the opening 285. As a result, the screw 256 remains loosely retained within the back wall 250 regardless of whether it is engaged with the front portion 246 or not. Furthermore, a detent 265 may be positioned along the path of the screw 256. Insertion of the circular lip 261 through the opening 285 and over the detent 265 may further assure that the screw 256 will not accidentally fall out of the back wall 250 during the use of the phone holder accessory of the present invention.

The back portion 282 may be optionally covered with a rubberized layer forming the back wall 250 facing the front portion. The front portion 246 may also be covered with a rubberized layer or feature a rubber front wall 284 retained in a corresponding opening of the front wall and facing the back portion 282. In embodiments, at least one side may feature a rubberized surface. In other embodiments, both sides of the clamp mechanism may be rubberized.

When assembled as seen in the drawings, the rubberized back wall 250 and the rubber insert of the front wall 246 approximate each other when the knob 258 is turned to rotate the screw 256, which in turn pulls the front portion 246 towards the back portion 282 of the phone holder accessory and the slot 259 slides over and about the base 257, as seen, for example, in FIG. 18*b*. This adjustment allows the use of the accessory with phones having various thicknesses.

The entire phone accessory may be made quite small, with any of the length, width, or height dimensions not exceeding about 1.5 inches. As seen in FIG. 18*a*, the back portion 282 may be positioned with a lateral offset from the central axis of the lower portion 244 so as to ensure that the smartphone retained therein may be positioned close to the middle of the lower portion 244. Furthermore, while parallel with each other, the back portion 282 and the front portion 246 may be positioned at a slight tilt angle with reference to the central axis of the lower portion 244—so as to provide for a fixed tilt angle of the phone retained in the holder accessory of the invention. This may improve the viewing of the phone while attached to the holder between the front portion 246 and the back portion 282. The tilt angle may range from zero (for a vertical position of the phone) to about 20 degrees, at least in some embodiments of the present invention.

As the universal adapter has two symmetrical protrusions for engaging with the second engagement face of the lower portion 244, it can be retained by the universal adapter in two positions, 180 degrees apart. This allows the use of the tilt angle to position the phone tilted either a little back or a little forward, as desired by the user.

Figure 69:
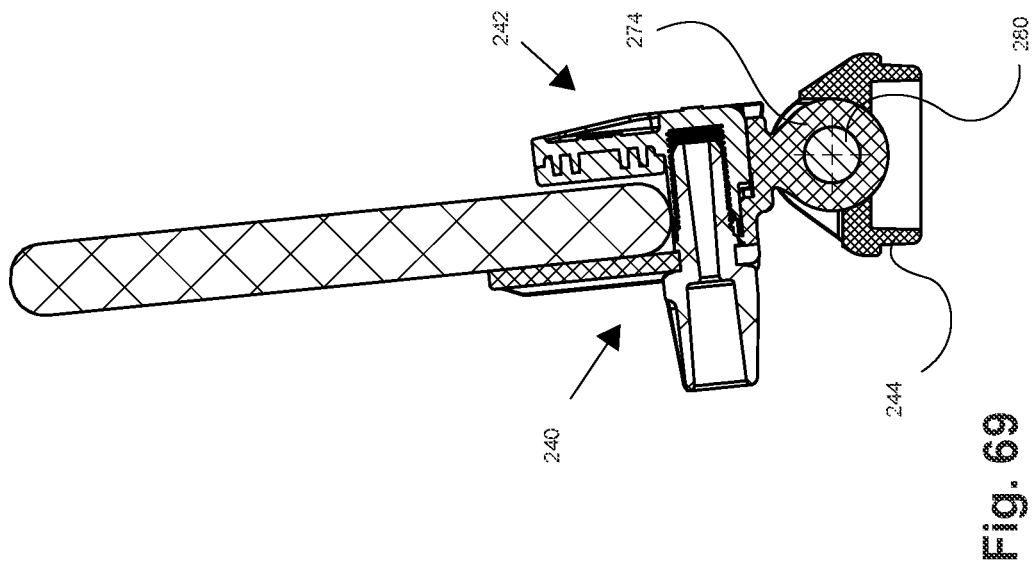
FIG. 69 shows a side cross-sectional view of the same in its assembled state, and finally FIG. 70 show the phone holder in use as a selfie stick.
Figure 68:
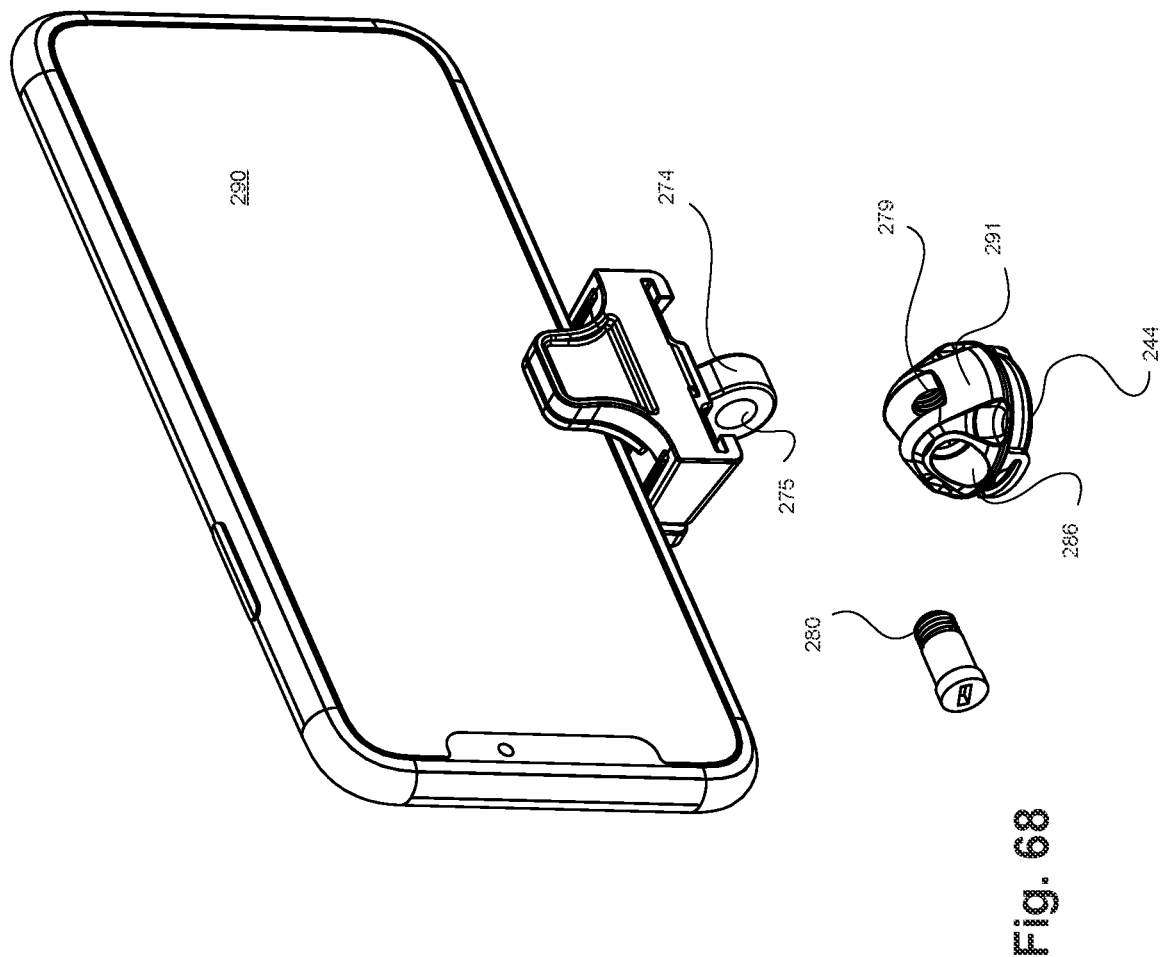
FIG. 68 shows a perspective exploded view of the components of a further yet alternative design of the phone holder and stand accessory, which allows the phone to tilt back and forth.
Figure 70:
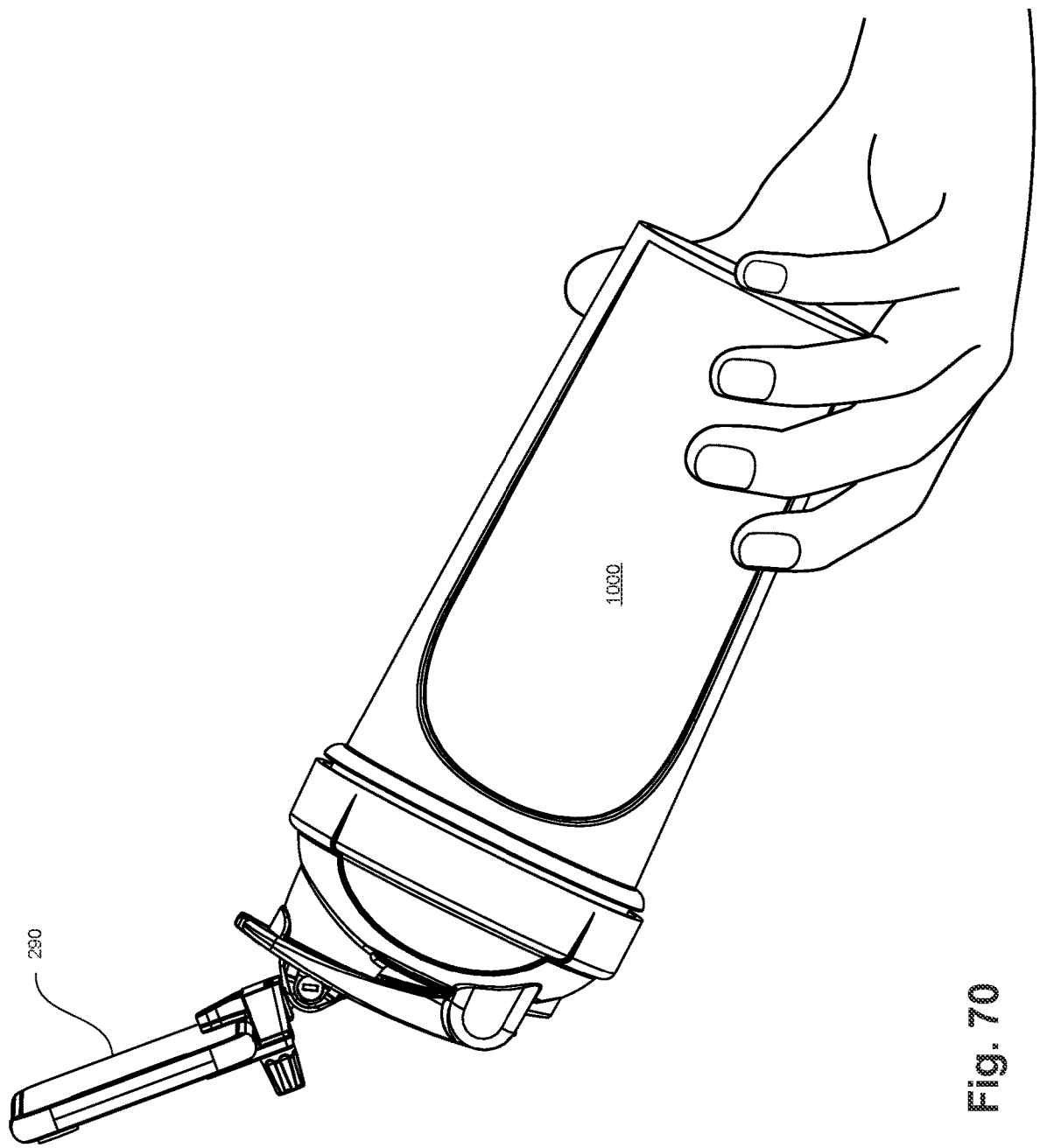

FIGS. 68 and 69 present a further yet embodiment of the phone holder and stand accessory, which is designed to allow the smartphone 290 retained therein to tilt back and forth. To accomplish this feature, the second attachment face on the lower portion 244 may be separated from the main body of the phone holder and accessory 240 by an articulating assembly comprising a lower portion housing 291 with a side opening 286 having a threaded end 279, cooperating with a tilting ring 274 extending from the upper portion 242 and having a central opening 275 of the same diameter as the side opening 286. An axial screw 280, when installed into the opening 286 and retained in the threaded end 279, retains the tilt ring 274 and the entire upper portion 244 attached to the lower portion 244 with the ability to tilt back and forth as desired. The ability of the phone to be tilted toward the user is instrumental in using the liquid container as a hand extension (in a manner similar to a selfie stick) to take photos and videos of oneself by furthering the distance between the phone camera and the hand by about the full length of the liquid vessel. When the phone holder and stand accessory is attached on the top of the flip cap and the user grabs the bottom of the liquid container (which is generally already designed to be easily gripped at the bottom and easier to grip than a phone when taking a selfie on the phone), the user is able to extent their phone further away by virtually the entire length of the liquid container. In one example with a liquid container being 10 inches long, the user can get the phone camera 10 inches further from their face in comparison to using just their own hand to take the selfie. In my experiments, the use of the 28 oz shaker bottle (which is 8.5 inches tall) to hold the phone have increased the area of coverage by the phone camera by as much as 25% over what can be viewed on the phone with just holding it by hand—see FIG. 70. Since selfie sticks and water bottles are often used together during travel, the user can eliminate the need to carry around a larger selfie stick.

In addition, retention of the phone on a liquid container allows the user to hold the liquid container and make videos with the phone in a smoother manner when moving the phone around, as the liquid container is heavier than the phone. In that sense, the liquid container acts as a handheld rig for the phone to improve stability of the video and physically filter out undesirable vibration when holding the phone by hand. Furthermore, the ability to provide a solid grip on the liquid container is advantageous when making videos or taking photos as compared to holding a thin smartphone by fingers while trying to avoid pressure-sensitive areas of the phone's display.

The design of the phone holder and stand accessory and the use of at least one rubberized component together with other design elements of this embodiment allow reliable retention of this phone accessory on any smartphone. A smartphone may be described as having a generally rectangular shape defining two short sides and two long sides. The phone holder and stand accessory may be positioned over one side of the phone anywhere along any short side or any long side of the phone without obstructing much of the display area, see FIGS. 20c and 20d. It can be attached away from side buttons, such as volume up or down, so the phone remains fully operational with the accessory attached thereto. This phone accessory is also small enough to be able to reside on the part of the phone away from the wireless charger or from a charging cable attached thereto. It also allows positioning to allow easy access to the phone controls for right-handed or left-handed users.

The two parts of the clamp mechanism that come together can reliably retain the phone by grabbing onto a small area of the phone housing or the phone case housing. Moreover, the quick-connect action of the universal adapter allows the user to rapidly detach the phone with the holder accessory still attached thereto, for example, answer a phone call while in the middle of watching a video. Once their phone call is finished, a simple quarter-turn motion repositions the phone on the liquid container to continue watching the video or another hands-free use of the phone.

The use of the rubberized components also allows selecting a certain position of the front portion 246, in which placing the phone into the phone holder and removing it from the phone holder may be done rapidly and without further tightening of the knob 258, as the phone is retained within the holder with sufficient stability due to compression of the rubberized components of the phone holder. Furthermore, the use of rubberized components prevents damage or scratching of the touch-sensitive display.

Figure 63B:
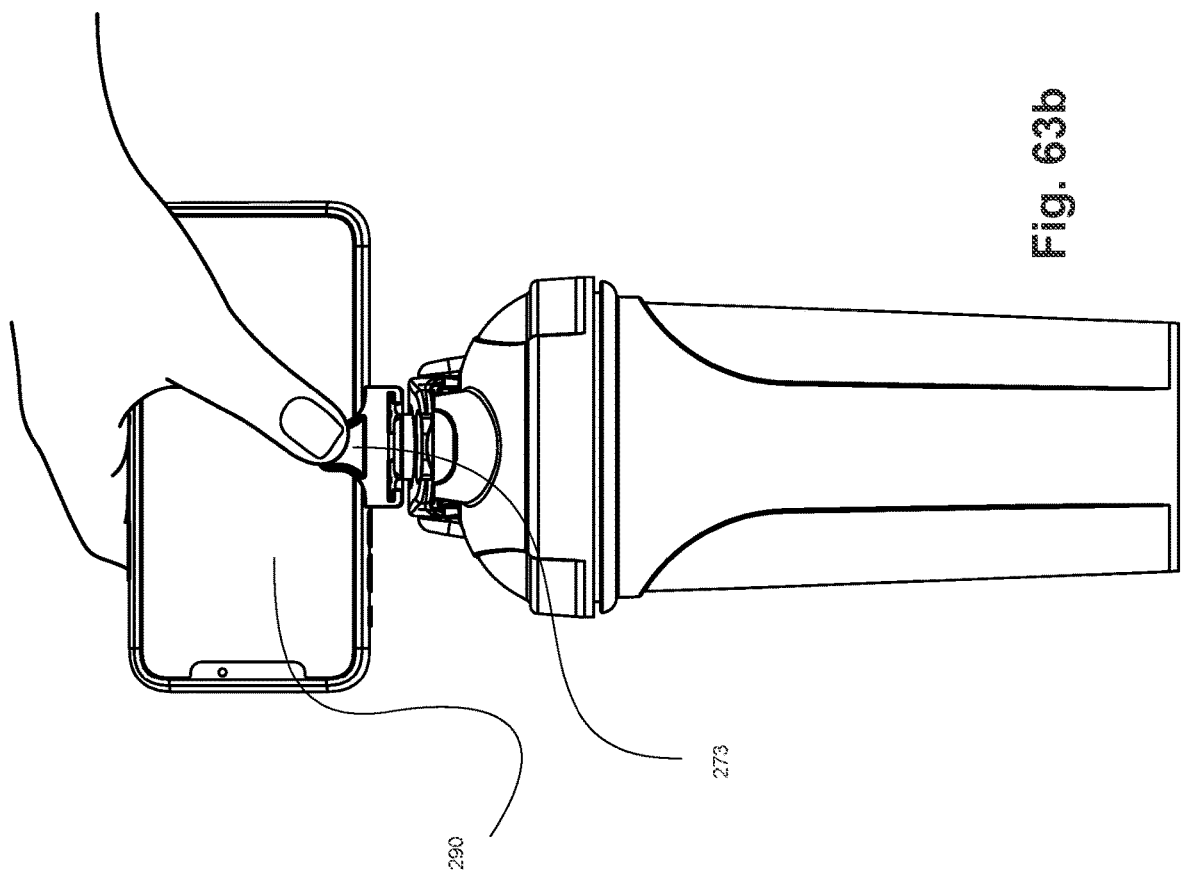
FIGS. 63a and 63b are respectively a perspective and side views of the use of the phone holder and stand accessory to rapidly detach the phone without interfering with the touch-sensitive screen thereof.
Figure 63A:
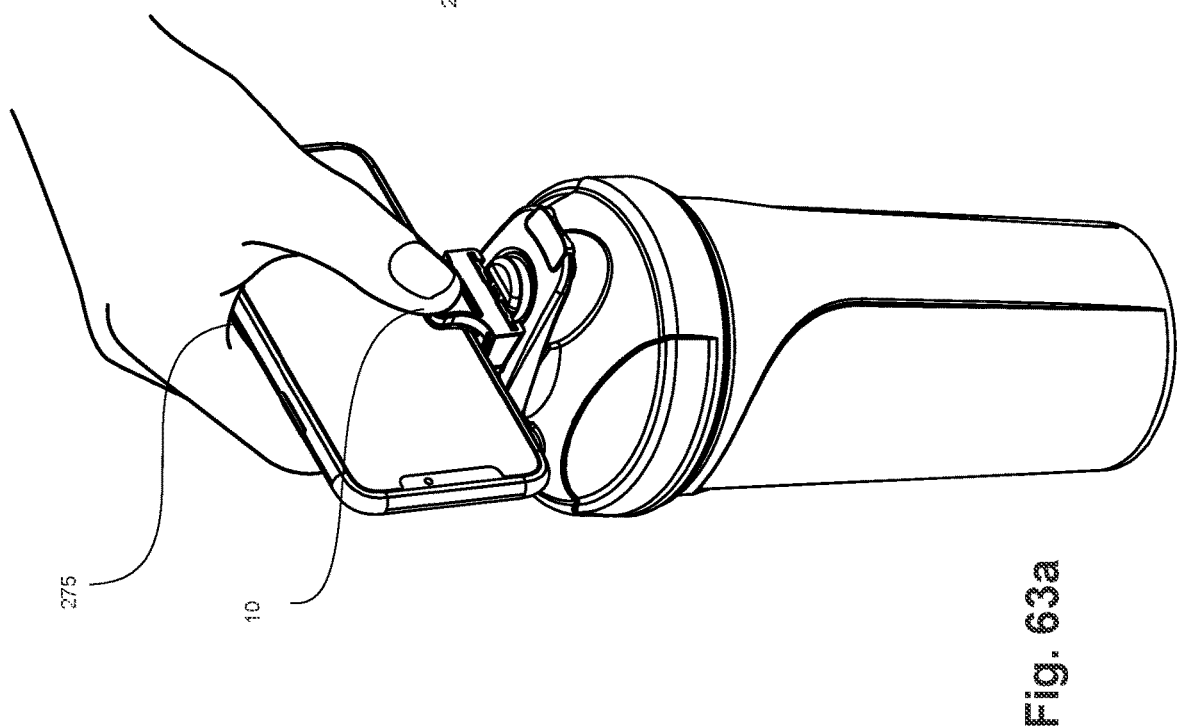
Figure 64:
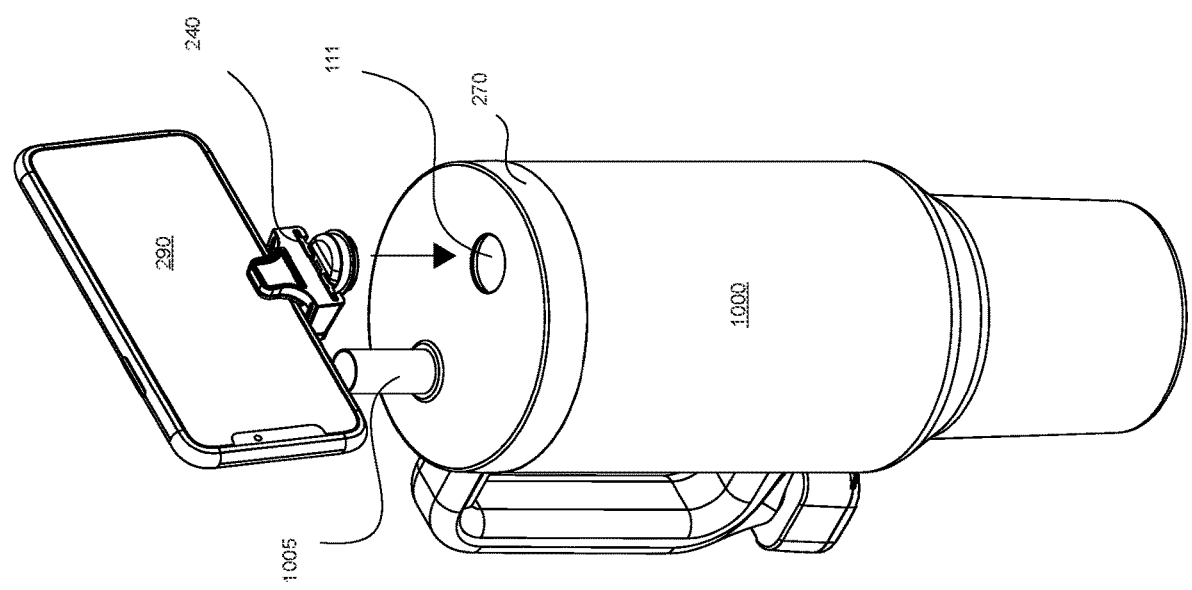
FIG. 64 shows a perspective view of a snap version of the universal adapter of the present invention.

A further advantage of the present phone holder accessory is the shape allowing a user to grab the phone 290 with the attached accessory by holding it only by touching the accessory itself, without the need to touch the touch-sensitive display of the phone. This avoids the nuisance of unintentional pressing of various buttons on the phone. To facilitate this feature, the thumb rest area 273 is provided on one side of the phone accessory while the middle- and the index finger rest area 275 is located on the back of the phone accessory opposite the thumb rest area 273—see FIGS. 17a, 17b, 19a. Providing these two finger rest areas facilitates the action of rapidly removing and returning the phone 290 from and to the universal adapter of the present invention—see FIGS. 63a and 63b. In at least some embodiments, these two finger areas may be rubberized as well.

Another use of the present invention is to display GPS-enabled driving directions in the car. Many users use car vent phone holders to permanently attach their smartphones to the interior of the car. Some drivers simply put their smartphones loosely in the cupholder of their vehicle. This is not only not convenient but may actually pose a risk at least for two reasons: (i) the phone is usually too low for them to see the screen easily, and they have to look down to get further directions, and (ii) a loose phone may be dislodged and fall on the car floor in case of hard braking or a sharp turn of the vehicle. Those who drive a lot, such as taxi, Uber, or Lyft drivers, spend a long time in the car. In addition to following driving directions, they need to stay hydrated throughout the day. The present invention conveniently solves both problems by holding the phone on top of the liquid container, which, in turn, may be placed in one of the cupholders. In addition, the ability to quickly remove the phone from the liquid container and then return it to its place, such as to take a short phone call, may make the present invention even more appealing for those users.

As mentioned above, the use environment in a gym highlights the advantages of the present invention. A typical gym user is likely to bring a reusable water bottle and the phone to the gym. While exercising, it is not convenient to keep a phone nearby. Some users place their phone in their pocket, but active movements during exercise cause the phone to bounce around in the pocket. Some tight exercise clothing does not even have a pocket large enough to accept the phone therein in the first place. Some users place the phone nearby on the floor, but that is not sanitary and there is a risk of another person stepping on the phone or scratching the phone. Some other users place the phone in a cupholder of the exercise machine, but some phones do not fit properly or are subject to a risk of being dropped and damaged. The use of the present invention allows to not only keep the smartphone on top of the water container, but also facilitates convenient monitoring of the phone for any incoming messages, even if it is not used directly to watch a video or talk hands-free. Furthermore, occasional use of the phone is accomplished easily, for example when changing a song or starting a new playlist, transmitted by the phone to the earbuds of the user during exercise. Overall, the present invention allows the user to be more organized while in the gym.

As with previous embodiments, the smartphone may be retained in a portrait or landscape orientation. Of note is that this design does not require the user to tighten the screw and retain the phone firmly inside the U-shaped channel. A loose position of the screw or a configuration with the screw removed entirely may still allow the user to use the U-shaped channel as a phone stand. This may be advantageous when the user is taking videos or photos in a quiet environment of a room, rather than using the phone in the car, where simply placing the phone in a widened U-shaped channel is sufficient for its purpose.

The use of the phone holder described herein may extend beyond the liquid container. In further embodiments, the universal phone stand and holder may be configured to be used in other use environments and circumstances, such as when attaching the phone to a piece of luggage, backpack, or another travel gear, inside the car, to a wireless speaker, to a bicycle or motorcycle, to workout equipment, to a wearable armband or waistband, to a cooking stand, to an office desk, to a bedside stand, or in other such circumstances.

Figure 19B:
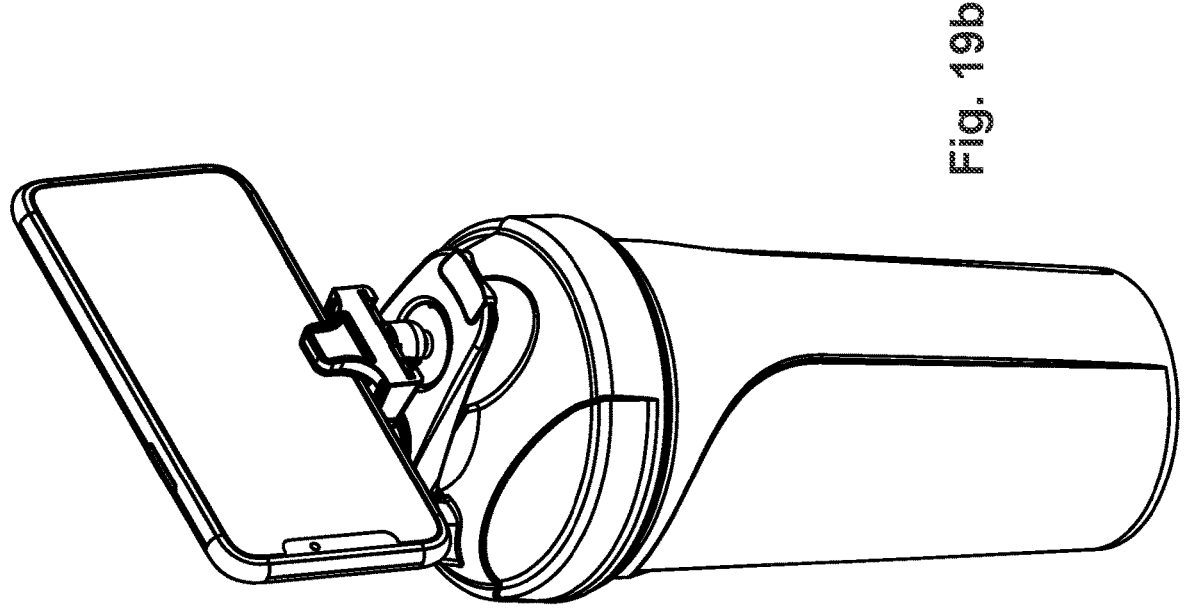
FIGS. 19a and 19b show exploded and assembled perspective views of yet another phone holder and stand design, allowing the smartphone to pivot to a desired viewing angle.
Figure 19A:
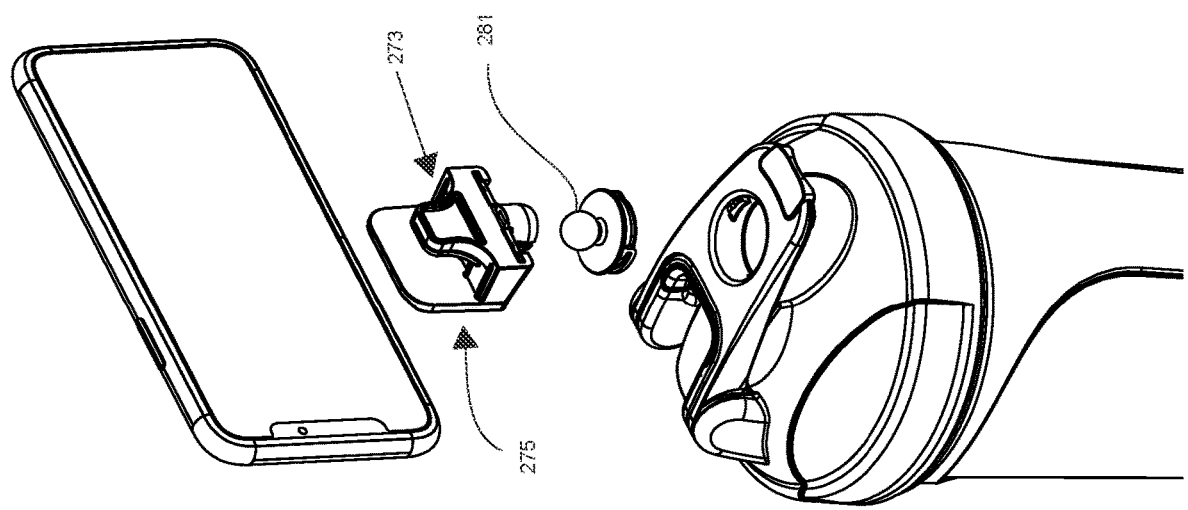
Figure 19D:
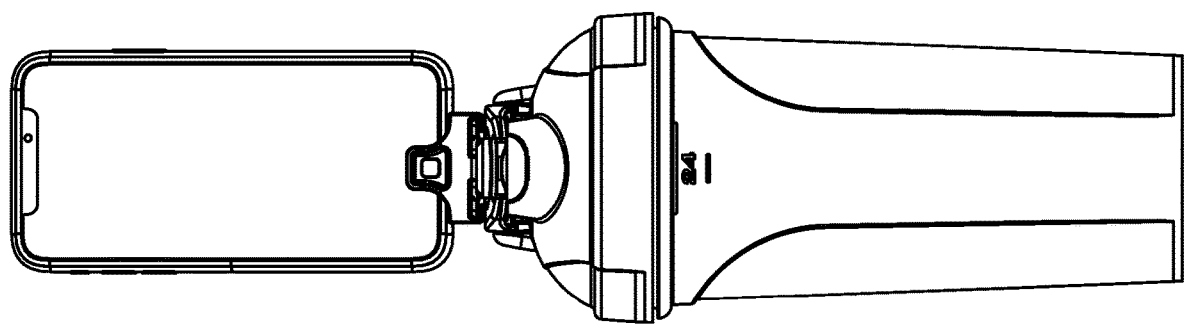
FIG. 19d shows a phone retained in a vertical orientation.

The ability to tilt and lock the phone while in the phone holder and stand accessory 240 so as to retain the phone at a desirable reclining angle is also contemplated to be within the scope of the present invention. For example, a universal ball joint may be added to the phone holder, as seen in FIGS. 19-20. A ball 281 may be located inside the socket 283 and allows the phone position to swivel and tilt in any desired direction or orientation, both in horizontal or vertical mode, see FIG. 19*d*.

Holding the smartphone on top of a liquid container has a number of advantages compared to the prior art:
  Stability of the phone is improved as a heavy water bottle makes for a significant and stable phone holder base,
  The total size and weight of the phone holder are significantly reduced, as there is no longer a need for having a large and heavy base—the water bottle itself plays that role,
  Any cup holder can now be used as a phone holder by placing the water bottle in the cup holder first and then mounting the phone on top of the water bottle. This is especially advantageous in a car, which typically has a number of cup holder openings, which can all be used for holding a phone using the present invention. Another advantageous use is with many exercise machines, which typically provide one or more cup holder openings for the user,
  Having a quick-connect design feature is advantageous in that the user can quickly disconnect the phone from the liquid container while still assembled within the phone holder and bring the phone to the ear to make a quick phone call or send a text message. Once that call or text session is finished, the user can easily place the phone back on top of the liquid container and resume watching a video, or another longer-term hands-free use of the smartphone,
  Using the present invention elevates the position of the phone as compared to traditional phone holders and brings it closer to an eye-level viewing experience, which is preferred as compared to having to look down constantly, as is the case with other phone holders,
  Positioning the phone at an elevated height makes it more convenient to use the smartphone for taking pictures, including taking selfies, as well as recording videos from a more natural viewpoint,
  If the phone is required to be positioned at a low height, attachment of the phone holder accessory to the flip cap of the lid allows the lid itself to be detached from the liquid container and positioned on a flat surface so as to retain the phone on top thereof close to the ground or a table surface in a stable manner.

Universal Adapter Positioned on a Spout Cover

Figure 21B:
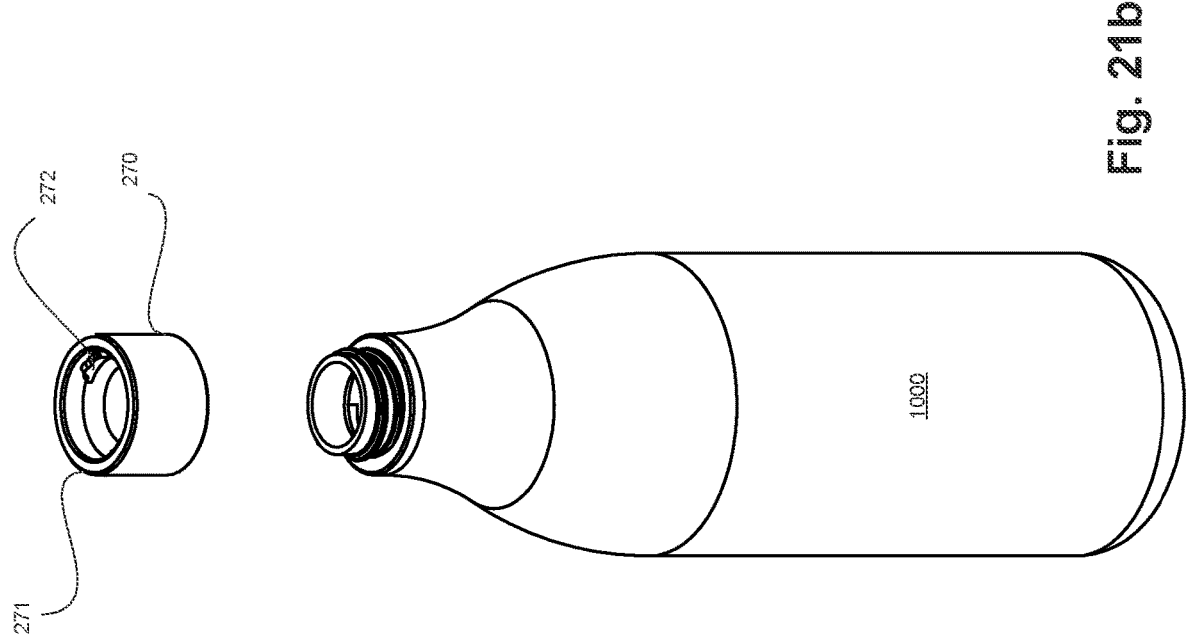
FIGS. 21a and 21b show a spout cover configured to include the universal adapter of the invention.
Figure 21A:
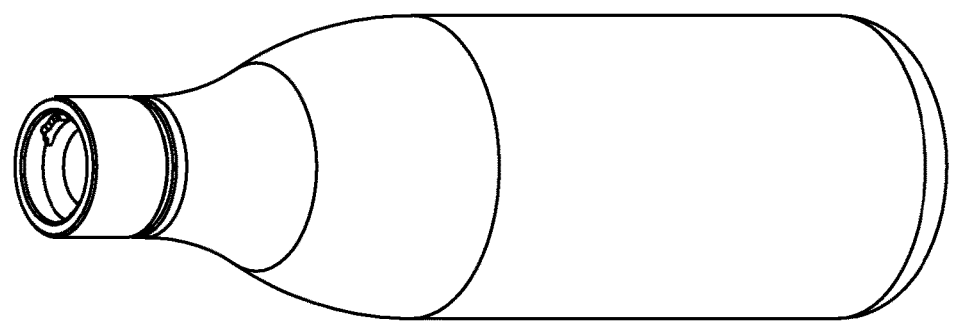

FIGS. 21*a* and 21*b* show an example of an elongated liquid vessel 1000 with a spout cover 270 configured to close off the spout of the liquid vessel in a liquid-tight manner. The spout cover 270 may be detachable from the elongated liquid vessel 1000, or, in other embodiments, it may be removable therefrom and loosely attached using a band or another flexible attachment member. The top of the spout cover 270 may contain the universal adapter with the first attachment face 271, containing protrusions 272 configured to interact with the second attachment face integrated with a plurality of accessories.

FIG. 22 shows an exploded view of one of several accessories configured for attachment to the spout cover 270, such as a powder container 276 with a funneled end, a pill box 278, or a phone holder and stand accessory 240. Of note is that at least in some of the accessories, such as the powder container 276, there may be located another first attachment face 277, positioned opposite the second attachment face and configured to attach another accessory thereto. This arrangement facilitates a stack-up of more than one accessory—all attached to a single universal adapter and extending from the liquid container of the present invention.

A snap version of the universal adapter positioned on a spout cover 270 is illustrated in FIGS. 64-67. When a liquid vessel 1000 has a wide-mouth opening, a spout cover 270 may be equipped with a straw 1005 protruding therethrough and extending from the bottom of the liquid container to end above the spout cover 270. Use of a quarter-turn universal adapter described elsewhere in this specification may be difficult as the phone 290 may hit the top portion of the straw 1005 during attachment or detachment of the phone holder and stand accessory 240. The alternative designs of the first attachment face and the corresponding second attachment face allow the user to snap the phone holder and stand accessory 240 in and out of the spout cover 270 in any orientation of the smartphone 290 and without interfering with the straw 1005.

The ability to snap the phone holder and stand accessory 240 in and out of the spout cover 270 may be accomplished by providing the first attachment face 111 in the form of a generally flat round depression 118 extending below the top surface of the spout cover 270. A snap lip 115 defines a slightly smaller diameter than the circular opening 116 between the snap lip 115 and the flat depression 118—see FIGS. 65 and 67*a*. The second attachment face 244 of the phone holder and stand accessory 240 may contain a cylindrical portion 266 sized to fit within the internal diameter of the snap lip 115. One, two, three or more snap protrusions 267 extend from the bottom edge of the cylindrical portion 266 (FIG. 66 shows four snap protrusions 267 spaced evenly about the periphery of the cylindrical portion 266.

Figure 67A:
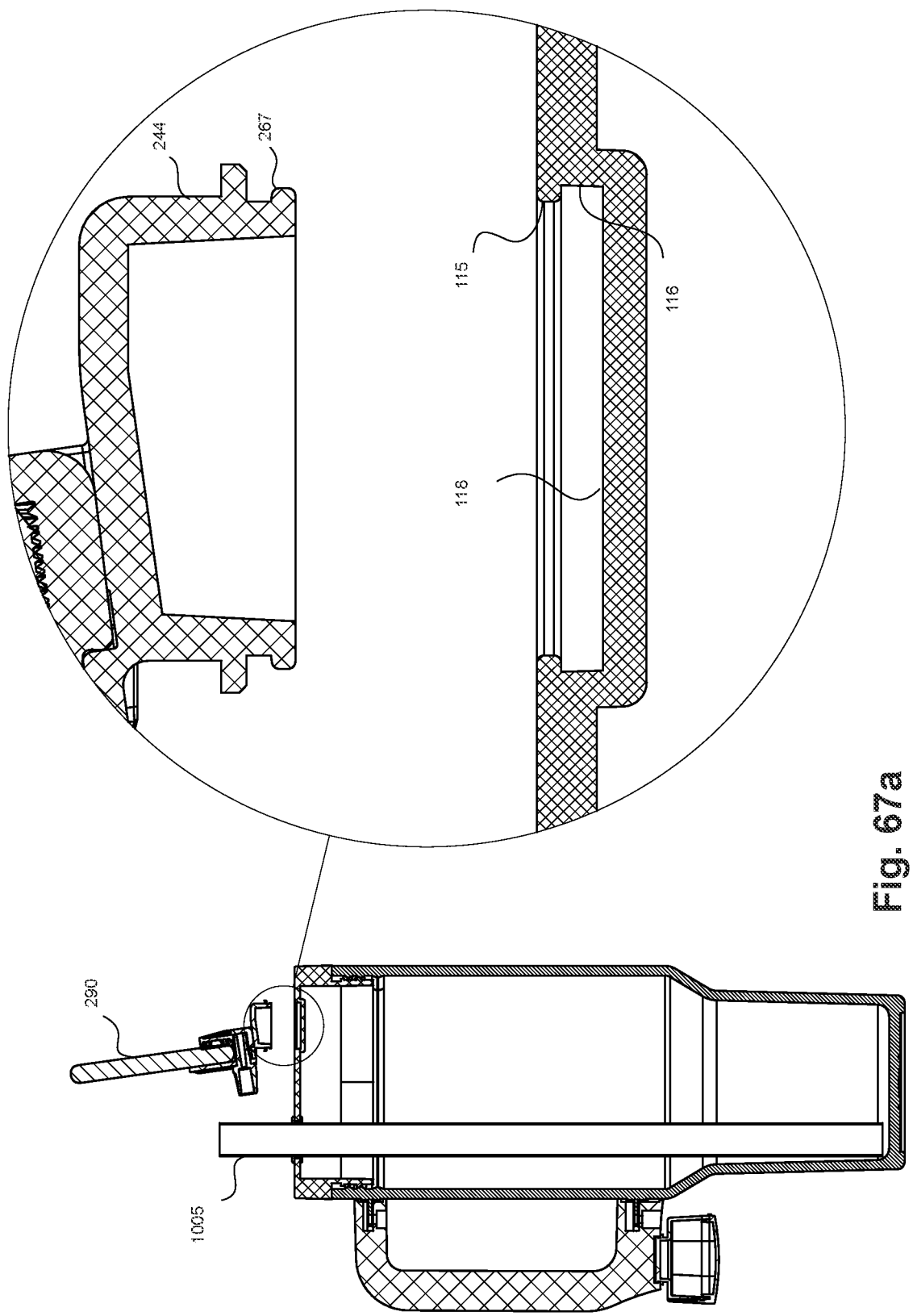
FIG. 67a shows a full cross-sectional view and an enlarged cross-sectional view of the same as in FIG. 64.
Figure 67B:
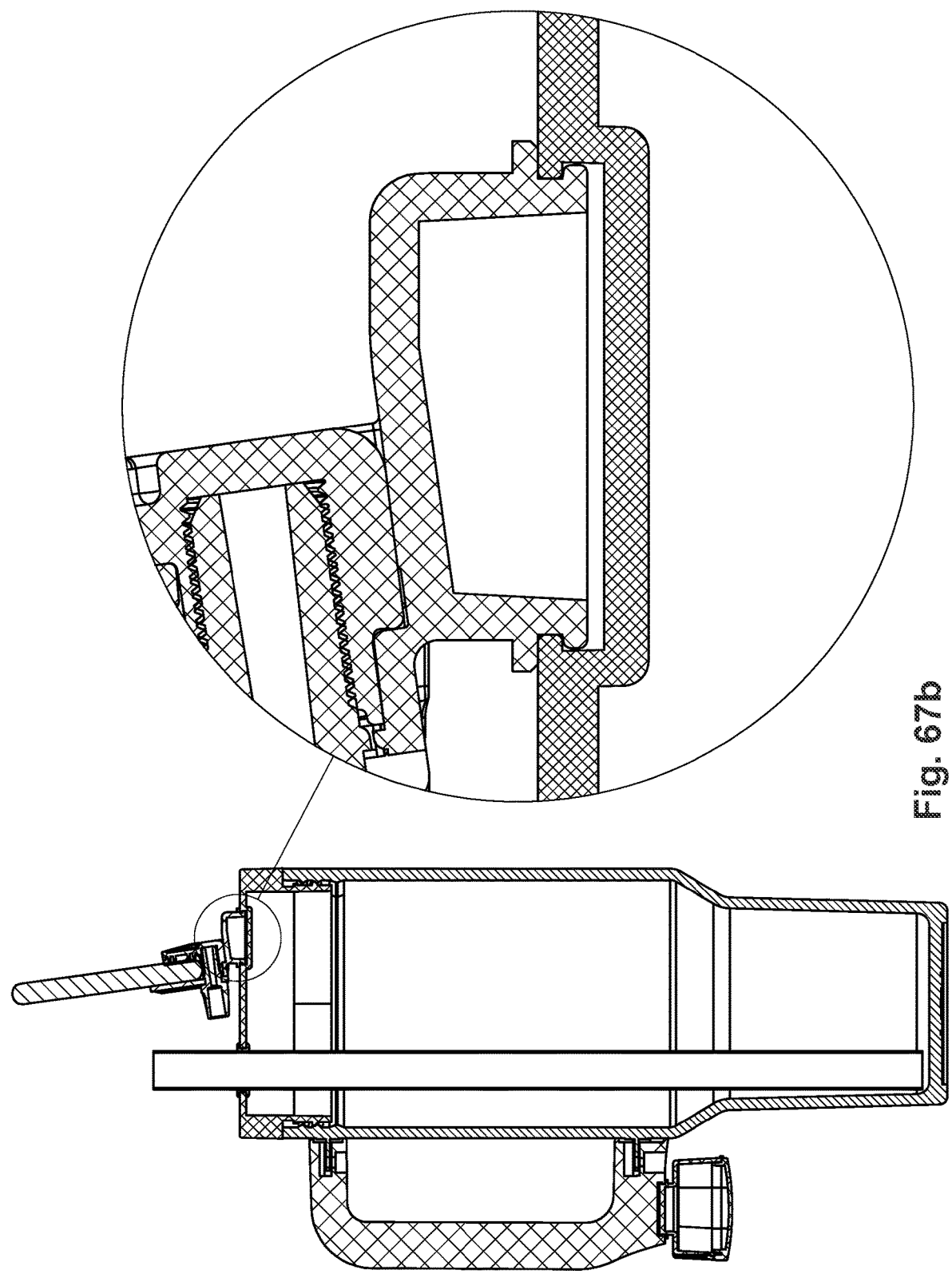
FIG. 67b shows the same as in FIG. 67a when the phone and the phone holder and stand accessory are assembled onto the liquid vessel.
Figure 67C:
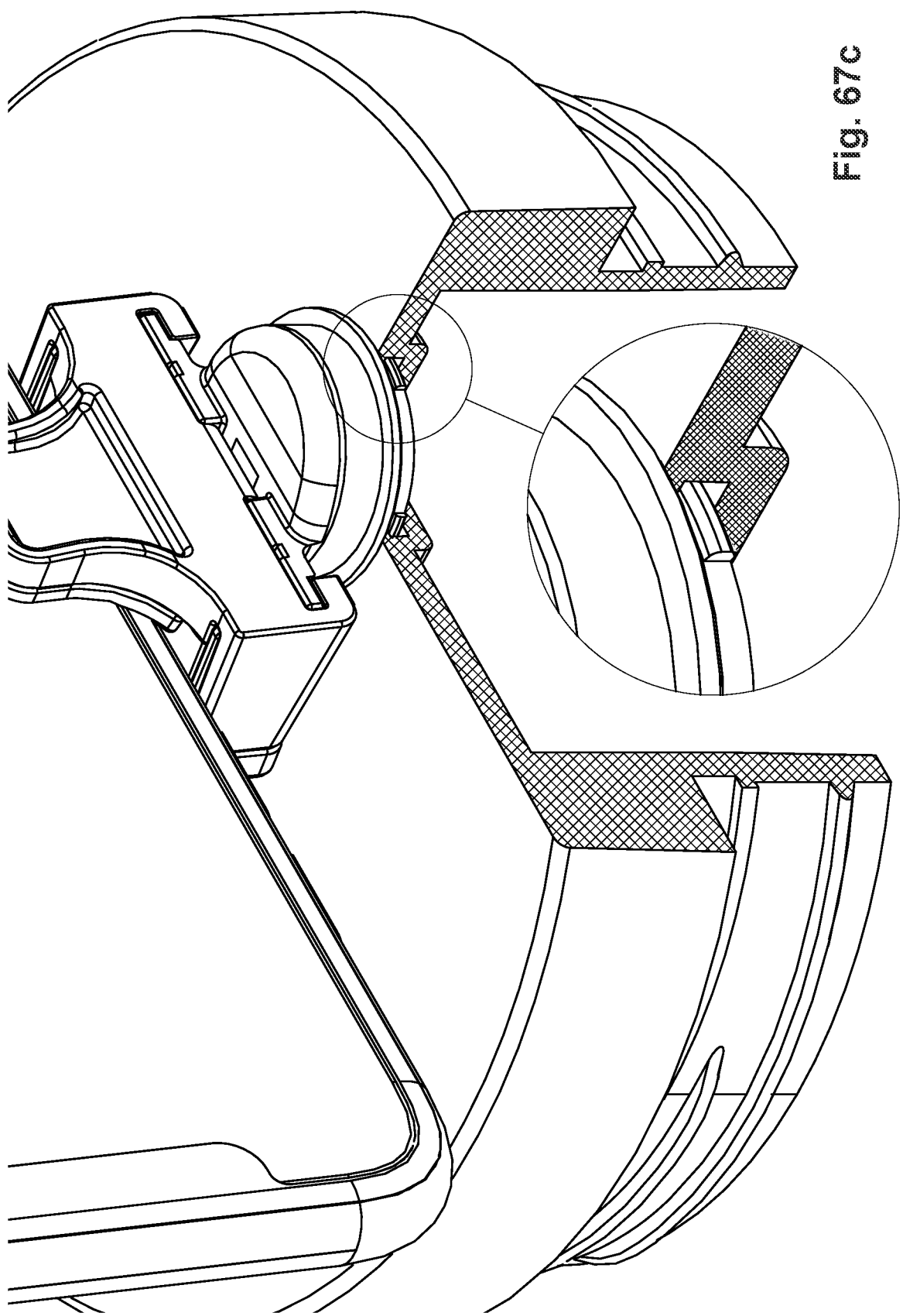
FIG. 67c shows a perspective view of a quarter-part cross-sectional view showing interaction between the phone holder and stand accessory and the first attachment face of the same.

The extent of each snap protrusion 267 may be selected to allow the entire second attachment face 244 to elastically deform and protrude through the snap lip 115 so that the snap protrusions 267 fit in the circular opening 116 when the phone holder and stand accessory 240 is assembled onto the spout cover 270, as seen in FIG. 67*b*. Exact dimensions of the snap protrusions 267 and the depth of the circular opening 116 may be selected based on material properties of the phone holder and stand accessory 240 and the material properties of the spout cover 270, as can be easily understood by those skilled in the art.

The present invention greatly simplifies the use of many accessories. For example, if the pillbox accessory is attached to the spout cover, all the user has to do to access the pills inside is to flip open the pillbox cover. There is no need to detach the accessory from the liquid container. In addition, there is no need to remove the liquid container itself from the bottle holder in case it is placed therein. This compares favorably with other designs known from the prior art, which typically require taking up the bottle, detaching the pillbox accessory therefrom, opening the pillbox to gain access to the content, closing the cover, re-attaching the pillbox to the bottle, and then storing the bottle away.

Universal Adapter Positioned on a Lid

Figure 23B:
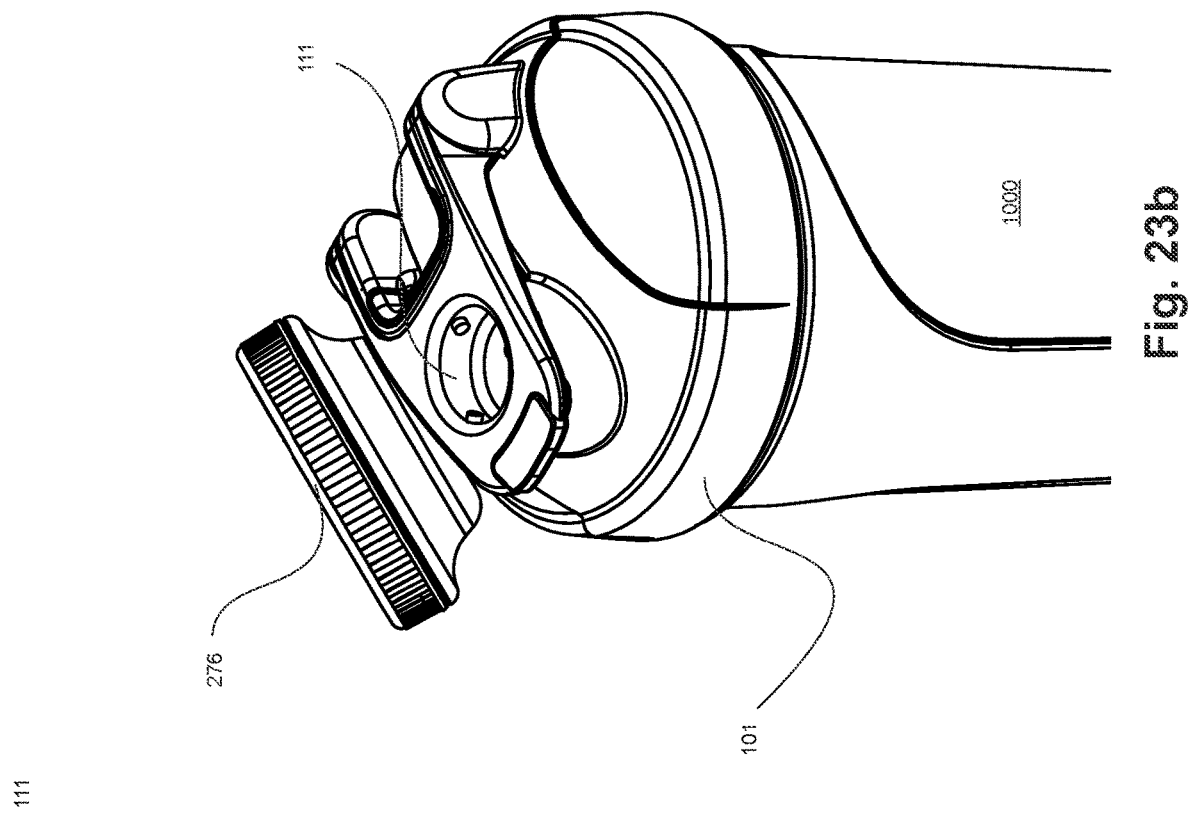
FIGS. 23a and 23b show an attachment of an accessory to the body of the lid.
Figure 23A:
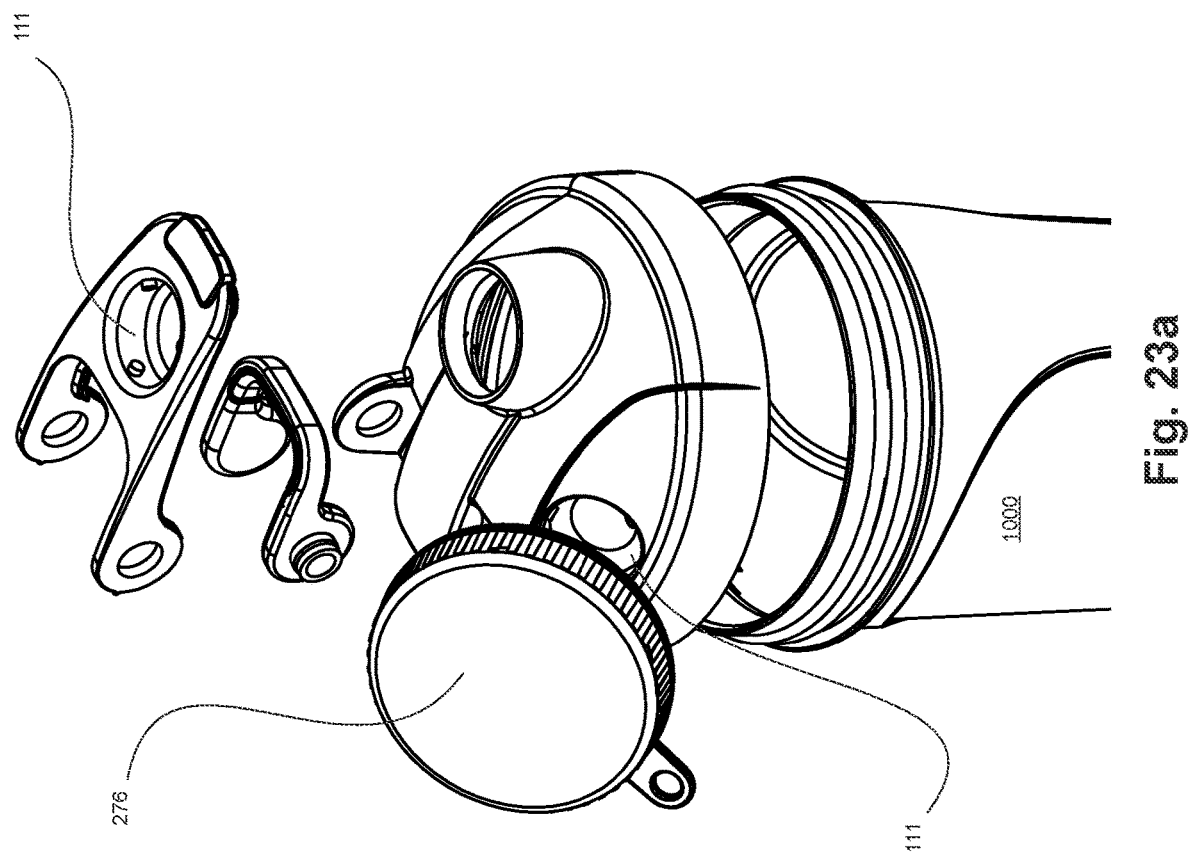
Figure 24B:
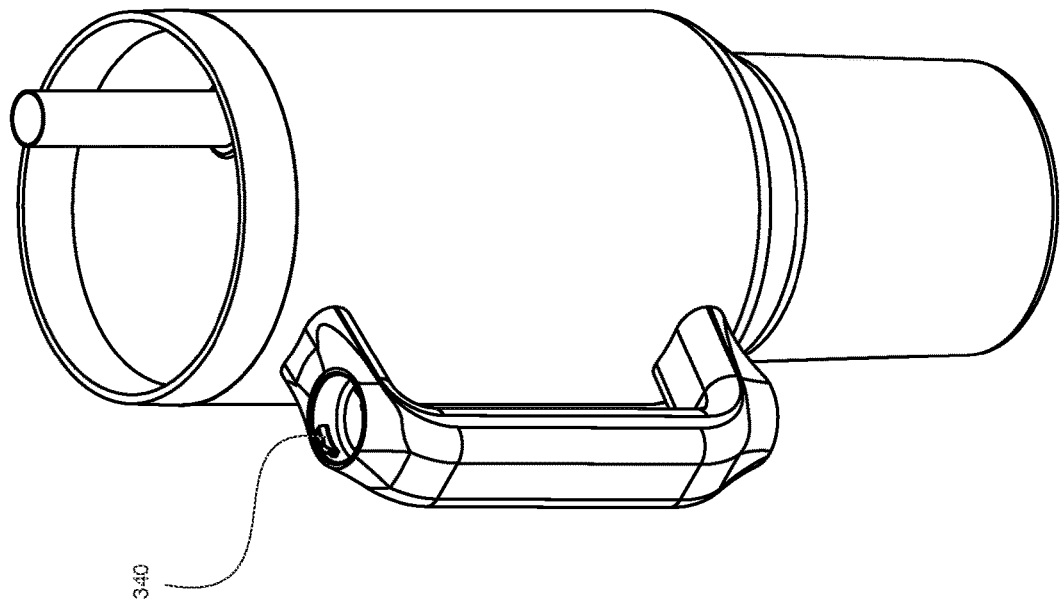
FIGS. 24a and 24b show perspective views of an embodiment of the invention in which the universal adapter is positioned on the handle of the liquid container.
Figure 24A:
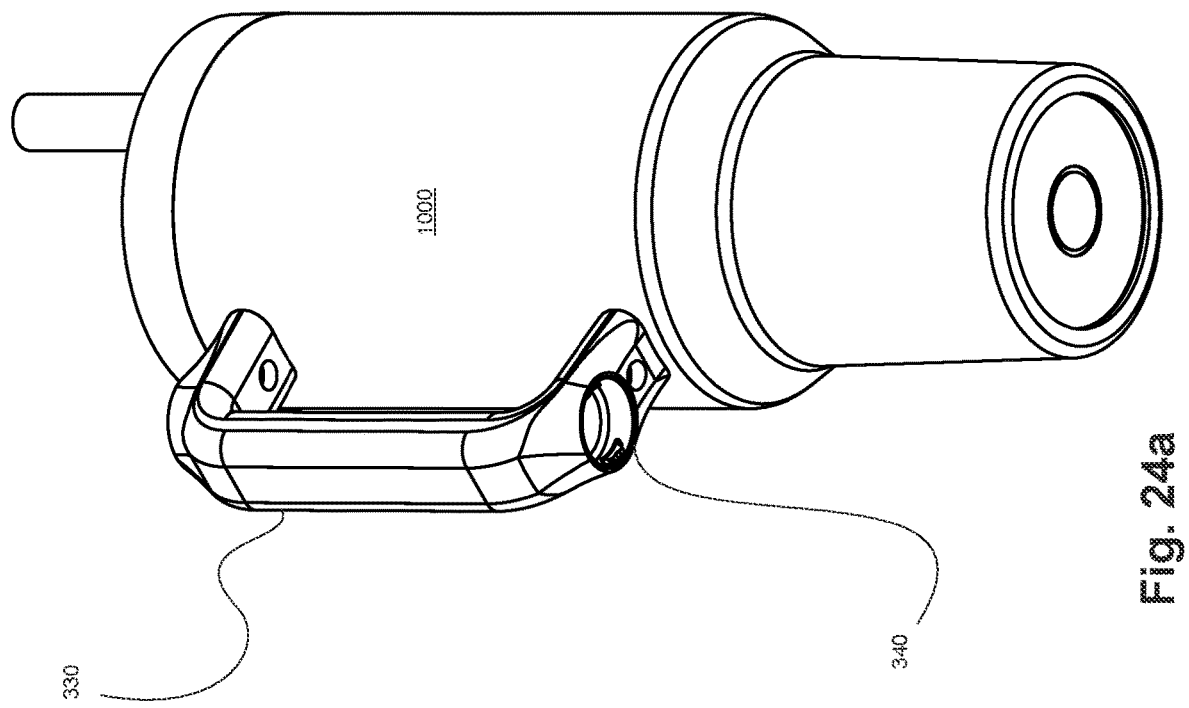

FIGS. 23a and 23b show yet another location for positioning the first attachment face 111 of the universal adapter on the liquid container of the present invention, more specifically on the lid body 101. FIG. 23a shows an exploded view, and FIG. 23b shows an assembled view—all showing the first attachment face located on a side portion of the lid body 101, away from the flip cap, which may contain another first attachment face 111. This embodiment is an example of a design containing more than one universal adapter so as to allow the attachment of several accessories to the liquid container at the same time.

The position of the universal adapter incorporated with the lid may be selected to assure that any of the accessories attached thereto do not interfere with the opening and closing of the flip cap, and also do not interfere with the action of drinking the fluid from the liquid container.

FIGS. 46 through 55 show a further alternative of the present invention in which the first attachment face of the universal adapter is located on the lid of the liquid container. The elongated liquid vessel 1000, in this case, is a squeeze bottle configured to allow side compressions by the user. The lid of this liquid container features an elevated spout 1020 located at a higher elevation as compared to other liquid vessels described herein to facilitate directing the stream of fluid emanating therefrom to not interfere with the accessory attached to the liquid container.

Figure 48:
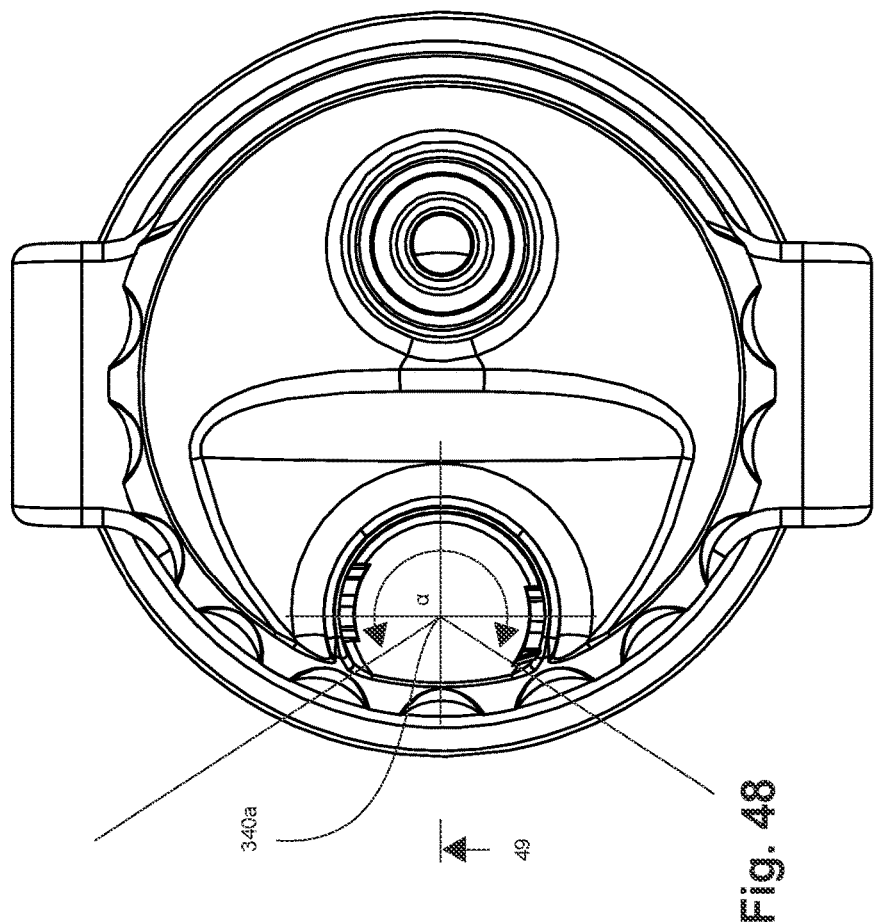
FIG. 48 illustrates a top view of the same.

In embodiments, at least one or both a first attachment face and a second attachment face may not contain a full circumferential circular edge while having the same engagement diameter. The engagement diameter may be defined as the inner diameter of the cavity of the first attachment face and an outer diameter of the circular portion of the second attachment face that fits inside the cavity of the first attachment face. The embodiment in FIGS. 46-55 features an Ω-shaped partial circular profile of the first attachment face 340, with the center of the circle 340a located as seen in FIG. 48. To retain the fully circular second attachment face of the accessory inside thereof, the Ω-shaped partial circle of the first attachment face 340 may be designed to cover more than one-half of the entire circular edge of the first attachment face 340 shown elsewhere in this description. In embodiments, at least one of the cavities of the first attachment face or the circular portion of the second attachment face define an edge positioned along a portion of the engagement diameter circle containing at least 60% of the full engagement diameter circle. Having at least 60% of the entire circular periphery (arch α in FIG. 48) of the engagement circle may be sufficient to fully position both internal engagement protrusions 232 in their correct positions opposite each other, as well as to retain a fully circular edge of the second engagement face of the accessory firmly retained at the liquid container of the invention. In other embodiments, the Ω-shaped partial circular edge of the first attachment face 340 or the second attachment face (not shown in the drawings) may contain at least 70% of the full circle, at least 80% of the full circle, or up to 90% of the full circle.

Using an Ω-shaped partial circular peripheral edge allows to shift the position of the universal adapter further away from the spout 1020, therefore minimizing the risk of any interference between the stream of fluid coming out of the spout when the bottle is squeezed and the accessory attached to the liquid container.

Figure 50B:
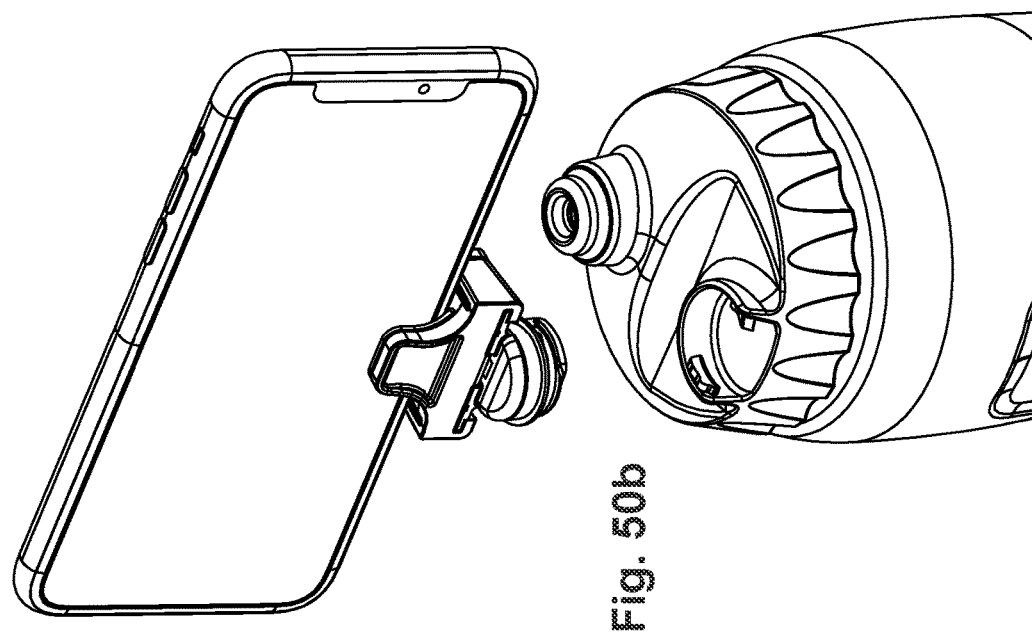
FIG. 50b shows the same in an assembled state.
Figure 50A:
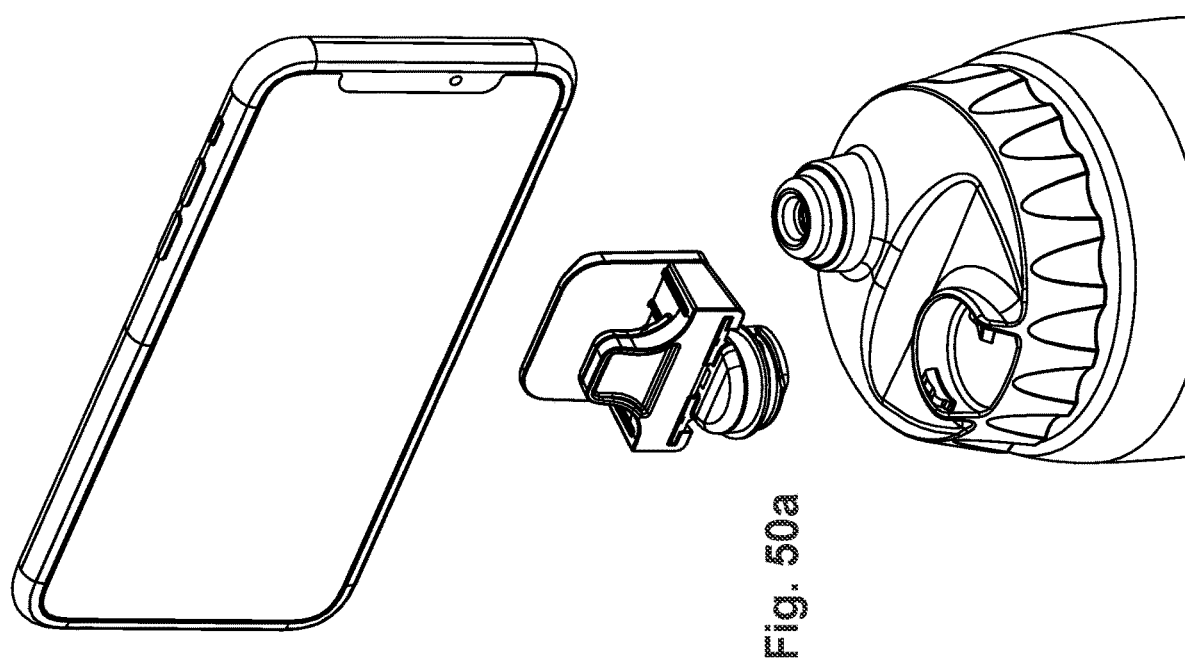
FIG. 50a shows an exploded perspective view of the squeeze bottle with a phone stand and holder accessory and the smartphone.
Figure 51B:
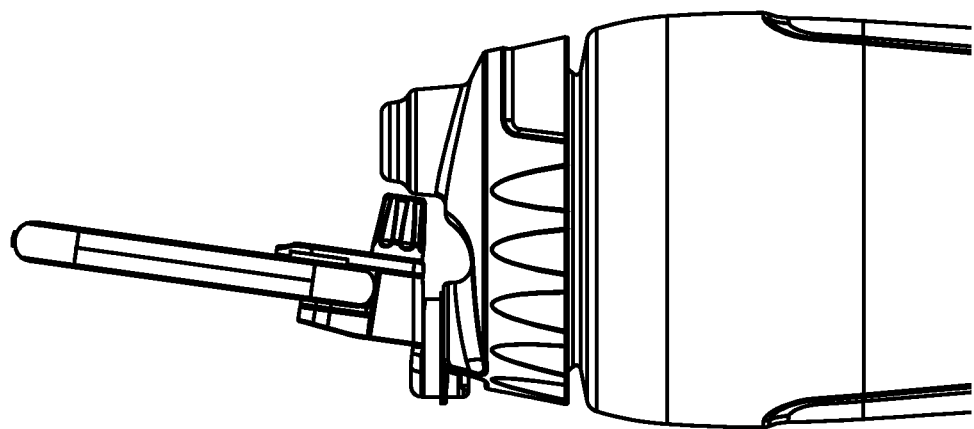
FIGS. 51a and 51b show a front view and a side view of the same as in FIG. 50b.
Figure 51A:
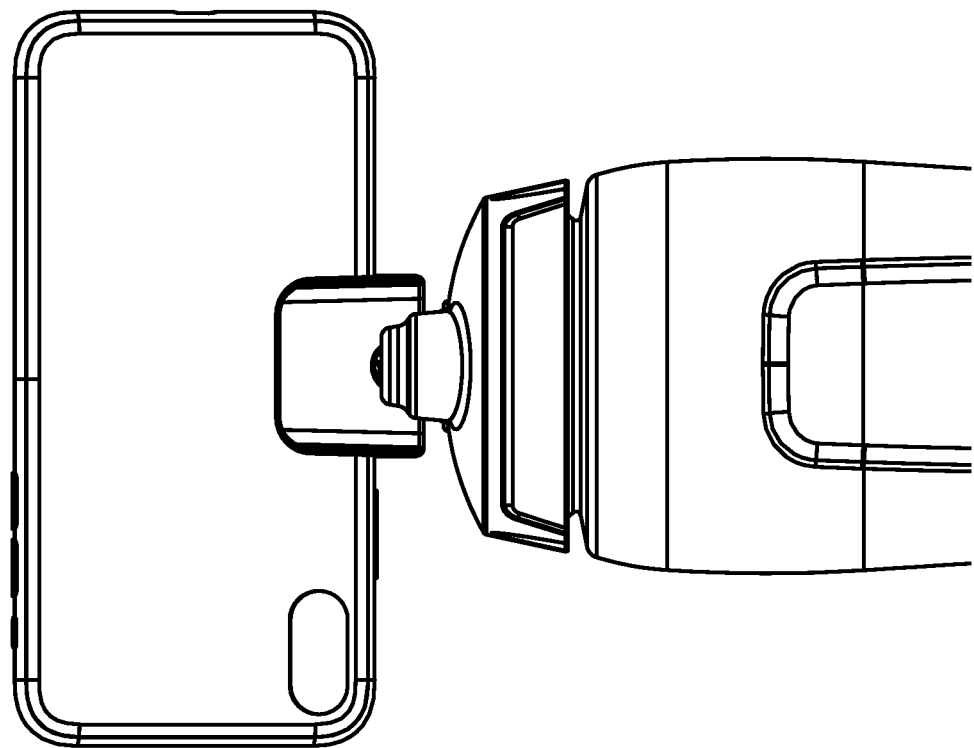
Figure 52B:
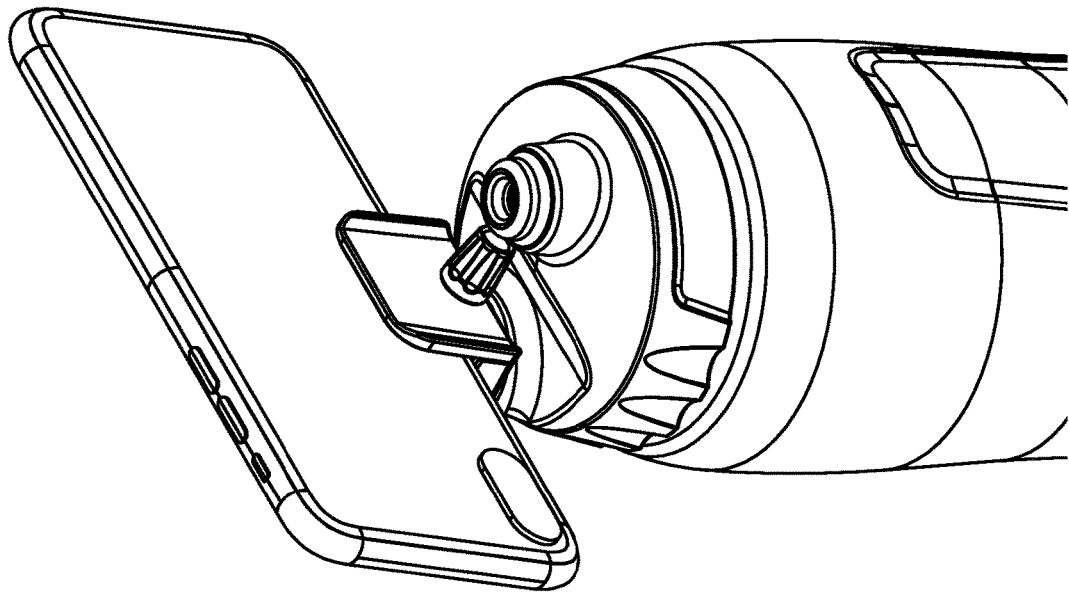
FIGS. 52a and 52b show alternative perspective side views of the same.
Figure 52A:
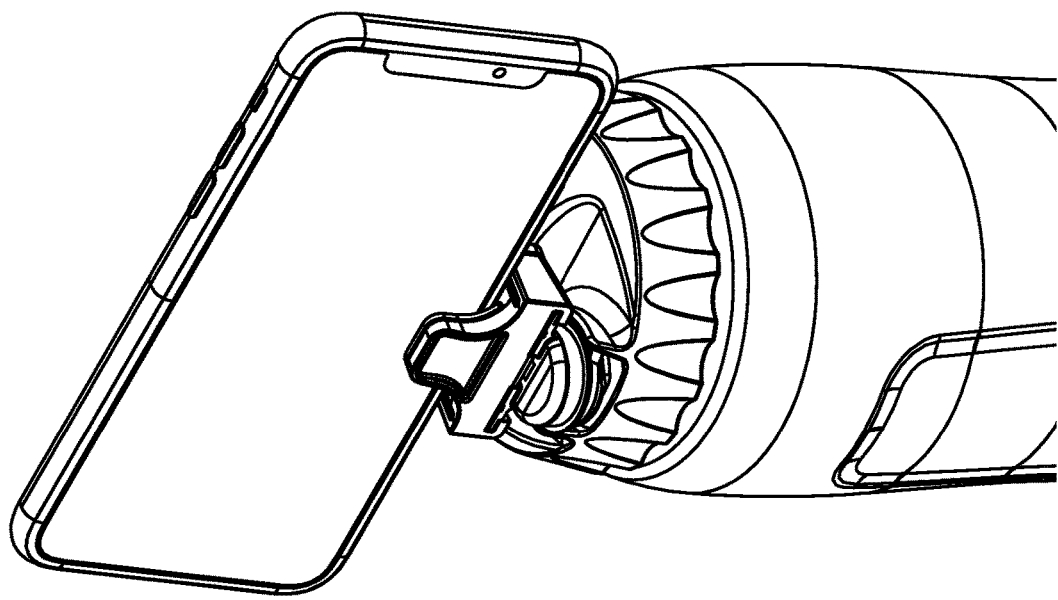
Figure 53:
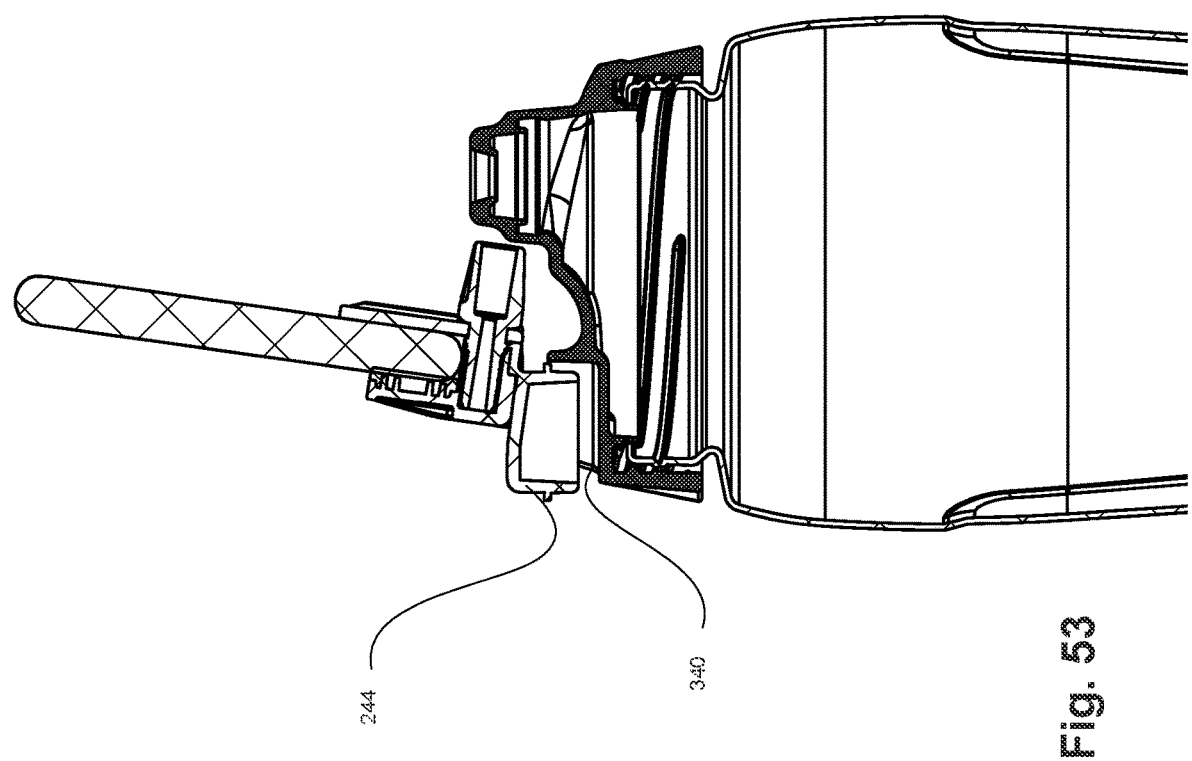
FIG. 53 shows a cross-sectional view of the assembly from FIG. 50b.

FIGS. 50a and 50b show an exploded view and an assembled view of attaching a phone stand and holder accessory with a smartphone to the elongated liquid vessel 1000 in the form of a squeeze bottle of this embodiment of the invention. Protrusion of the lower portion 244 outside the boundary of the first attachment face 340 is seen in the cross-sectional view in FIG. 53.

Figure 54C:
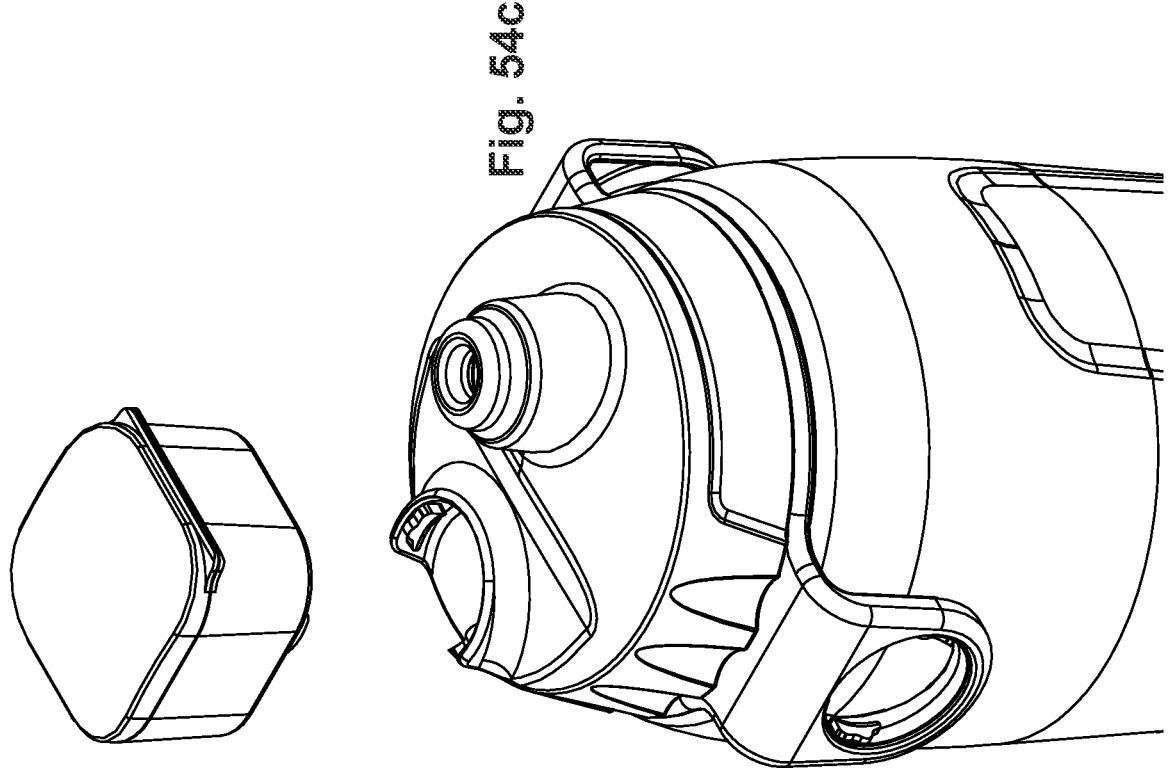
FIG. 54c shows an exploded view of the same.
Figure 54B:
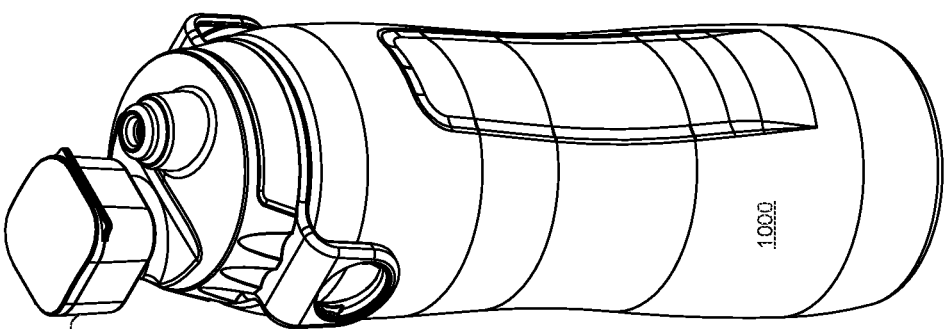
FIGS. 54a and 54b show alternative perspective side views of the squeeze bottle with a pillbox assembly.
Figure 54A:
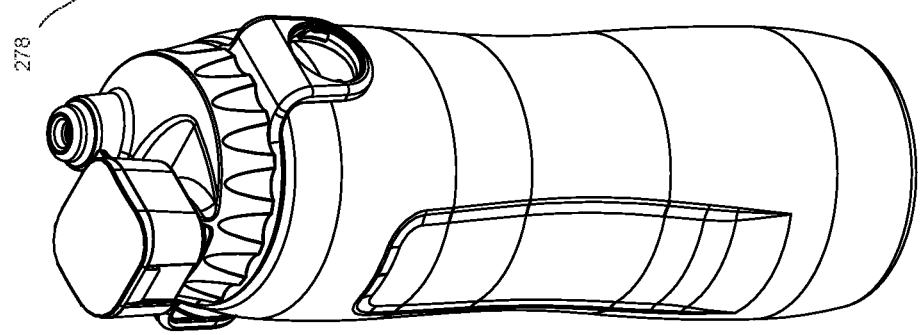
Figure 57:
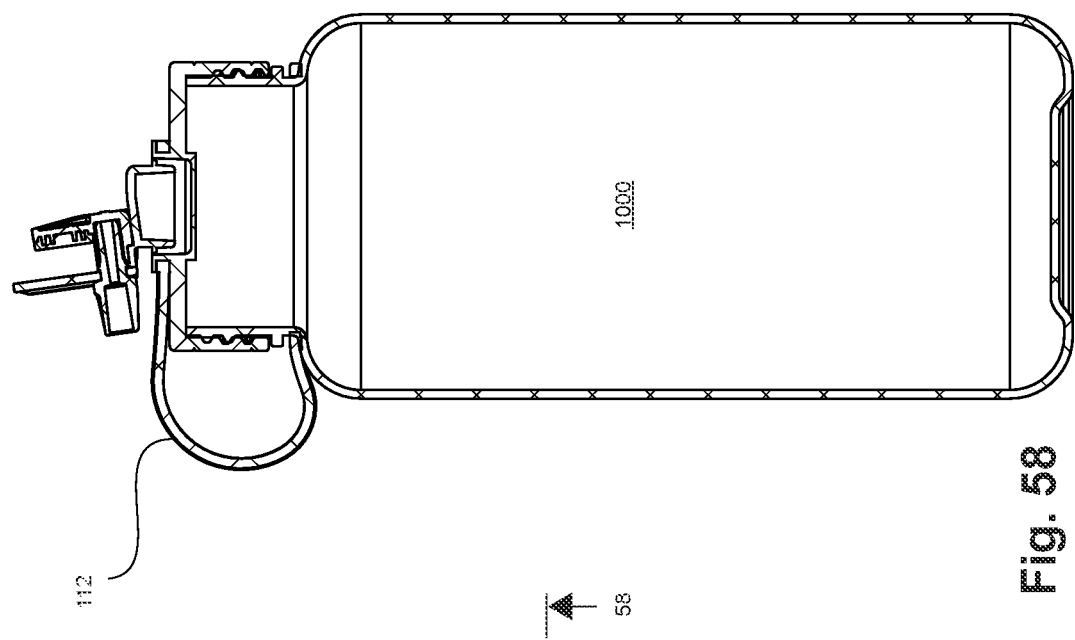
FIG. 57 shows a top view of the same.
Figure 58:
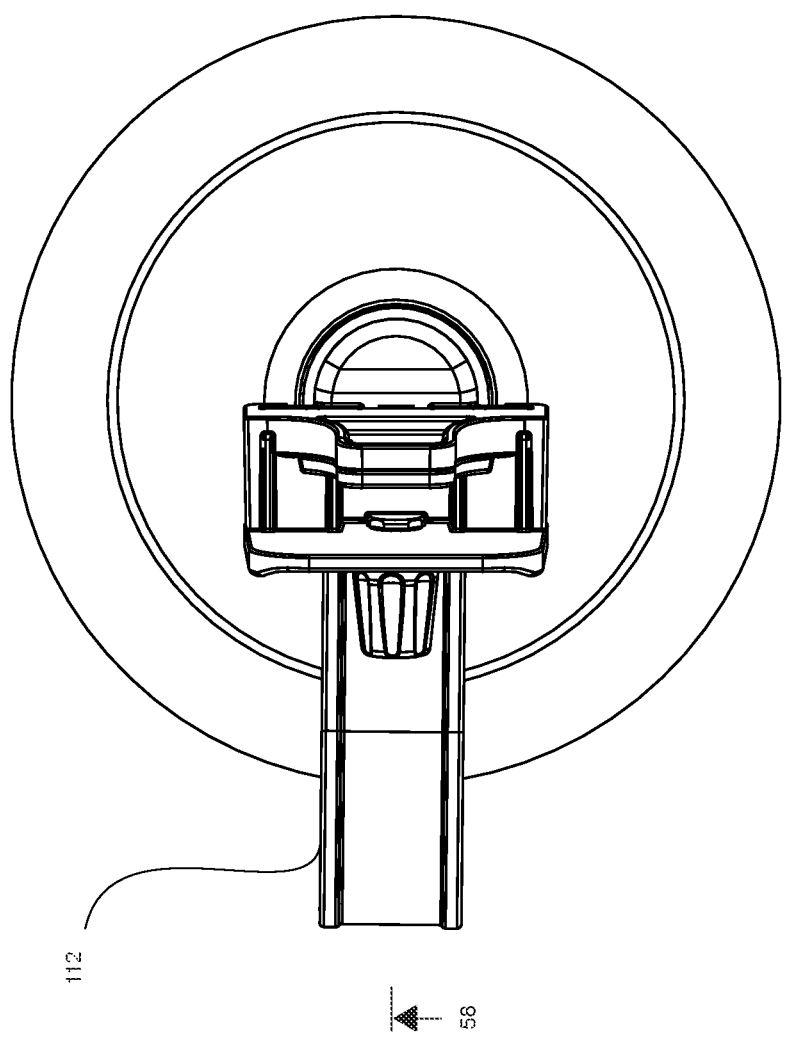
FIG. 58 shows a cross-sectional view of the same.
Figure 59:
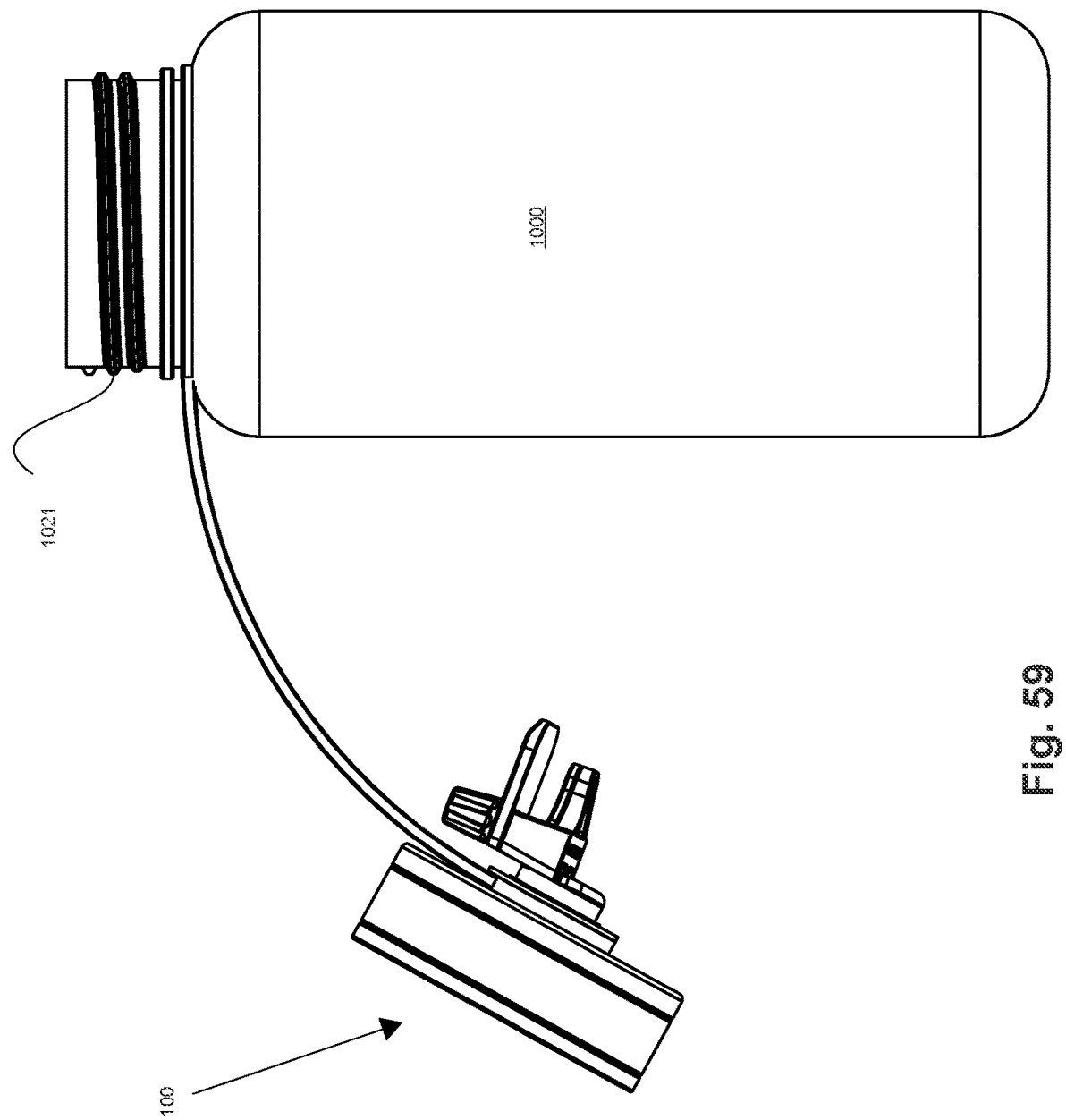
FIG. 59 shows a side view of the same with the lid removed from the liquid vessel.

FIGS. 54 and 55 show various views of the pill box 278 attached to the elongated liquid vessel 1000.

Figure 20A:
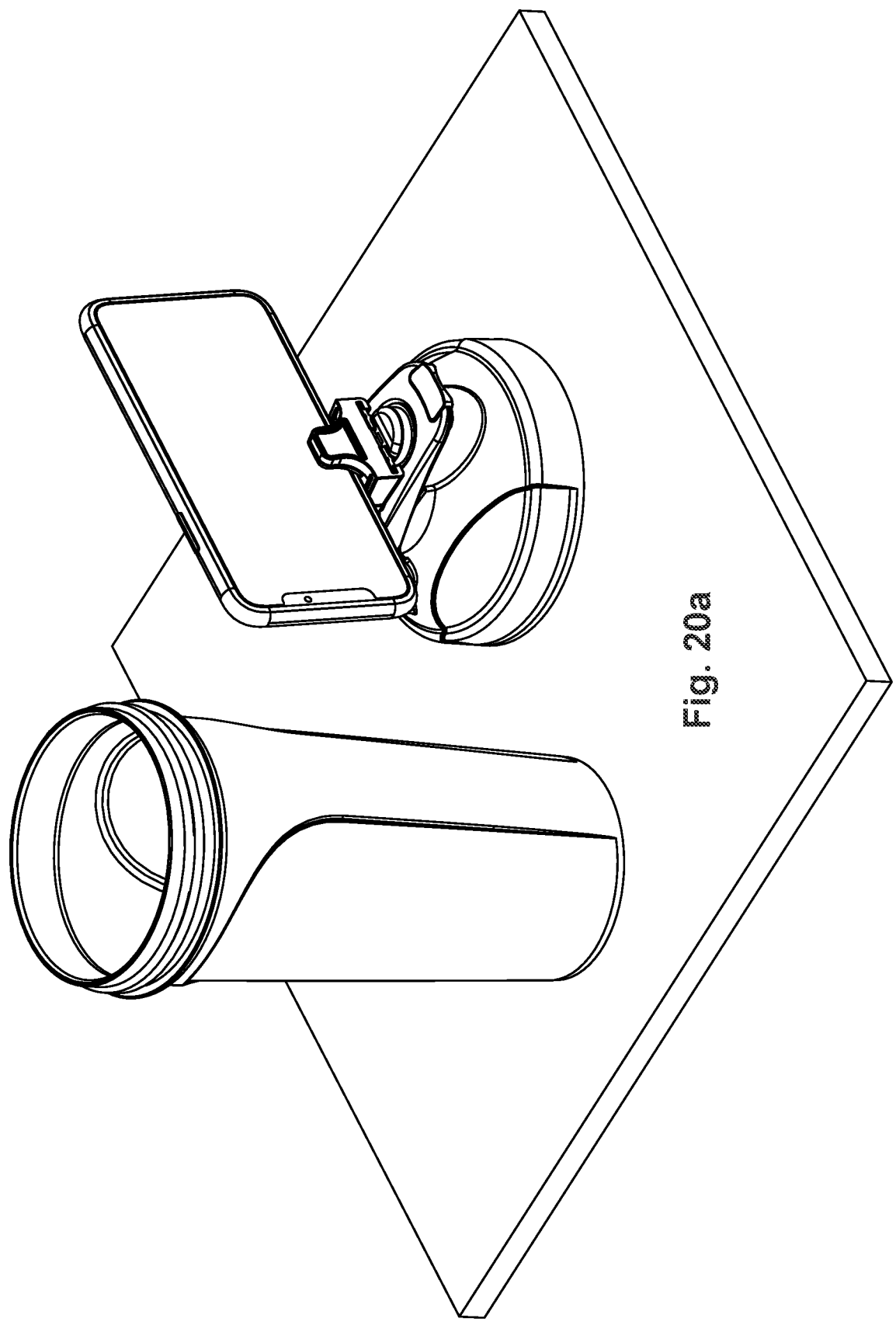
FIG. 20a shows the use of the lid alone as a stand for the phone accessory.
Figure 20B:
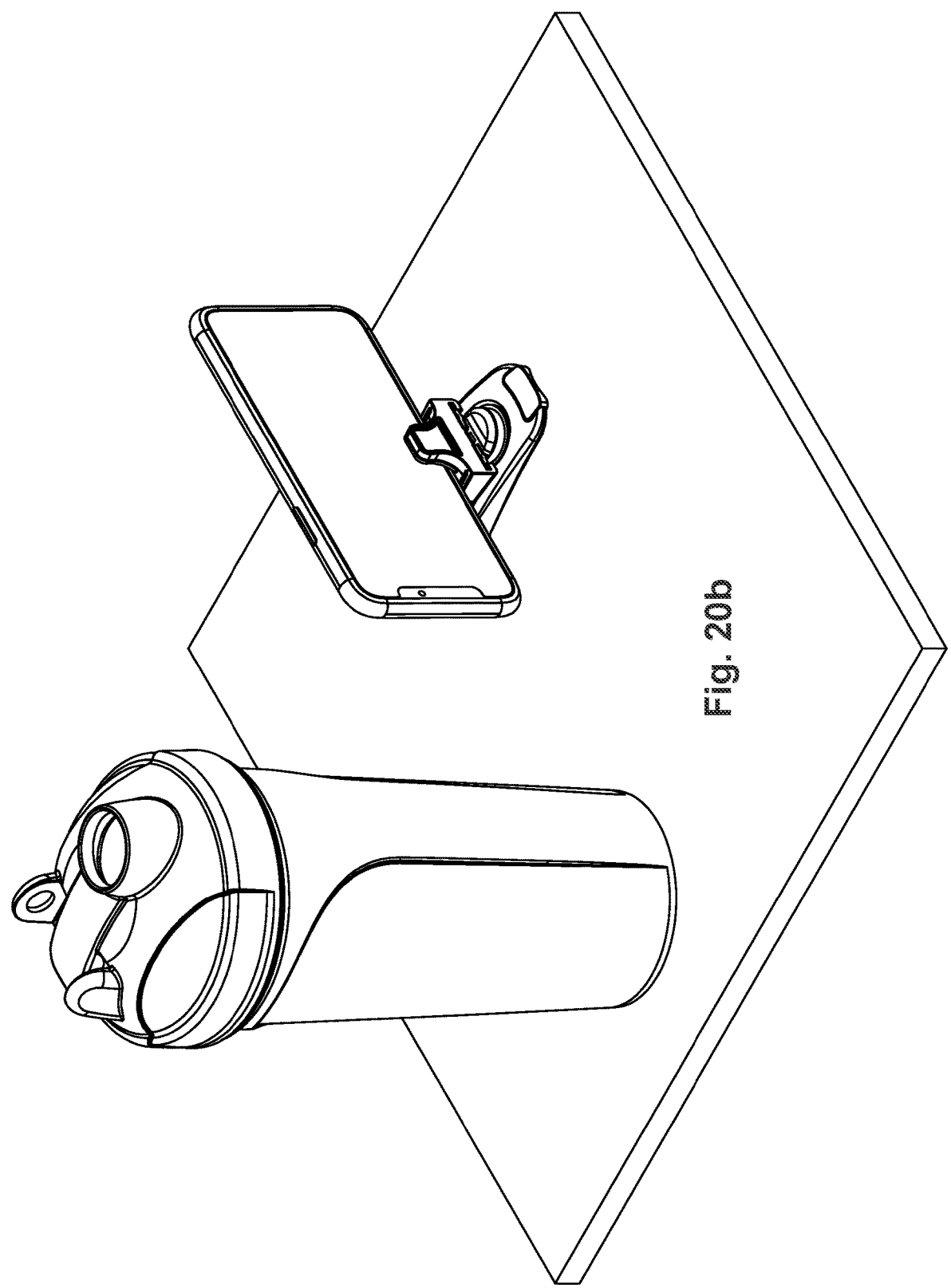
FIG. 20b shows the use of a detachable flip cap alone as a stand for the phone accessory.
Figure 20D:
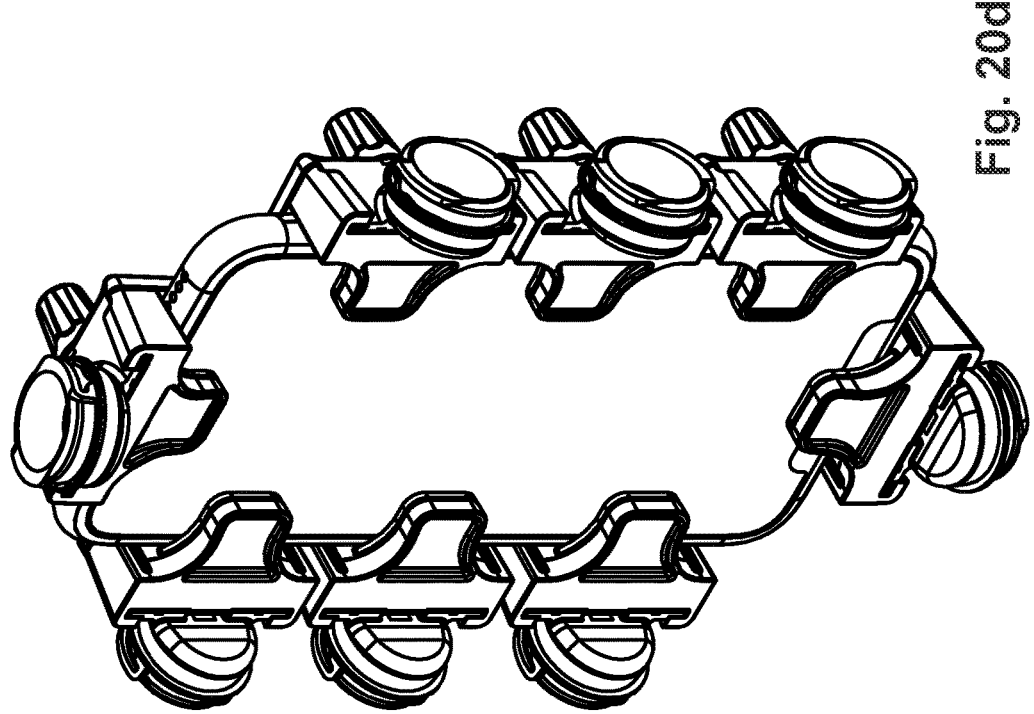
FIGS. 20c and 20d show a front and a perspective side view of the phone with various positions of the phone holder accessory attached thereto around the periphery of the phone.
Figure 20C:
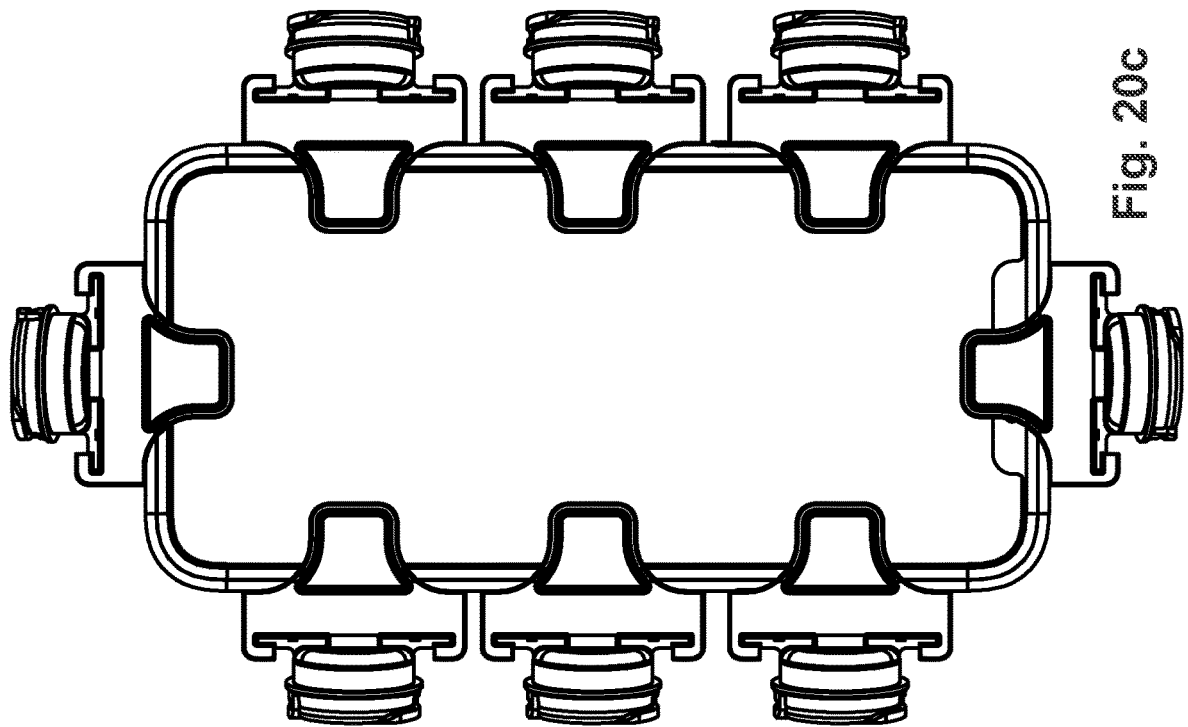

When the universal adapter is positioned on a flip cap or the lid of the liquid container, the invention allows the use of a detached lid as a separate stand for the phone's hands-free use, as seen in FIG. 20a. Alternatively, in some embodiments, the flip cap may be configured to be detachable from the lid, in which case it may be shaped to be used as a stand-alone base facilitating a hands-free use of the phone, as shown in FIG. 20b. This method of using the invention allows drinking from the liquid vessel while watching a video, for example. It is also advantageous to move the phone position lower to the ground or the table surface. In other circumstances, the user may be able to drink from the liquid container while the lid with the phone on top thereof is detached therefrom and is used to watch a video at the same time. Furthermore, if the liquid vessel is empty, using the lid or flip cap alone as a base for the phone makes the position of the phone more stable. Finally, a selection of different heights for positioning the phone allows greater flexibility in selecting the preferred angle and height for hands-free video recording or taking photographs.

FIGS. 56-59 illustrate yet another example of positioning the universal adapter on the lid 100 of the elongated liquid vessel 1000. In this case, the lid 100 includes a flexible strap 112 configured to retain the lid 100 attached to the elongated liquid vessel 1000 when it is removed from the wide-mouth spout 1021. The flexible strap 112 extends between a retaining loop 114 and the central button 113 in the middle of the lid 100. The present invention may advantageously utilize the internal volume of the central button 113 by making it largely hollow and positioning the cavity of the first attachment face 340 within thereof—see the cross-sectional view in FIG. 58.

This embodiment is particularly advantageous for attaching the accessory (such as the phone holder and stand accessory 240 or others) on top of the liquid container for better access thereto. FIG. 56a shows an exemplary exploded view of the components of this configuration, showing the phone accessory equipped with the lower portion 244 containing the second attachment face above the first attachment face 340 embedded into the central button 113. FIG. 56b shows the same in the assembled position.

When the lid 100 is removed from the wide-mouth spout 1021, the phone accessory may still be attached to the lid as it does not obstruct its full use in any of the opened or closed positions.

Universal Adapter Positioned on a Handle

Figure 26:
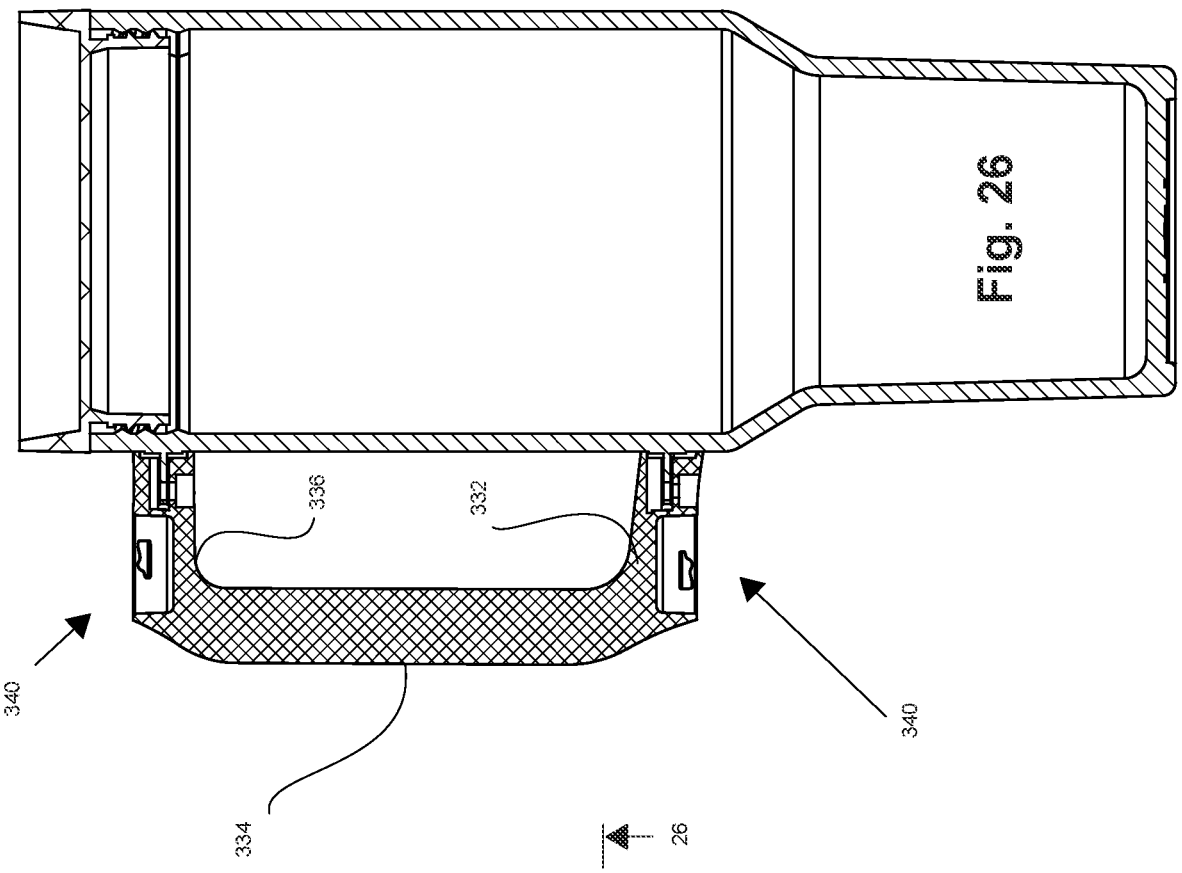
FIG. 26 shows a cross-sectional side view of the same.
Figure 25:
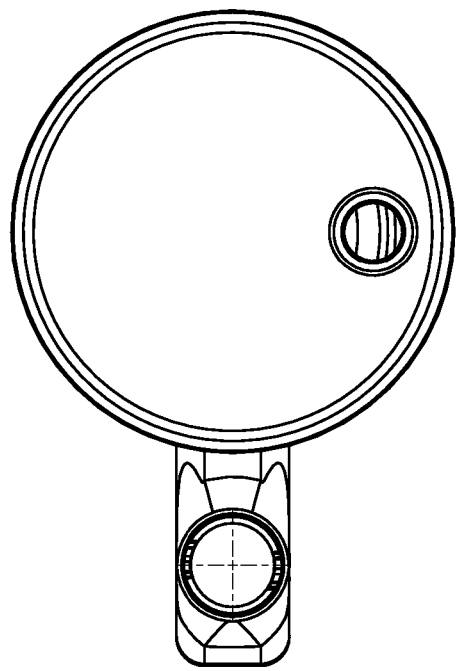
FIG. 25 illustrates a top view of the same.

As mentioned above, various types and sizes of liquid vessels may be used for the purposes of the present invention. One such alternative liquid vessel is seen in FIGS. 24 to 31. This liquid vessel is oversized as compared to traditional water bottles and has a narrow bottom portion sized to fit in a standard cupholder well. Standard-size cupholder wells are present in many cars, as well as are featured as part of exercise machine consoles, baby strollers, and many other places. The top portion of elongated liquid vessel 1000 is larger in diameter than its bottom portion, so it may retain more fluids as compared to a conventional liquid vessel. In one example, the liquid vessel may be about 4 inches in diameter and about 10 inches tall. Such liquid vessels are generally equipped with a C-shaped handle 330 to make it convenient to hold a large and generally heavy elongated liquid vessel 1000 when it is filled with water or another fluid. The C-shaped handle 330 generally includes a lower horizontal section 332, which transitions to a longer vertical section 334, which, in turn, transitions to an upper horizontal section 336, as seen in FIG. 26, for example. These handles are generally quite large in their cross-section, which is made for ergonomic reasons of facilitating holding a large bottle and not for any structural improvement. Therefore, there is a large space within the boundaries of the traditional handle to position the universal adapter to be flush with the outside surface of the handle.

An exemplary C-shaped handle 330 may be about 5 inches long and may extend to one side of the elongated liquid vessel 1000 by as much as 2 inches as measured from the outmost surface of the C-shaped handle 330 to the outer wall of the liquid vessel. The thickness of the C-shaped handle 330 may be about 0.5 inches or more, leaving clearance for the hand of the user between the C-shaped handle 330 and the elongated liquid vessel 1000 of about 1.5 inches. Such handles may be permanently incorporated with the elongated liquid vessel 1000, or in other embodiments, may be detached therefrom by using a threaded lock at the lower and upper sections thereof, as seen in FIG. 26.

One or more universal adapters with the first attachment face 340 with the first attachment face may be positioned at various points on the handle 330. As seen in FIGS. 24 to 31, a universal adapter is located on the upper horizontal section 336 and on the lower horizontal section 332 of the handle 330. The handle 330 may include one or more suitably sized cavities configured to house the universal adapter with the first attachment face 340, so its upper edge may be flush with the rest of the handle's external surfaces. Making the position of the universal adapter flush with the surrounding surface of the handle makes it convenient to use since when no accessory is attached to the handle, there is no protrusion of any part of the present invention above the natural surfaces of the conventional handle, that would otherwise create an impediment to holding the liquid container. At the same time, the presence of one or more universal adapters may be made in a manner that does not compromise the durability and structural utility of the handle, even in the case of large liquid containers filled entirely with a beverage.

Figure 29:
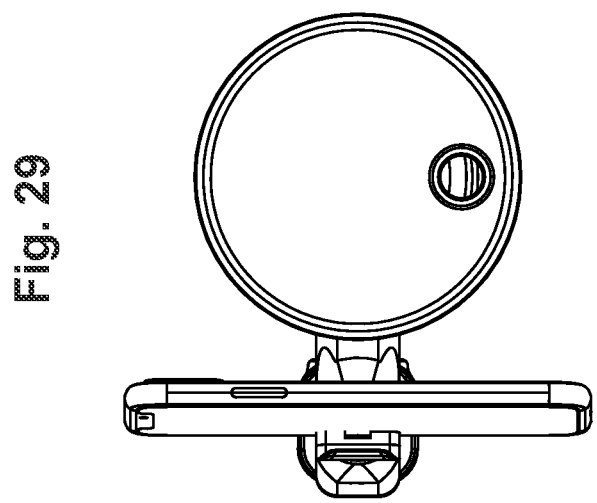
FIG. 29 shows a top view of the same.
Figure 28:
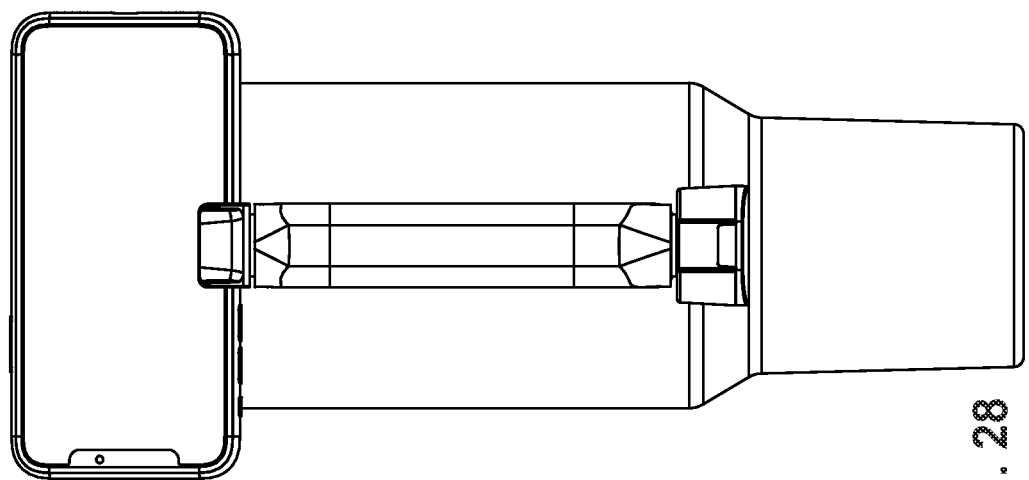
FIG. 28 shows a back view of the same.
Figure 27:
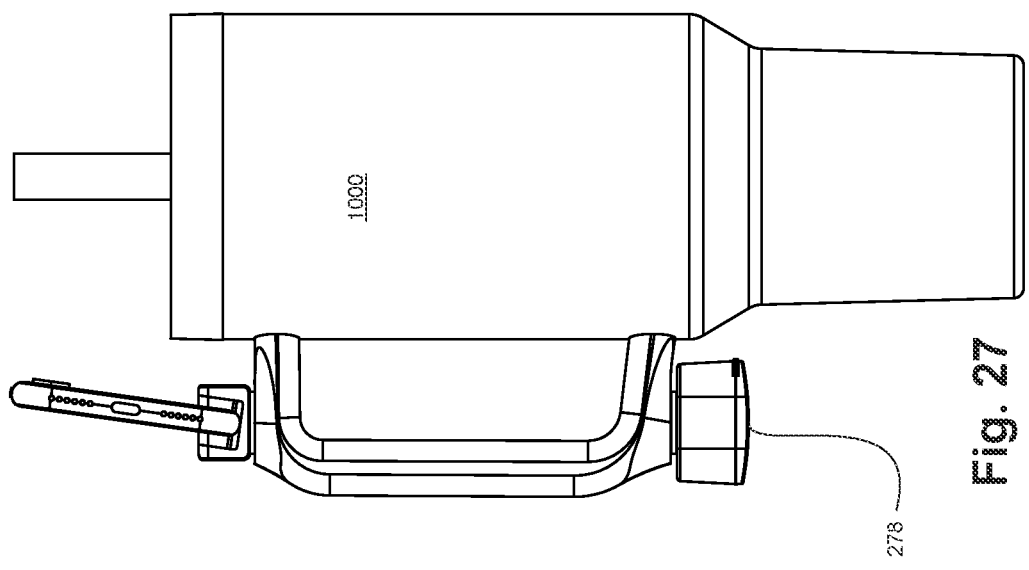
FIG. 27 shows a side view of the liquid container with two universal adapters containing a pill box and the phone holder and stand accessories on the handle of the liquid container.

The universal adapter may be aligned to face up or down along with the vertical axis of the elongated liquid vessel 1000. FIGS. 27 to 29 show an example of the liquid container of the present invention in which a pill box is attached to the lower universal adapter and a phone holder and stand accessory is attached to the upper universal adapter, both of which are incorporated into a handle 330 of the container. This example shows that one or more accessories may be interchangeably attached to the handle using one or more universal adapters.

Figure 30B:
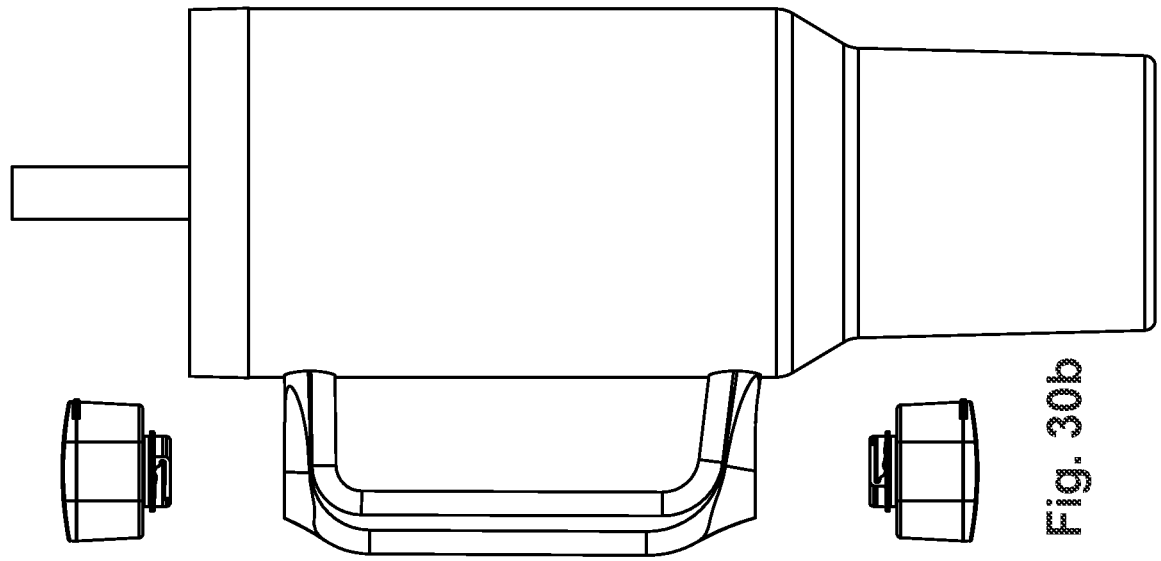
FIG. 30b shows an exploded side view of the same.
Figure 30A:
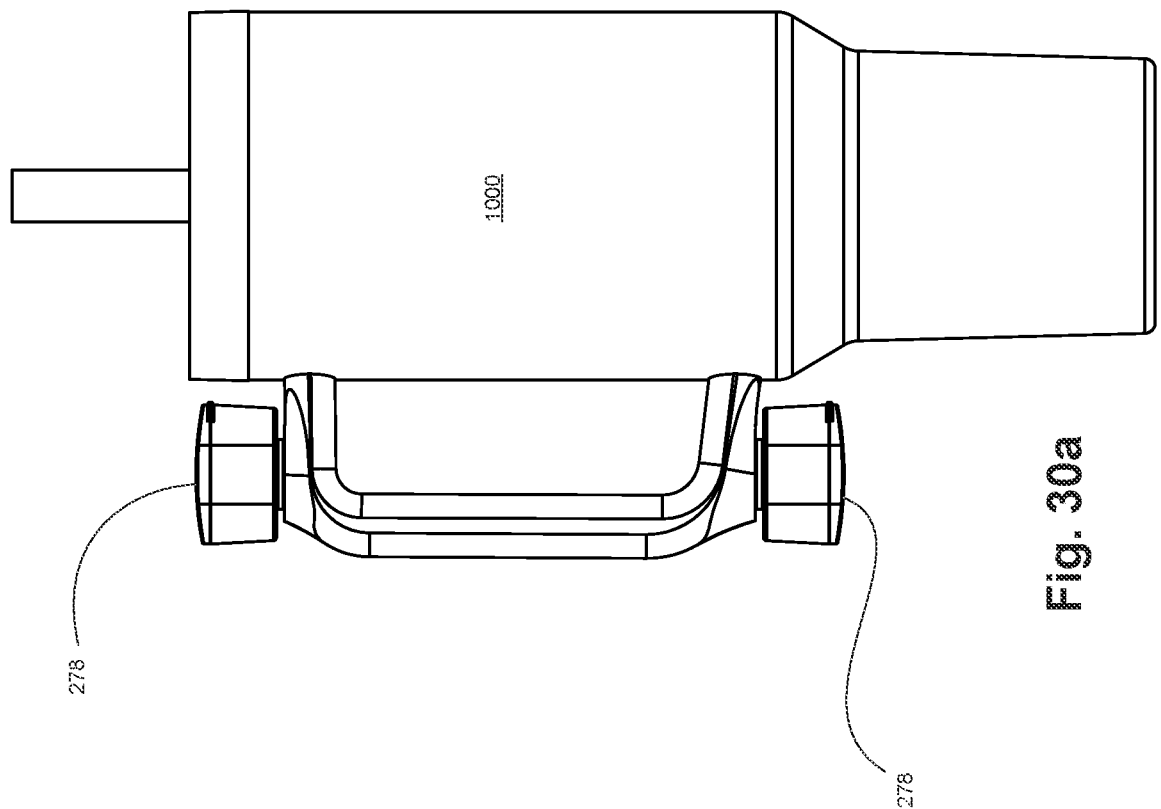
FIG. 30a shows a side view of the liquid container assembly with two pillbox accessories attached to the handle thereof.

FIGS. 30a and 30b show another example of using the handle equipped with universal adapters at the upper and lower sections of the handle. In this case, two pill boxes are shown to be attached to the handle. In all of these and other examples described herein, the universal adapter may be positioned to not cause any tilt of the liquid vessel from its upright orientation when one or more accessories are attached thereto—even when there is no liquid inside the elongated liquid vessel 1000. Examples shown here also demonstrate that the attachment of one or more accessories does not increase the size of the liquid container too much so as to make it inconvenient in use by having an accessory protruding too far away from the general space occupied by the liquid container of the invention.

Figure 31C:
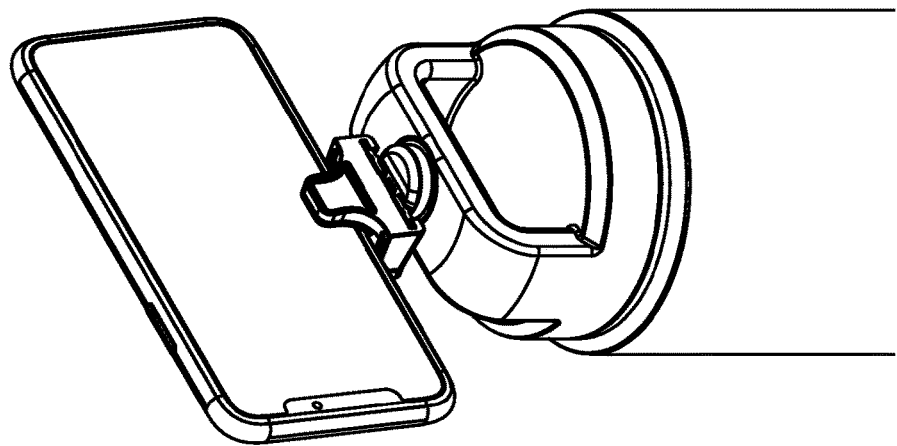
FIGS. 31a to 31c show a perspective exploded view and assembled views of a further embodiment of the invention.
Figure 31B:
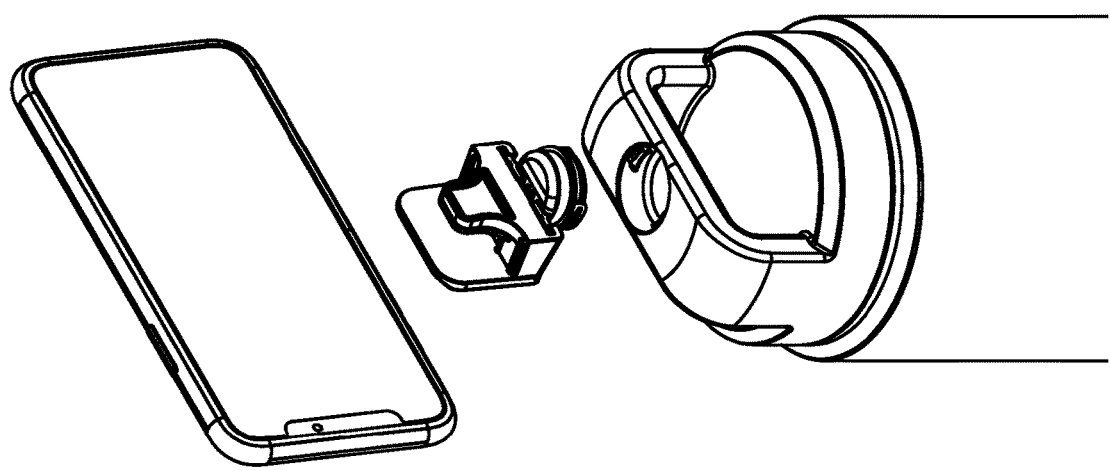
Figure 31A:
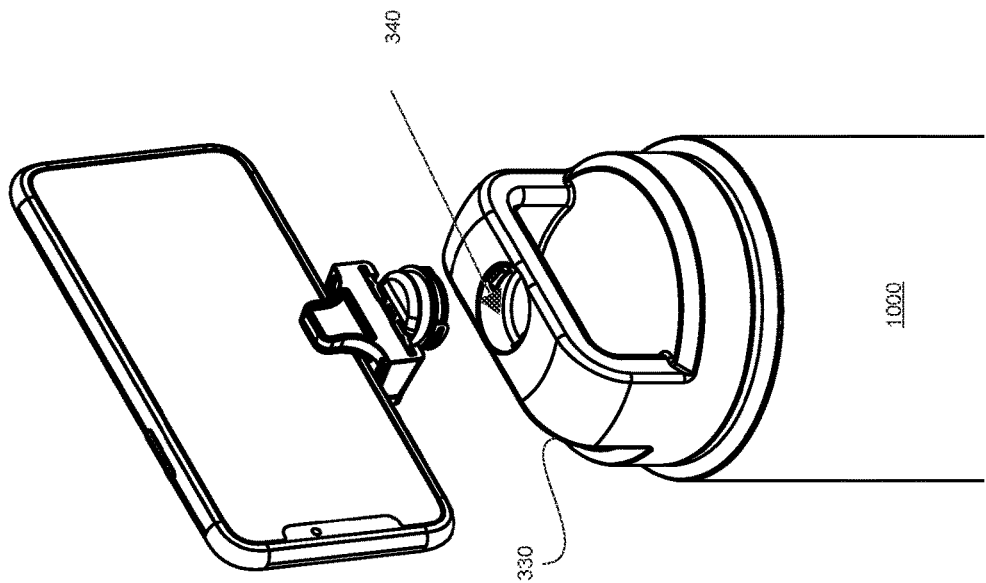
Figure 33:
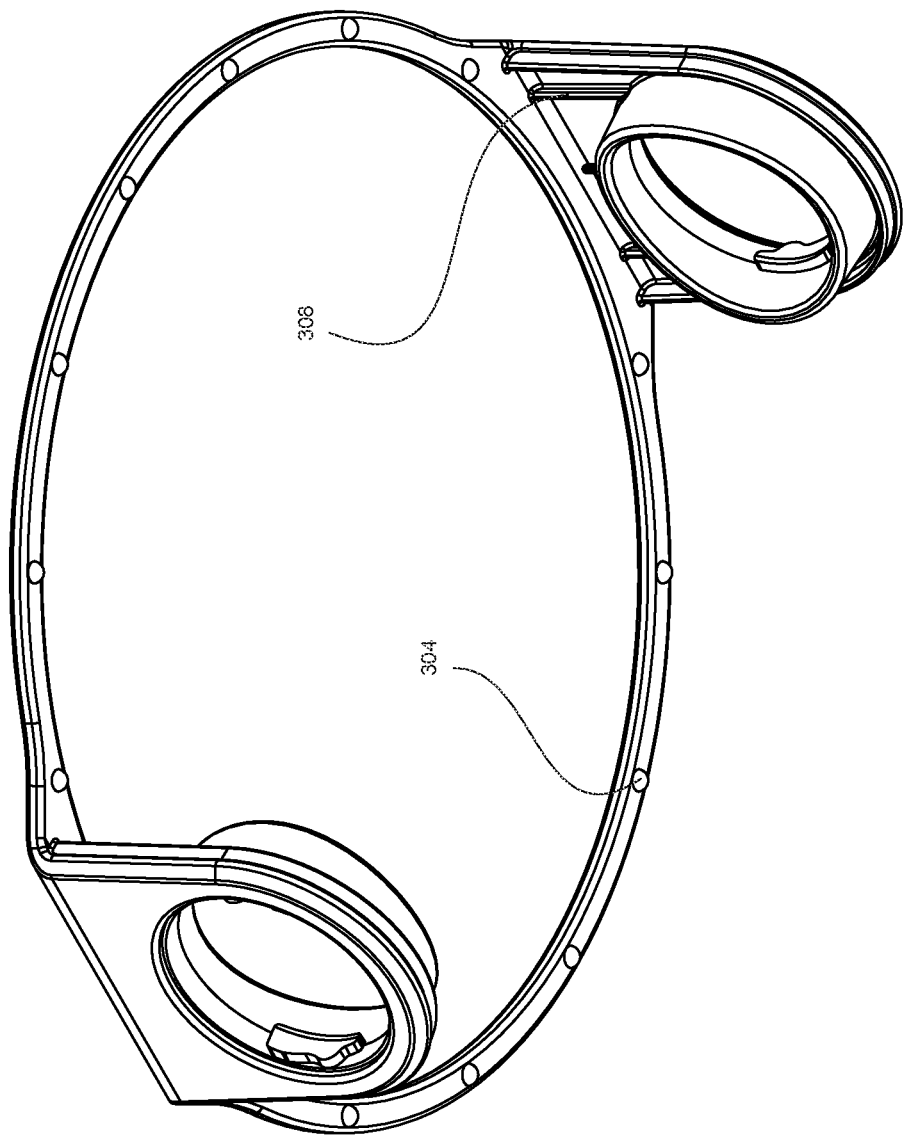
FIG. 33 shows a perspective bottom view of the same.

FIGS. 31a to 31c show a further embodiment of the invention in which the handle 330 is attached to the lid of the bottle and forms a C-shaped top arch positioned above thereof. One or more universal adapters with corresponding first attachment faces 340 may be positioned and formed as a part of the handle 330 such that the accessory may be attached on top of the liquid container.

Universal Adapter Positioned on an Annular Member

A further yet manner in which one or more universal adapters may be retained on the liquid container is by using an annular member having a generally ring-shaped profile to be retained between the lid and the body of the elongated liquid vessel 1000.

Referring now to FIGS. 32-42, a liquid container may include an annular member 300 having a ring 301 configured to fit around a portion of a liquid vessel close to the top spout thereof and one or more side members 302, positioned generally perpendicular to the generally annular member 300 and connected thereto.

In embodiments, side members 302 may be positioned to extend down from the annular member 300 and not allow for rotation about thereof. One or more reinforcement ribs 308 may be provided to structurally rigidize the side members 302 in their relationship to the annular member 300. Furthermore, the opening formed as a first attachment face 340 is not designed to carry the liquid container. It is only designed to serve as an attachment point for the accessories described herein. For that reason, it is made to be smaller in diameter than conventional carrying loops and positioned generally flush with the general contours of the liquid container to not protrude extensively away therefrom.

The annular member 300 may be thin with generally planar top and bottom surfaces that form an aperture 303 sized to fit around a threaded portion of the elongated liquid vessel 1000. One or more side members 302 may include a first attachment face 340 incorporated therein.

Figure 34:
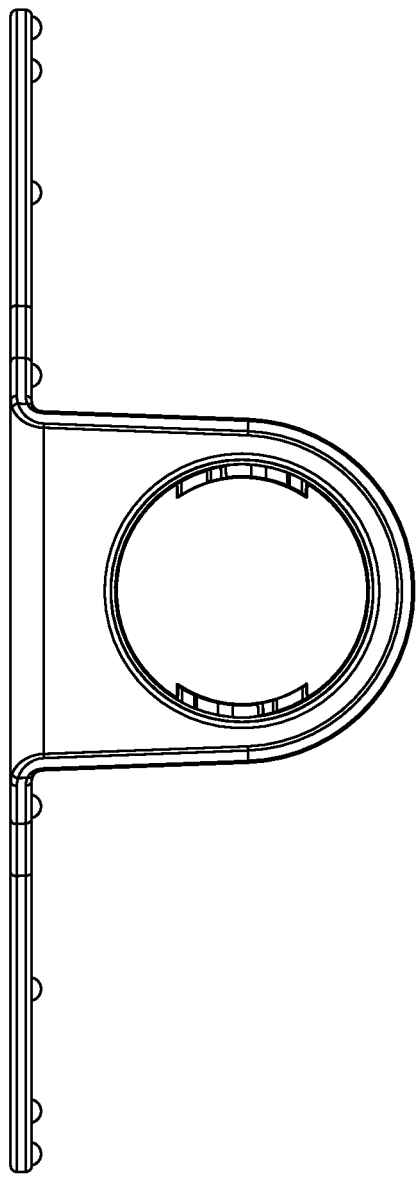
FIG. 34 shows a first side view of the same.
Figure 35:
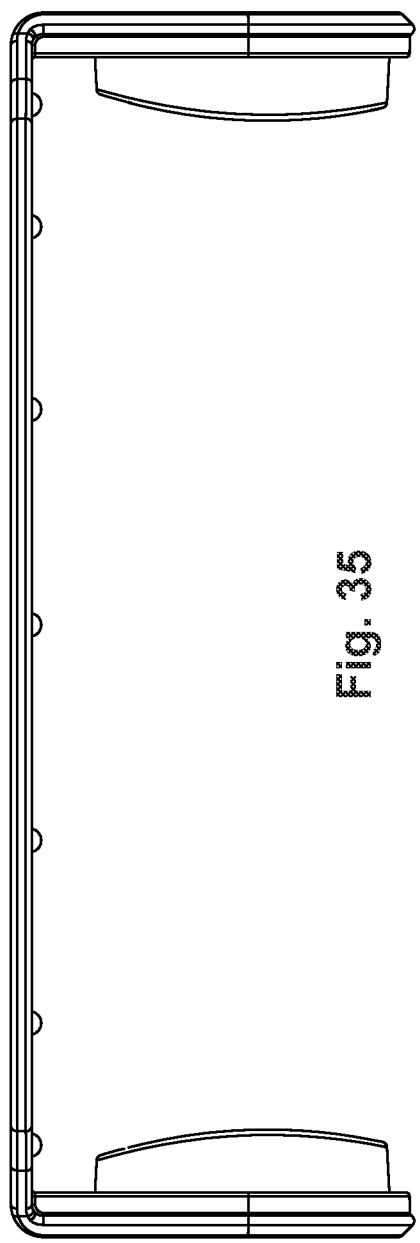
FIG. 35 shows a second side view of the same.

In further embodiments, the bottom surface of the annular member 300 may have one or a plurality of small protrusions 304, designed to allow for some compression when the lid body 101 engages with the elongated liquid vessel 1000—see FIGS. 34 and 35. Compression of protrusions allow the lid body 101 to be fully seated and seal the opening of the liquid vessel 1000, with the annular member 300 located in between. The presence of protrusions 304 allow to manufacture the annular member 300 with less precision as compared to having no protrusions as the lid body 101 when seated over the opening of the liquid vessel 1000 has to both (i) seal the opening, and (ii) compress and retain the annular member 300 without the possibility of rotating around the lid body 101.

The annular member 300 is configured for removable and secure fitment between a lid body 101 and the elongated liquid vessel 1000. In various embodiments, the annular member 300 may rest on the vessel's lip 1010 adjacent to threading and/or a top vessel opening. Side member 302 may be configured to abut the outer wall of the vessel while allowing the second attachment face of the accessory to connect to and be retained by the first attachment face 340 of the universal adapter of the present invention.

Figure 37:
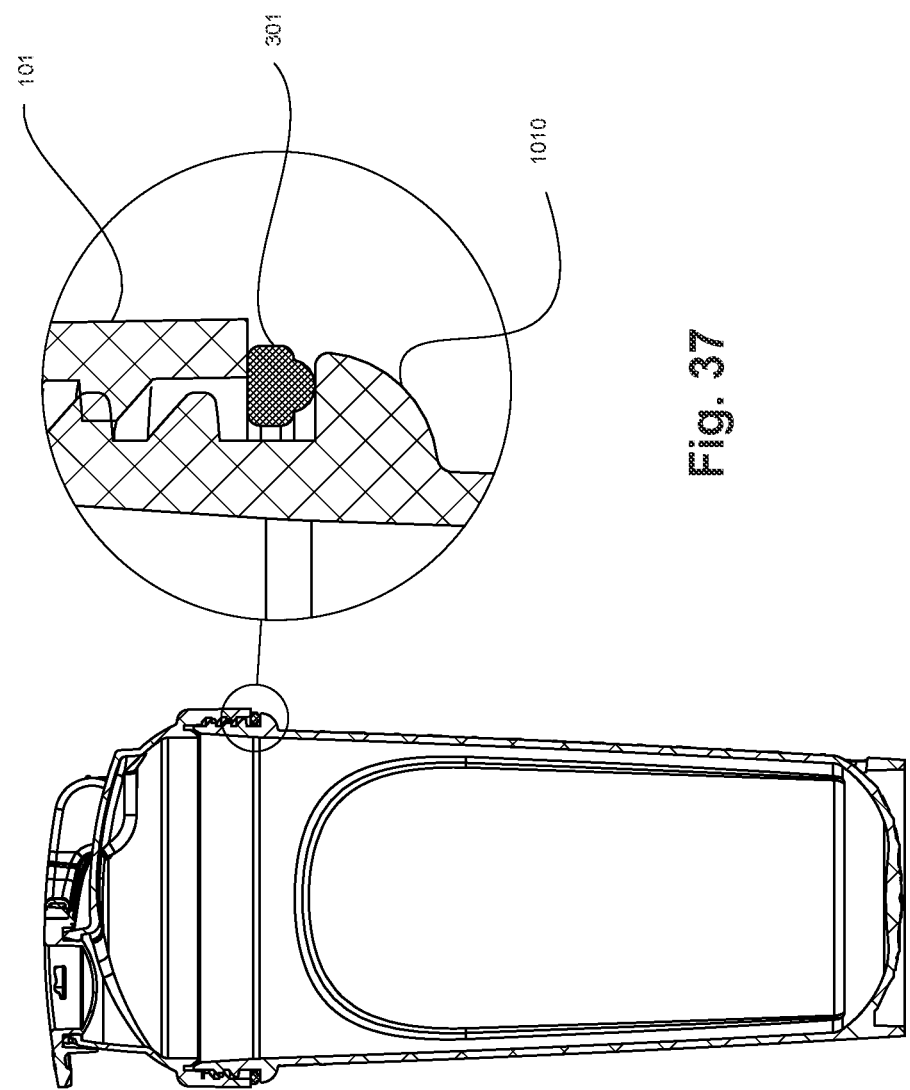
FIG. 37 shows a cross-sectional view of the same but assembled together with a zoomed view of the position of the annular member between the lid body and the lip of the liquid vessel.
Figure 36:
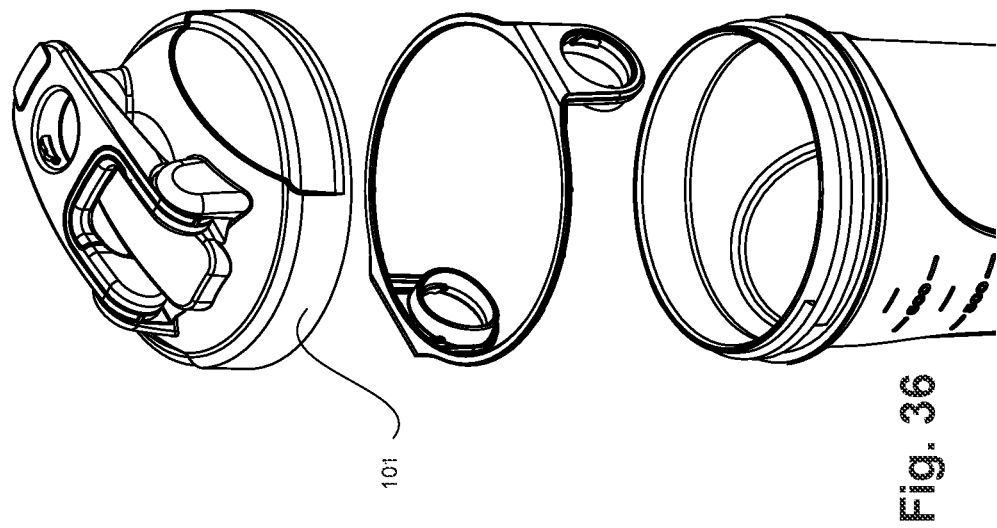
FIG. 36 shows an exploded view of the liquid vessel, annular member, and the lid.

Referring now to FIGS. 36 and 37, various structures of the annular member 300 are shown in the elongated liquid vessel 1000 and lid body 101 environment to illustrate the secure fitment of the annular member in various embodiments. Annular member 300 may be configured for a secure fit with respect to the elongated liquid vessel 1000 and lid body 101 as follows: the ring 301 may rest on the vessel lip 1010 and be secured between the vessel lip 1010 and the lid body 101. At least a portion of the side member 302 abuts the vessel lip 1010. The top surface of the ring 301 abuts the lid body 101. The lower surface of the ring 301 rests on the plurality of protrusions 304 sitting on the vessel lip 1010. These and other features prevent the annular member 300 from sliding around when it is placed for use while still allowing the vessel and the lid to properly seal liquids to avoid spillage and leaking. The lid body 101 may be sealed against the elongated liquid vessel 1000 using a gasket located in between thereof in other parts of the liquid container, and not adjacent to the annular member 300.

Figure 38:
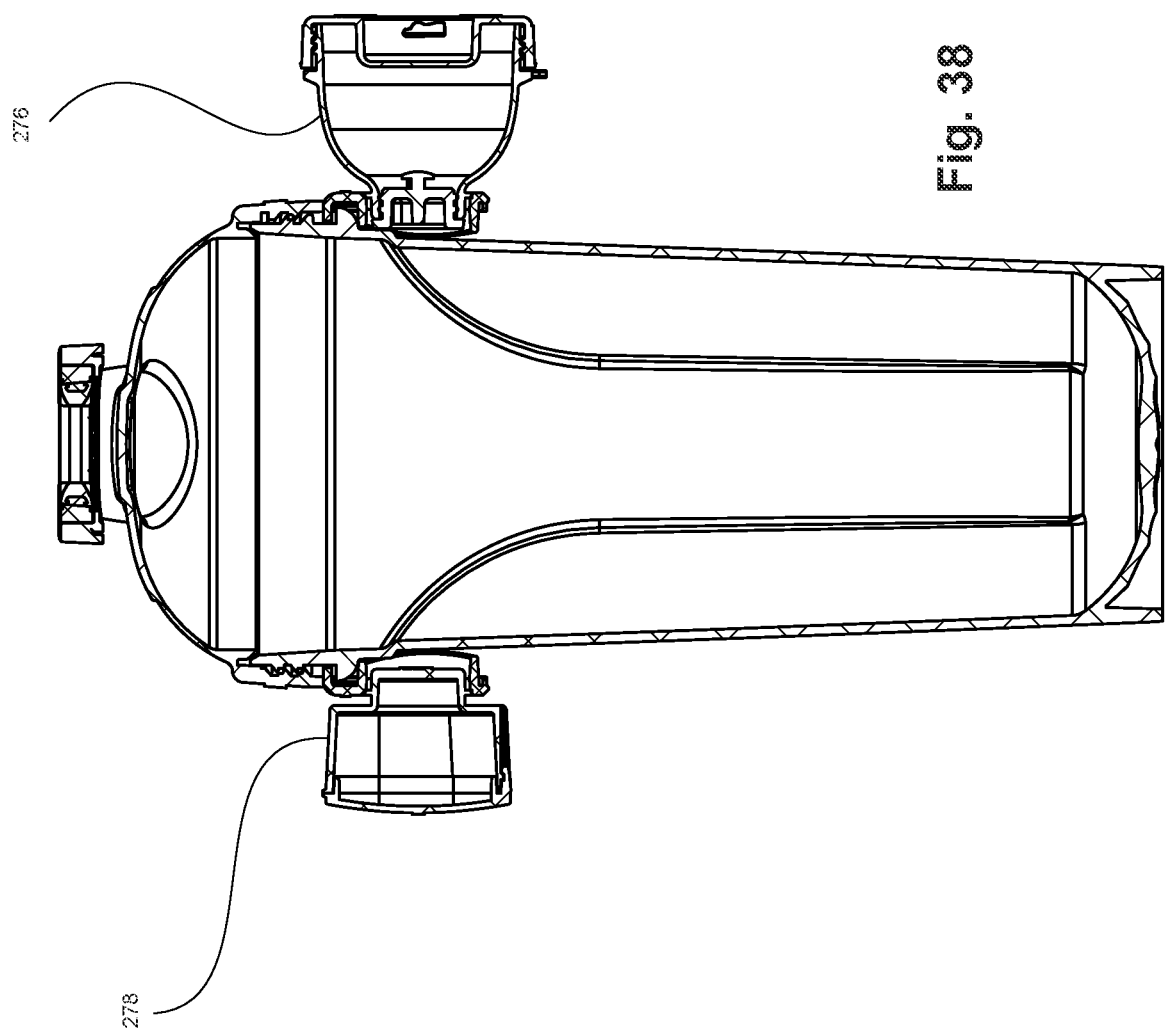
FIG. 38 shows a cross-sectional view of the liquid container with two accessories attached on both sides thereof.
Figure 39:
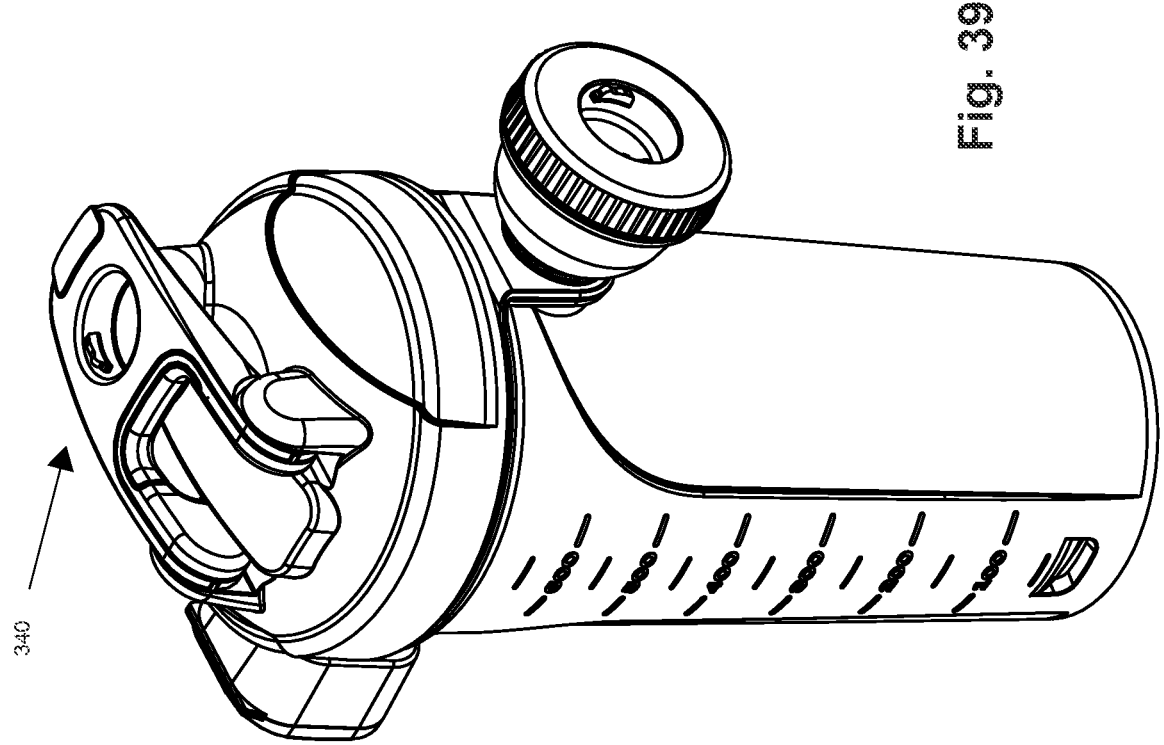
FIG. 39 shows a perspective side view of the same.

Referring now to FIGS. 38 and 39, the liquid container equipped with the annular member 300 may include one or more accessories configured to have their respective second attachment face cooperate with the first attachment face 340 for releasable attachment to the liquid container. For illustrative purposes, FIGS. 38 and 39 show an additional universal adapter located on top of the flip cap, although, in other embodiments, that may not be the case. One or more accessories may be attached to one or more first attachment faces 340, such as a pill box 278 on one side of the liquid container and a powder container 276 with a funneled end on the other side thereof. In case of attachment to one or more universal adapters located on the annular member 300, their position to face transversely to the elongated liquid vessel 1000 makes the accessories extend sideways from the outer wall of the liquid vessel. Since these accessories are generally smaller than the lid body 101, their presence does not increase the overall size of the liquid container of the present invention.

Figure 41:
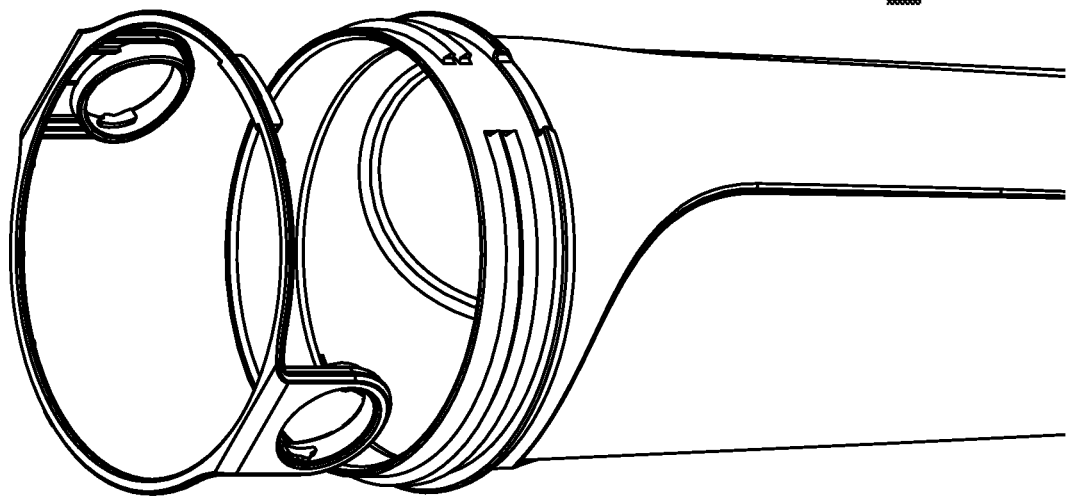
FIG. 41 shows yet another alternative design thereof.
Figure 40:
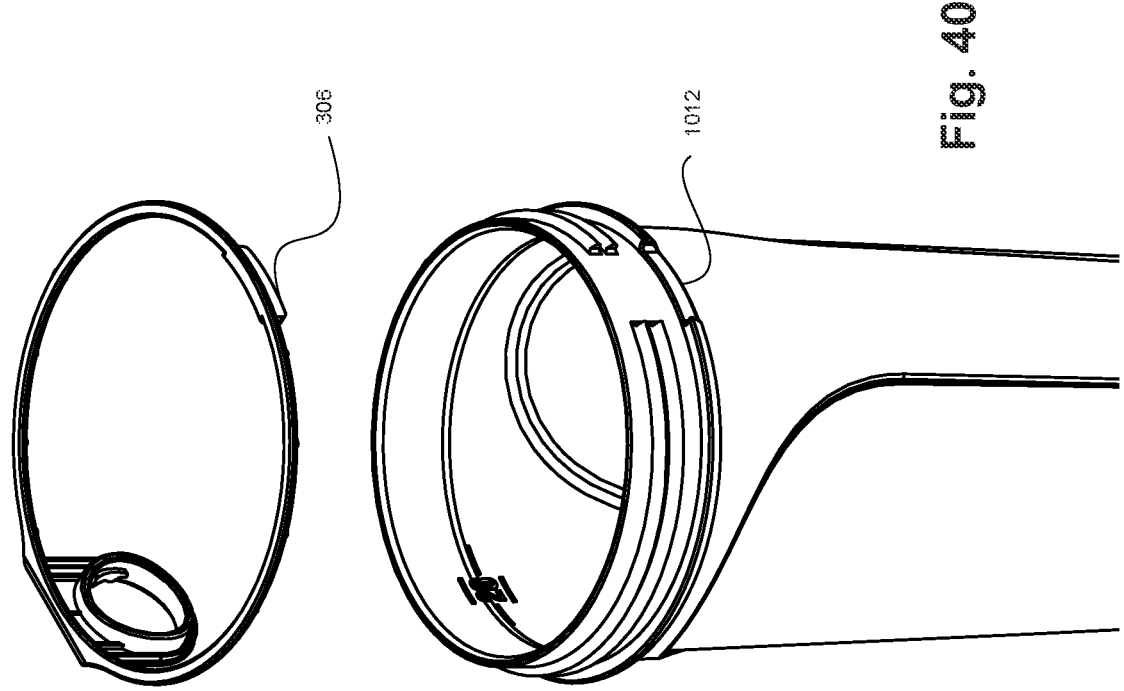
FIG. 40 shows an exploded perspective view of the annular member with an alternative design and the corresponding liquid vessel.
Figure 42:
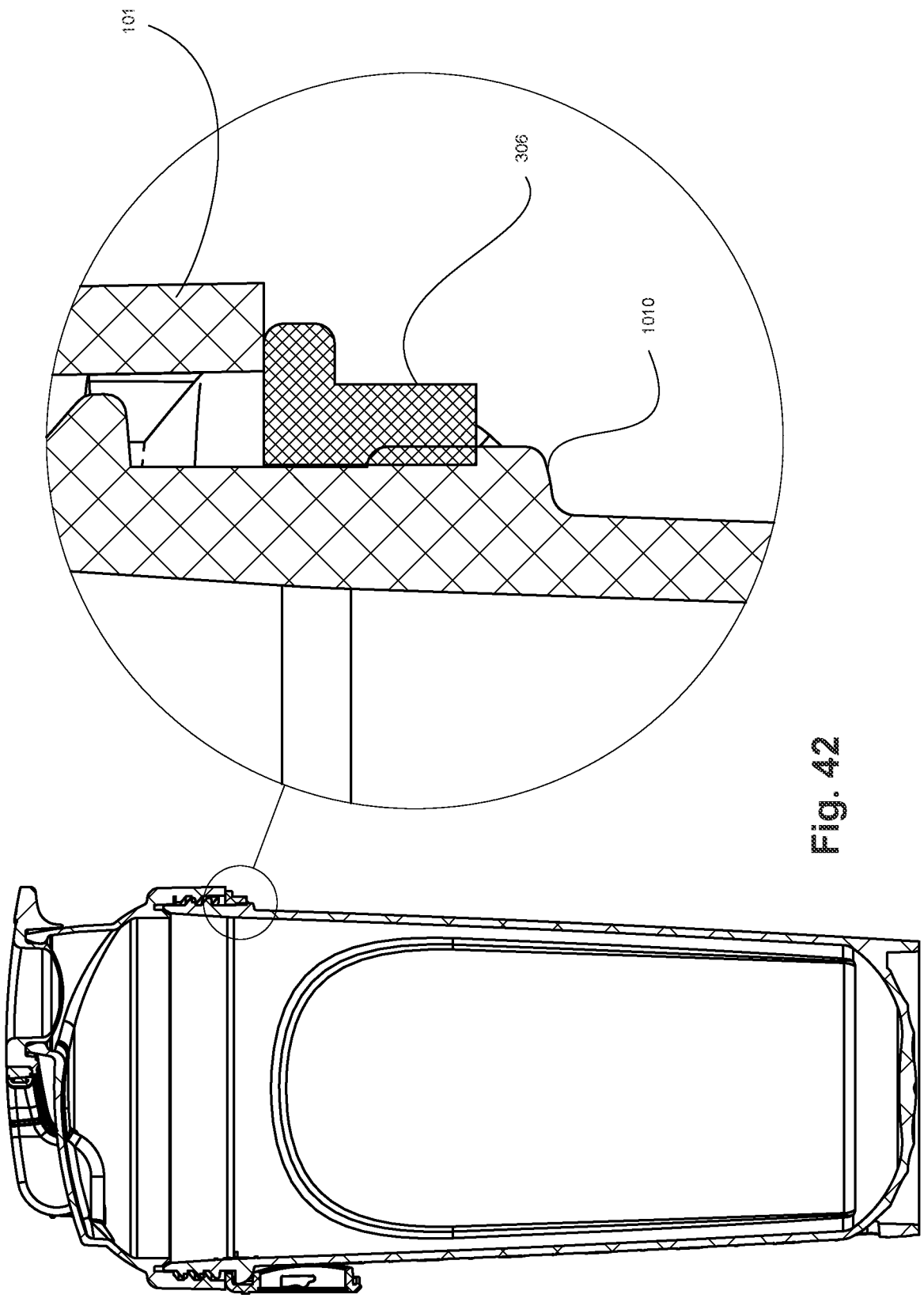
FIG. 42 shows a cross-sectional view of the same as in FIG. 41 with the zoomed-in window on the right side showing the details of the retention of the annular member between the lid and the vessel body.

Other non-rotation features may be used along with the annular member 300. FIGS. 40 and 41 show alternative designs in which a sidewall portion 306 is incorporated with the ring 301. The sidewall portion 306 may cooperate with the cutout 1012 in the vessel lip 1010 of the elongated liquid vessel 1000—see FIG. 40. In use, the ring 301 may be placed on top of the vessel lip 1010 such that the sidewall portion 306 rests within the cutout 1012. Securing the position of the annular member 300 on top of the vessel lip 1010 with the lid body 101 threadedly attached thereto, completes the liquid-tight assembly of the liquid container of the invention with one or more universal adapters facing sideways and transversely to the elongated liquid vessel 1000, as seen in FIG. 42.

Figure 43C:
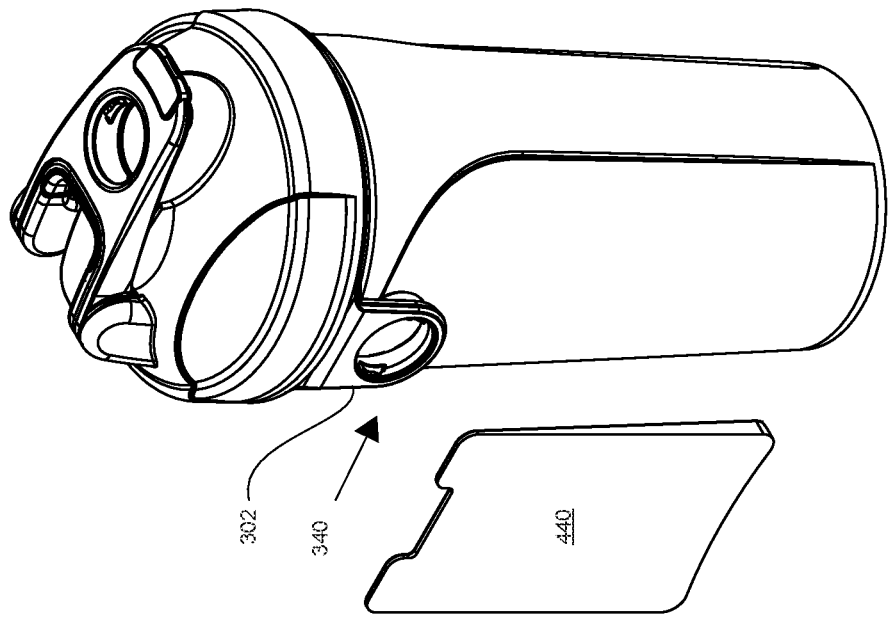
FIGS. 43a to 43c show side and exploded views of the wallet accessory of the invention.
Figure 43B:
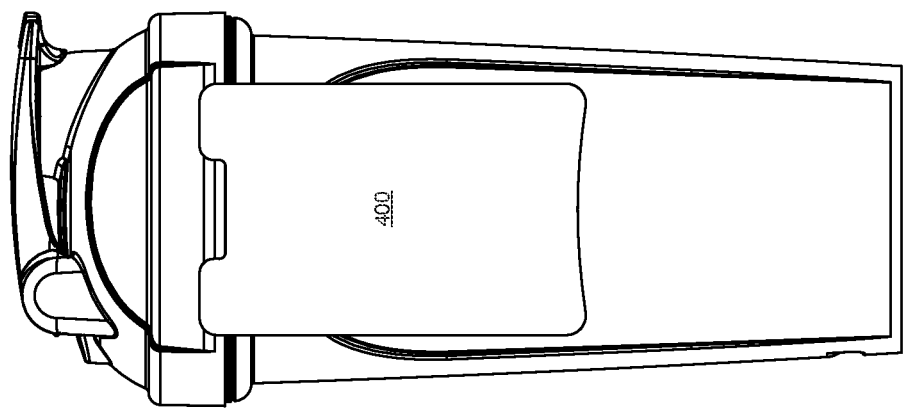
Figure 43A:
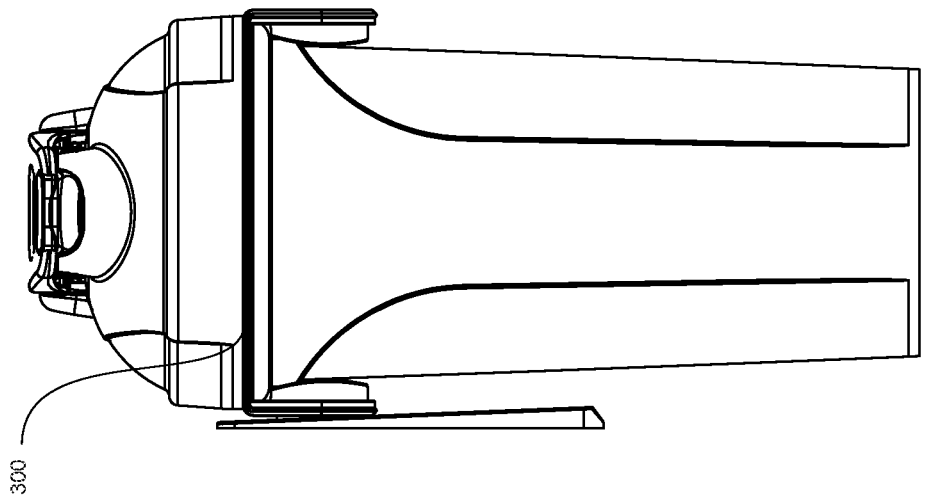
Figure 44:
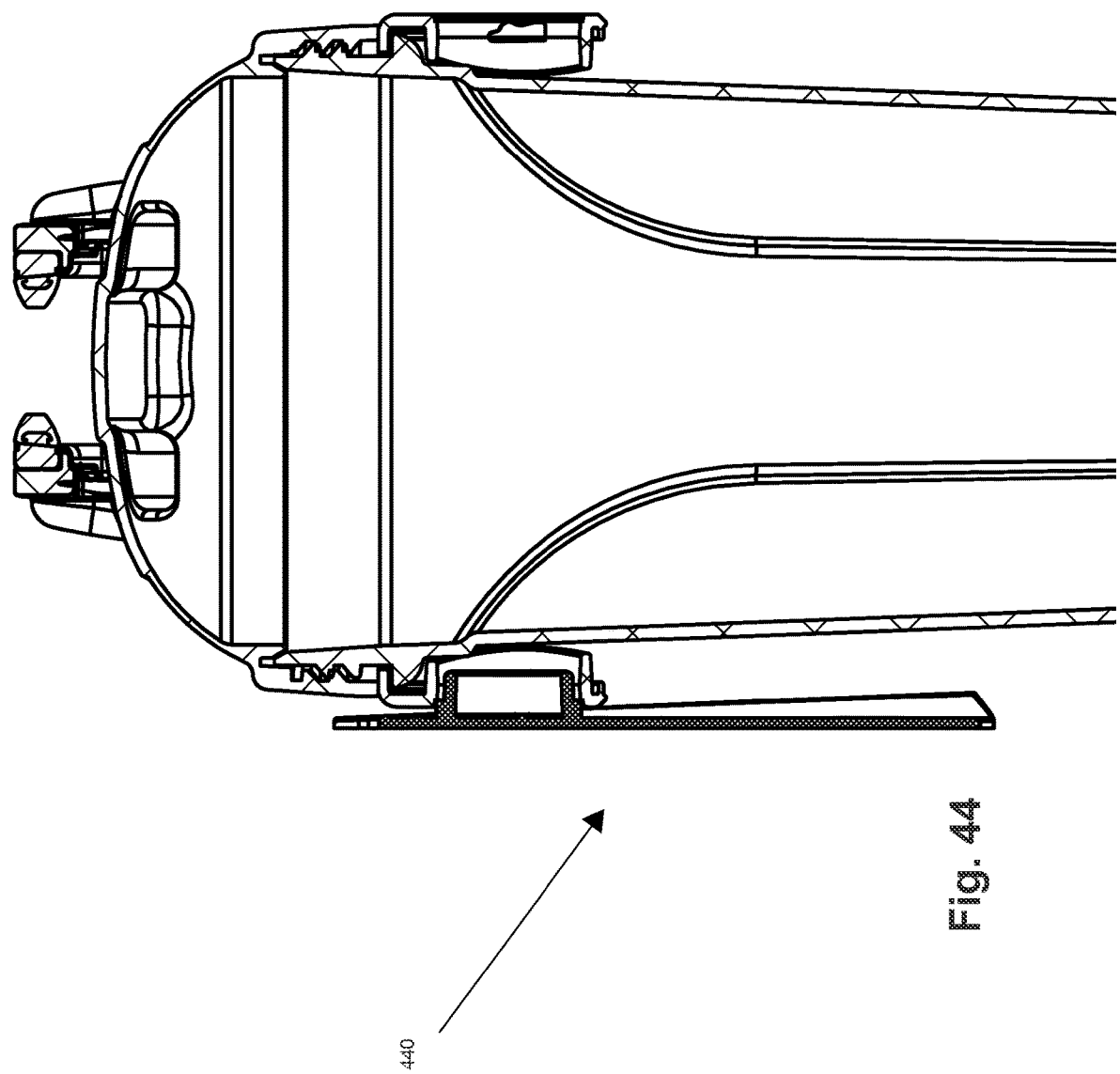
FIG. 44 shows a close-up of a cross-sectional view of the wallet accessory attached to the liquid container.

FIGS. 43a to 43c show several views of the annular member 300 retained over the elongated liquid vessel 1000 and configured to removably attach yet another optional accessory, a wallet 440. The wallet 440 may have a size approximating a credit card and may be made to have a flat rigid back surface on one side with the second attachment face extending therefrom. One or more straps or pockets, which may be configured to be elastic, may be attached to the front flat surface of the wallet accessory opposite the back surface and configured to accept one or more credit cards, keycards, ID cards, earbuds, paper money, or other small items inside thereof. The one or more straps or pockets of the wallet accessory may be made to be transparent to facilitate observing their content by the user without the need to remove them from the wallet.

Figure 45B:
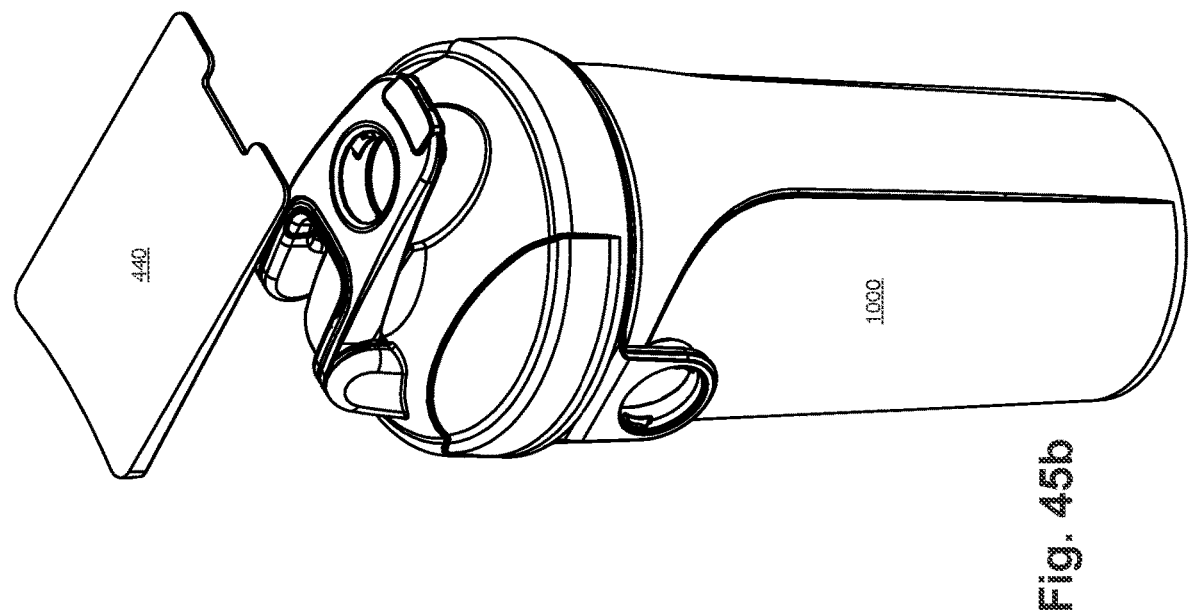
FIGS. 45a and 45b show perspective views of the wallet accessory attached and detached from the universal adapter on the flip cap of the liquid container.
Figure 45A:
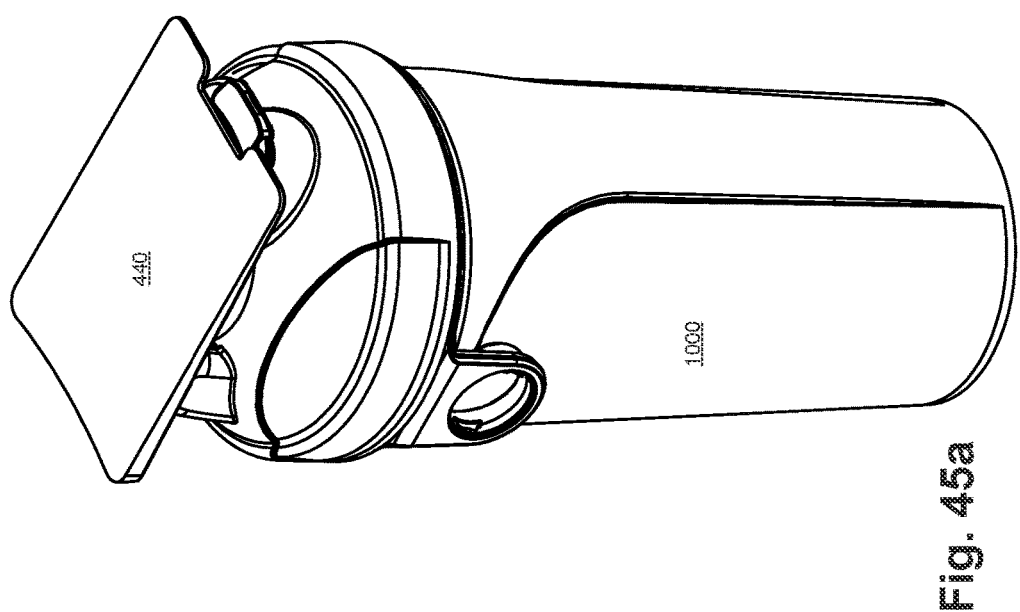
Figure 46C:
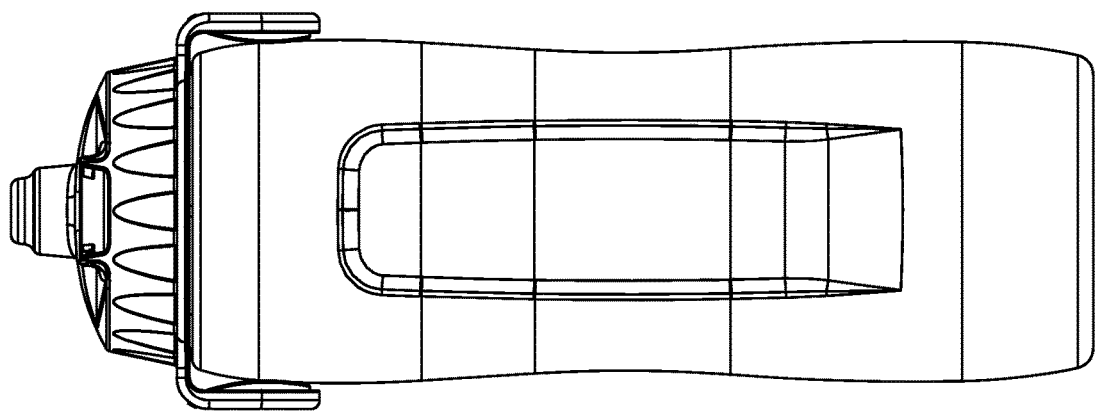
FIGS. 46a through 46c show a first side view, a second side view, and a third side view of an exemplary embodiment of the invention realized for the squeeze bottle.
Figure 46B:
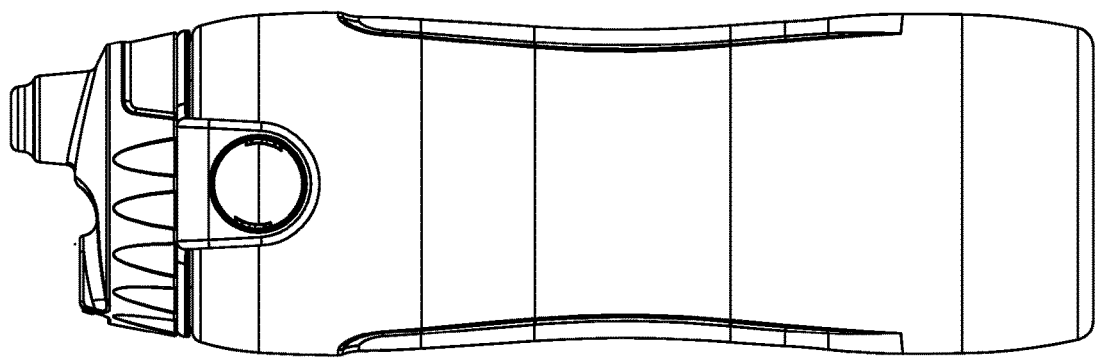
Figure 46A:
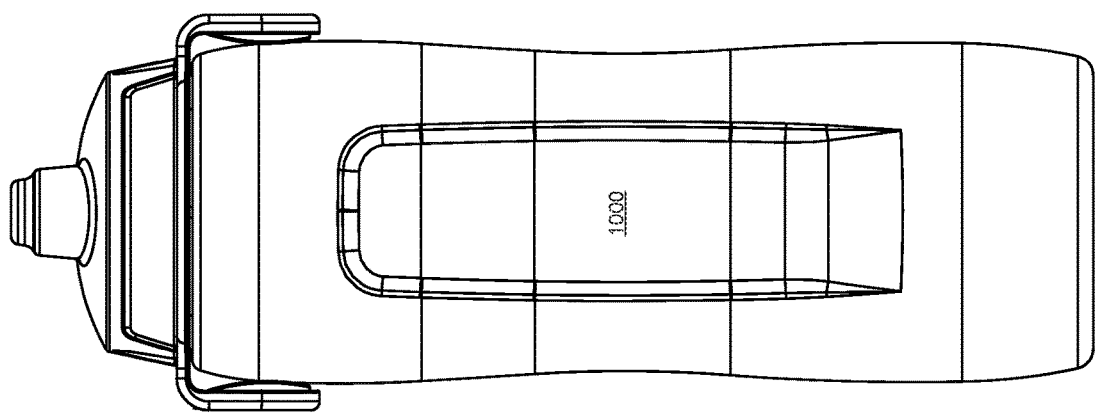
Figure 47C:
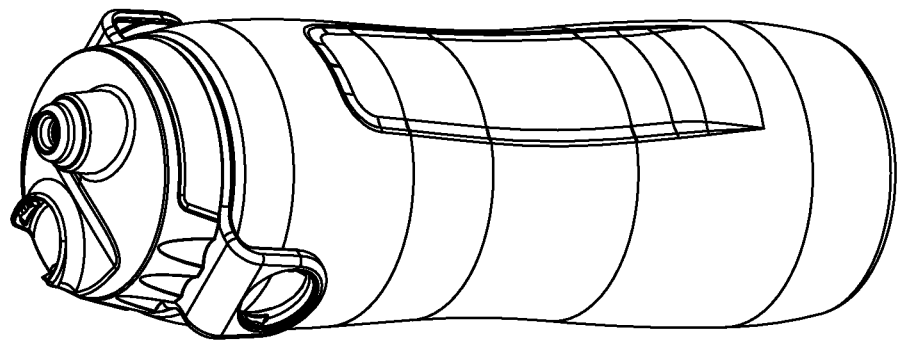
FIGS. 47b and 47c show further perspective views of the same.
Figure 47B:
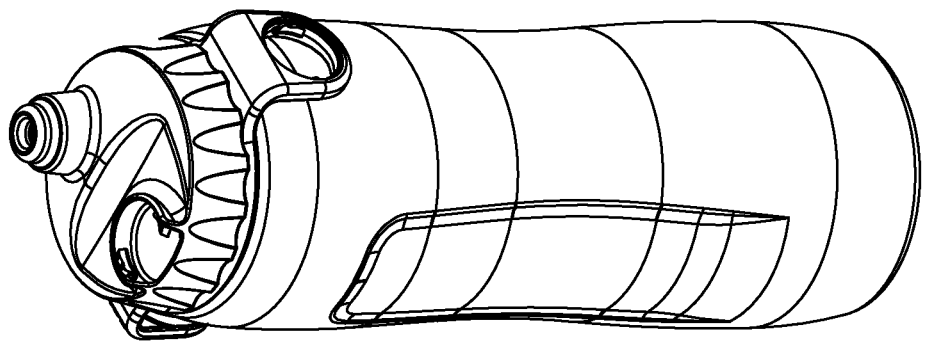
Figure 47A:
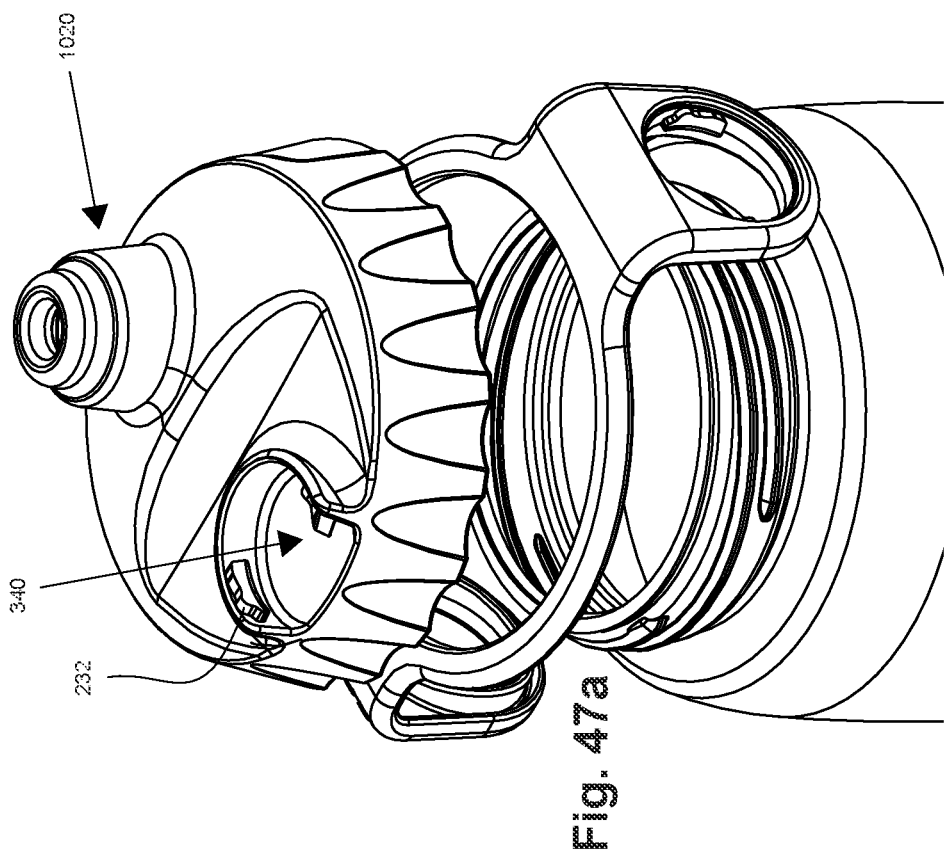
FIG. 47a shows a perspective exploded view of the same.
Figure 49:
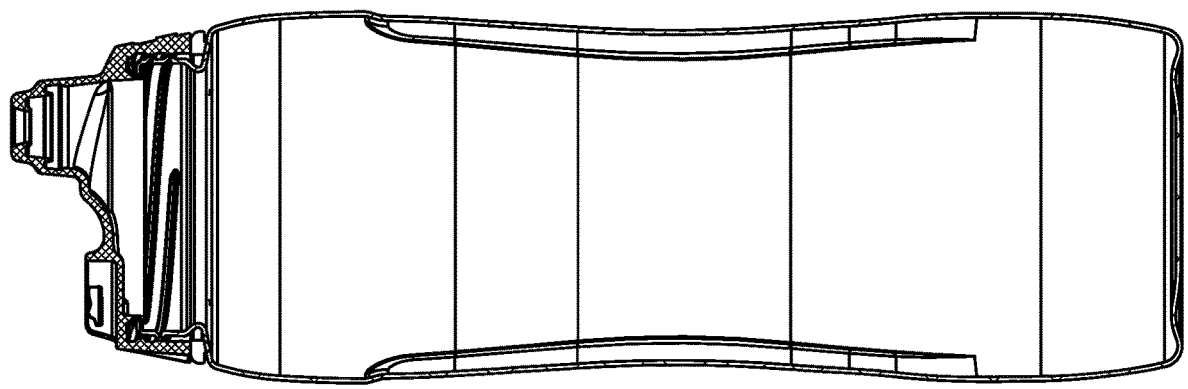
FIG. 49 shows a cross-sectional side view of the same.

The wallet attachment may be secured to a side of the liquid container, as seen in FIGS. 43a and 43b. alternatively, it may be secured to the top of the liquid container using a universal adapter positioned on the flip cap of the container, as seen in FIGS. 45a and 45b, as the invention is not limited in this regard.

As illustrated above, the liquid container with a plurality of removable attachments conveys a number of functional advantages and improvements over prior art attempts to address the same or similar problems. First, the liquid container does not sacrifice the reduction in volume of the main drink container. The recessed area of the first attachment face is optimized for space efficiency. Second, the new design is more cost-efficient than prior art attempts because it requires fewer changes and added material to existing liquid container designs. Third, the new design bridges the gap between containerized systems and typical container bottom dimensions that fit in standard cup holders by retaining the liquid container bottom dimensions of non-containerized systems. Fourth, because the new design utilizes the top of the main liquid container rather than the bottom, it allows for a greater variety of potential accessories that would not be functional if added to the bottom of the main drink container. Fifth, accessories may also be attached to any number of other items beyond a container because they are relatively small and not dimensioned and configured exclusively for fitment with one container. This allows for enhanced modularity and expansion of use across product lines that may be related, but not identical. Sixth, the design increases ease of use because existing systems require a two-handed operation to manipulate the various stacked containers; in contrast, the disclosed design allows for one-handed attachment, detachment, opening, and/or closing of sub-containers and/or accessories.

Universal Adapter Positioned on the Outer Wall of the Liquid Vessel

Figure 61:
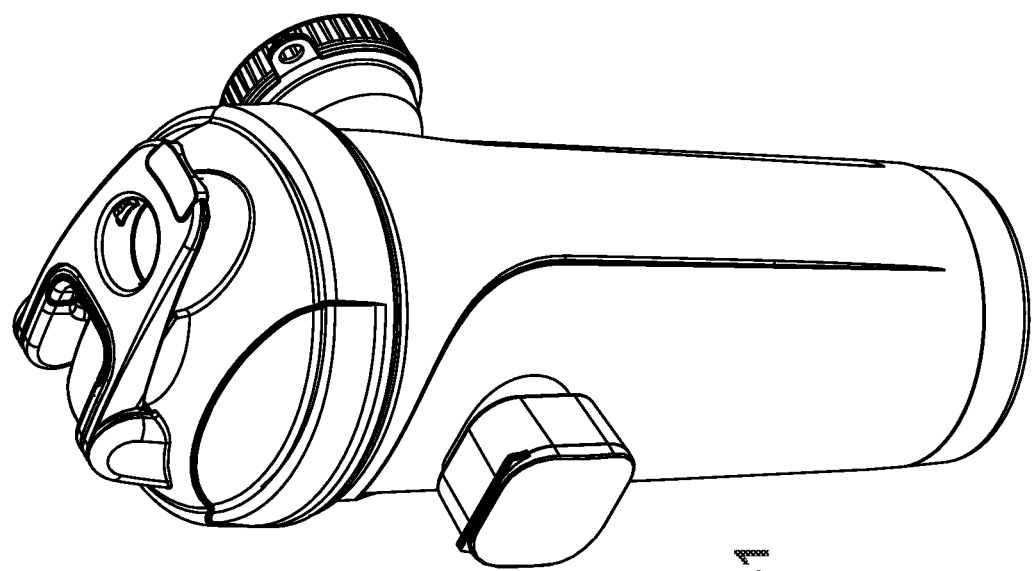
FIG. 61 is the same but with exemplary accessories assembled on the outer wall of the liquid container.
Figure 60:
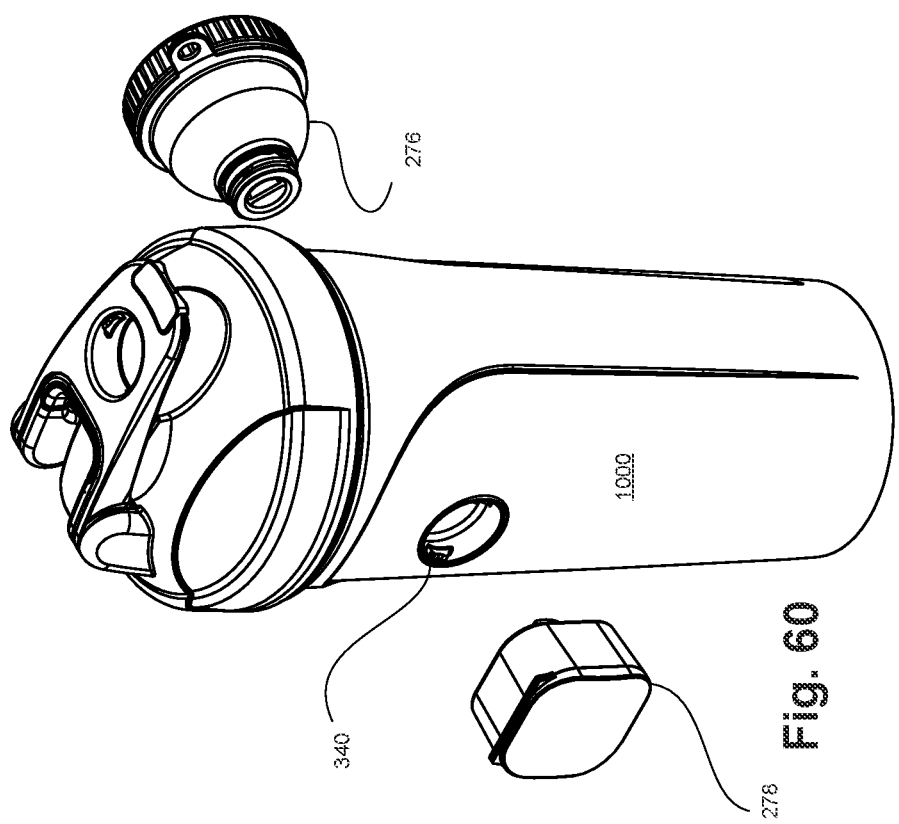
FIG. 60 is an exploded perspective view of yet another embodiment of the present invention with the universal adapter built into the outer wall of the liquid vessel.

In yet other embodiments of the present invention, the universal adapter may be built-in and incorporated with the outer wall of the elongated liquid vessel 1000, see FIGS. 60-62. One, two, or a plurality of universal adapters may be positioned on one side or throughout the external surface of the outer wall. In one exemplary embodiment, an enlargement of the outer wall may be provided that contains a cavity housing the first attachment face, as seen in cross-section in FIG. 62. In this embodiment, the universal adapter with the first attachment face 340 may be made flush with the outer wall of the liquid vessel, which facilitates the ease of use. If no accessory is present, the universal adapter may not protrude outside the boundary of the liquid vessel so as to not create a point that may snag on other items carried by the user. FIGS. 60 and 61 show exemplary accessories of a pill box 278 and the powder container 276 positioned on both sides of the liquid vessel 100.

It is contemplated that any embodiment discussed in this specification can be implemented with respect to any method of the invention, and vice versa. It will be also understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference. Incorporation by reference is limited such that no subject matter is incorporated that is contrary to the explicit disclosure herein, no claims included in the documents are incorporated by reference herein, and any definitions provided in the documents are not incorporated by reference herein unless expressly included herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12, 15, 20 or 25%.

All of the devices and/or methods disclosed and claimed herein can be made and executed without undue experimentation in light of the present disclosure. While the devices and methods of this invention have been described in terms of preferred embodiments, it will be apparent to those of skill in the art that variations may be applied to the devices and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A liquid container comprising:
    an elongated liquid vessel having a hollow body with an outer wall and a vessel opening on a first end thereof, and
    a first attachment face configured to releasably mechanically engage with a corresponding complementary second attachment face incorporated with an accessory, the first attachment face is positioned on one of:
        a lid or a component thereof, the lid is configured to attach to the liquid container at the first end thereof, the lid is further configured to releasably close off the vessel opening in a liquid-tight manner, or
        a handle configured to attach to the outer wall of the elongated liquid vessel, or
        an annular member positioned below the vessel opening,
    wherein when attached to the lid or the component thereof, the accessory allows access to a liquid inside the liquid container without detaching anything from the liquid container, and
    wherein a round cavity of the first attachment face and a circular portion of the second attachment face define an engagement diameter, wherein the circular portion of the second attachment face fits inside the round cavity of the first attachment face.

2. A liquid container comprising:
    an elongated liquid vessel having a hollow body with an outer wall and a vessel opening on a first end thereof, and
    a first attachment face configured to releasably engage with a corresponding complementary second attachment face incorporated with an accessory, the first attachment face is positioned on an arcuate annular member, wherein the annular member is positioned below the vessel opening and secured between a lid and a portion of the liquid vessel below and adjacent to the lid when the lid is attached to the liquid vessel at the first end thereof.

3. The liquid container, as in claim 2, wherein the arcuate annular member comprises at least one side member extending therefrom, wherein the first attachment face is incorporated within the side member of the arcuate annular member.

4. The liquid container, as in claim 3, wherein the side member is extending along the outer wall of the hollow body.

\* \* \* \* \*